(12) United States Patent
Wang

(10) Patent No.: US 10,395,535 B2
(45) Date of Patent: Aug. 27, 2019

(54) METHOD AND SYSTEM FOR LEGAL PARKING

(71) Applicant: Kevin Sunlin Wang, Flushing, NY (US)

(72) Inventor: Kevin Sunlin Wang, Flushing, NY (US)

(73) Assignee: OPERR Technologies, Inc., Flushing, NY (US)

( * ) Notice: Subject to any disclaimer, the term of this patent is extended or adjusted under 35 U.S.C. 154(b) by 1 day.

(21) Appl. No.: 15/617,881

(22) Filed: Jun. 8, 2017

(65) Prior Publication Data

US 2018/0357900 A1 Dec. 13, 2018

Related U.S. Application Data

(63) Continuation-in-part of application No. 14/859,274, filed on Sep. 19, 2015, now Pat. No. 9,704,392.

(60) Provisional application No. 62/086,560, filed on Dec. 2, 2014, provisional application No. 62/092,100, filed on Dec. 15, 2014, provisional application No. 62/104,510, filed on Jan. 16, 2015, provisional application No. 62/150,118, filed on Apr. 20, 2015, provisional application No. 62/210,701, filed on Aug. 27, 2015.

(51) Int. Cl.
*G08G 1/14* (2006.01)
*G06Q 20/00* (2012.01)

(52) U.S. Cl.
CPC ............ *G08G 1/144* (2013.01); *G06Q 20/00* (2013.01); *G08G 1/143* (2013.01); *G08G 1/147* (2013.01)

(58) Field of Classification Search
CPC ......... G07F 17/42; G07F 17/24; G08G 1/142; G08G 1/145; G08G 1/017; G08G 1/148; G08G 1/144; G08G 1/0112; G07B 15/02; G01C 21/32; G01C 21/3685
USPC .................. 340/932.2, 934, 870.03, 807.02; 701/400.01, 117; 705/13.39, 418
See application file for complete search history.

(56) References Cited

U.S. PATENT DOCUMENTS 7,019,670 B2 * 3/2006 Bahar ................. G06Q 20/127
340/932.2
8,063,797 B1 * 11/2011 Sonnabend ........ G06K 9/00791
340/932.2

(Continued)

*Primary Examiner* — Hoi C Lau
(74) *Attorney, Agent, or Firm* — Ugweches, Wang & Associates, LLP

(57) ABSTRACT

A method and system for identifying potentially available legal parking and generating notifications thereof is provided. The system receives location information from a user's computing device and queries the database for legal parking related data relevant to the time, location, and user type, which is categorized by data type. The system precludes illegal and occupied parking locations from identification as potentially available legal parking locations based on user type. Illegal parking locations are determined based on parking prohibitions directly applicable or applicable by inference to the user. The system generates one or more notifications comprising the legal parking related data and transmits them to the user's computing device. The user can interact with the system through a user engagement panel to provide legal parking related data. Data submitted through the user engagement panel is subject to ratings from additional users, and can be used to update the database.

30 Claims, 25 Drawing Sheets

(56) References Cited

U.S. PATENT DOCUMENTS

| | | | |
|---|---|---|---|
| 8,229,658 B1 * | 7/2012 | Dabell | G08G 1/0137 701/117 |
| 8,306,734 B2 * | 11/2012 | Mathews | G01C 21/3685 701/408 |
| 8,432,297 B2 * | 4/2013 | Sonnabend | G06K 9/00791 340/932.2 |
| 8,600,786 B2 * | 12/2013 | Stefik | G06Q 10/02 705/5 |
| 8,610,597 B2 * | 12/2013 | Stefik | G06Q 10/02 340/425.5 |
| 8,730,062 B2 * | 5/2014 | Eldershaw | G08G 1/147 340/521 |
| 9,558,665 B2 * | 1/2017 | Wang | G01C 21/3685 |
| 9,704,392 B2 * | 7/2017 | Wang | G08G 1/0112 |
| 9,810,542 B2 * | 11/2017 | Mays | G01C 21/34 |
| 9,928,735 B2 * | 3/2018 | Wang | G08G 1/0137 |
| 9,972,201 B2 * | 5/2018 | Wang | G08G 1/0112 |
| 9,997,071 B2 * | 6/2018 | Wang | G01C 21/3685 |
| 10,066,954 B1 * | 9/2018 | Swanson | G01C 21/3484 |
| 2004/0068433 A1 * | 4/2004 | Chatterjee | G06Q 20/127 705/13 |
| 2006/0227010 A1 * | 10/2006 | Berstis | G08G 1/14 340/932.2 |
| 2010/0302068 A1 * | 12/2010 | Bandukwala | G08G 1/14 340/932.2 |
| 2011/0099126 A1 * | 4/2011 | Belani | G06Q 30/0284 705/418 |
| 2011/0140927 A1 * | 6/2011 | Lee | G08G 1/207 340/993 |
| 2011/0148662 A1 * | 6/2011 | Lowenthal | G07B 15/02 340/932.2 |
| 2011/0224899 A1 * | 9/2011 | Mathews | G01C 21/3685 701/533 |
| 2012/0062395 A1 * | 3/2012 | Sonnabend | G06K 9/00791 340/932.2 |
| 2012/0092190 A1 * | 4/2012 | Stefik | G06Q 10/02 340/932.2 |
| 2012/0092191 A1 * | 4/2012 | Stefik | G06Q 10/02 340/932.2 |
| 2012/0095791 A1 * | 4/2012 | Stefik | G06Q 10/02 705/5 |
| 2012/0127308 A1 * | 5/2012 | Eldershaw | G08B 13/1672 348/143 |
| 2012/0245981 A1 * | 9/2012 | Volz | G07B 15/02 705/13 |
| 2012/0323643 A1 * | 12/2012 | Volz | G07B 15/02 705/13 |
| 2013/0187795 A1 * | 7/2013 | Lowenthal | G07B 15/02 340/989 |
| 2014/0085109 A1 * | 3/2014 | Stefik | G06Q 10/02 340/932.2 |
| 2014/0122190 A1 * | 5/2014 | Wolfson | G06Q 10/0631 705/13 |
| 2014/0195281 A1 * | 7/2014 | Stefik | G06Q 10/02 705/5 |
| 2014/0249742 A1 * | 9/2014 | Krivacic | G08G 1/14 701/400 |
| 2014/0320318 A1 * | 10/2014 | Victor | G08G 1/142 340/932.2 |
| 2015/0009047 A1 * | 1/2015 | Ashkenazi | G08G 1/144 340/932.2 |
| 2015/0066545 A1 * | 3/2015 | Kotecha | G06Q 10/02 705/5 |
| 2015/0091741 A1 * | 4/2015 | Stefik | G06Q 10/02 340/932.2 |
| 2015/0102946 A1 * | 4/2015 | Kareev | G08G 1/0175 340/932.2 |
| 2015/0130642 A1 * | 5/2015 | Huang | B62D 15/028 340/932.2 |
| 2015/0138362 A1 * | 5/2015 | Stefik | G06Q 10/02 348/148 |
| 2015/0279213 A1 * | 10/2015 | Balter | G08G 1/144 705/13 |
| 2015/0369613 A1 * | 12/2015 | Stadler | G01C 21/32 701/537 |
| 2016/0012726 A1 * | 1/2016 | Wang | G08G 1/0112 340/932.2 |
| 2016/0047672 A1 * | 2/2016 | Sachdev | G01C 21/3685 701/438 |
| 2016/0061625 A1 * | 3/2016 | Wang | G01C 21/32 701/454 |
| 2016/0063863 A1 * | 3/2016 | Stefik | G06Q 10/02 340/932.2 |
| 2016/0077581 A1 * | 3/2016 | Shi | G06F 3/011 340/12.5 |
| 2016/0155332 A1 * | 6/2016 | Wang | G01C 21/3685 340/932.2 |
| 2016/0358473 A1 * | 12/2016 | Scofield | G08G 1/141 |
| 2017/0098376 A1 * | 4/2017 | Wang | G01C 21/3685 |
| 2017/0140649 A1 * | 5/2017 | Di Censo | G08G 1/146 |
| 2017/0200320 A1 * | 7/2017 | Tomer | G08G 1/144 |
| 2017/0221277 A1 * | 8/2017 | Volz | G06F 17/50 |
| 2017/0229016 A1 * | 8/2017 | Wang | G08G 1/144 |
| 2017/0278305 A1 * | 9/2017 | Sisbot | G06T 19/006 |
| 2017/0309170 A1 * | 10/2017 | Wang | G08G 1/0112 |
| 2018/0232958 A1 * | 8/2018 | Wang | G07F 17/24 |
| 2018/0276700 A1 * | 9/2018 | Wang | G06Q 30/0217 |
| 2018/0313660 A1 * | 11/2018 | Eyster | G08G 1/144 |
| 2018/0313661 A1 * | 11/2018 | Eyster | G08G 1/144 |
| 2018/0357900 A1 * | 12/2018 | Wang | G08G 1/144 |

* cited by examiner

METHOD AND SYSTEM FOR LEGAL PARKING

CROSS-REFERENCE TO RELATED APPLICATIONS

The present application is a continuation-in-part of co-pending application Ser. No. 14/859,274, filed on Sep. 19, 2015, which claims priority to provisional application Ser. No. 62/086,560, filed on Dec. 2, 2014; provisional application Ser. No. 62/092,100, filed on Dec. 15, 2014; provisional application Ser. No. 62/113,922, filed on Feb. 9, 2015; provisional application Ser. No. 62/150,118, filed on Apr. 20, 2015; and provisional application Ser. No. 62/210,701, filed on Aug. 27, 2015, the entire contents of which are herein incorporated by reference.

BACKGROUND OF THE INVENTION

The present disclosure relates to a method and system for legal parking and, more specifically, to a method and system for increasing the possibility for a user to find potentially available legal parking by identifying illegal and occupied parking.

DISCUSSION OF THE RELATED ART

Because public parking is generally cheaper than private or commercial parking, many drivers prefer to look for public and/or on-street parking. However, parking goes beyond just finding an unoccupied spot; parking also includes finding a spot where it is legal to park. Therefore, to effectively guide a user to a parking spot or location, part of the process may involve understanding which spots or locations are legal or illegal and when for certain drivers or vehicles.

Numerous local parking ordinances and rules exist that apply to parking, and they frequently regulate where and for how long a vehicle may be parked along public roadways or in public spaces. A driver who parks a vehicle in a manner that is not permitted under such ordinances and rules may be described as having committed a parking violation. When a law enforcement officer such as a police officer or other traffic enforcement officer finds a vehicle parked in an unpermitted manner, a ticket or citation for a parking violation may generally be issued. Tickets issued for parking violations may be difficult to contest successfully and may carry a significant monetary penalty or penalty points toward a license. These penalties can result in an increase in the cost of vehicle insurance or even a driver license may be suspended or revoked in some scenarios.

Additionally, improperly parked vehicles can impede the flow of traffic, interfere with the operation of public transportation and sanitation services, and block emergency and essential services from being effectively delivered. Accordingly, it is in the public interest to increase adherence to parking rules and ordinances. Roadway congestion and lack of parking spaces, combined with the inherent difficulty in knowing where to look for an open space and the continuing increase in the number of vehicles on the road further challenge a driver's ability to find appropriate legal parking in a timely manner.

Parking rules, regulations, laws, citation codes, etc. (hereinafter, "RRLC") can be very complex, especially in large cities where there may be many reasons for restricting where drivers can park as well as a high demand for parking spaces with many vehicles. Attempts to centralize all legal parking related data seem to be held back by rules that constantly undergo changes, revisions, etc., by those who make and enforce them. Furthermore, they are sometimes enforced by law enforcement irregularly—many times, parking rules may be clear individually, but might not be clear enough when multiple rules overlap or contradict each other in real parking situations.

Due to a lack of understanding or confusion about the parking rules and signs at specific locations, it is common for drivers to commit parking violations when parking in unoccupied spaces, even when they have no intention to violate the rules. In such cases, drivers simply cannot understand or might not have the time to understand all the rules, and which, if any, apply to them. Drivers would be well served if they could see information (e.g., parking rules) that only applied to them as well as potentially available parking spaces, where unrelated information and illegal parking spaces could be precluded, to enhance understanding and adherence to parking rules through a simplified way in which information is delivered.

As discussed herein, the method and system of the present invention overcomes many of the limitations of prior art. The method and system disclosed provides a unique combination of attributes for assisting a user in finding potentially available legal parking, including a database sorted to deliver applicable and targeted information to users that is dynamically updated regarding changes from data sources. In addition, changes can be incorporated from user engagement panel, where users can rate and discuss legal parking related data and information. Other objects, features, and characteristics of the present invention, as well as the methods of operation and functions of the related structural elements, and the combination of parts and economies of development and manufacture, will become more apparent upon consideration of the detailed description below with reference to the accompanying drawings, all of which form a part of this specification.

SUMMARY OF THE INVENTION

The summary is not intended to identify or point to essential features or limit the scope of the subject matter claimed herein. The present invention relates generally to a system for identifying potentially available legal parking, and more specifically, to establish a system and method for guiding users to and notifying users of parking spaces that are both legal and available, with at least the following objectives:

To establish a system in which data can be categorized by data type, which corresponds to at least a user type, so that a user receives data that is relevant to at least the user's user type and applicable to at least the user's location to not overload the user with excessive notifications.

To establish a system to identify one or more potentially available legal parking locations for the user by precluding one or more illegal parking locations from identification as the one or more potentially available legal parking locations based on one or more parking prohibitions directly applicable or applicable by inference to the user.

To establish a system where users can contribute one or more suggestions relating to finding legal parking, one or more recommendations relating to avoiding parking violations, one or more real-time updates relating to a street cleaning start time, one or more real-time updates relating to a street cleaning end time, one or more photos of parking signs, and one or more redesigns of parking signs relating to plain language meaning, content clarification, or language translation to help other users understand parking rules and regulations.

To establish a computing system in which legal parking related data comprises historical legal parking related data correlated to real time legal parking related data dynamically to keep one or more databases up to date.

To establish a system where data submitted by users can be used to update, correct, and supplement the one or more databases dynamically, where users can be given a monetary or non-monetary reward as consideration for submitting data.

To establish a route plan for a user to guide the user to one or more locations which have more potentially available legal parking, as well as notify a user of one or more locations with no potentially available legal parking.

To establish a system in which users can request for another user to refill a parking meter, and in which another user can offer to refill another user's parking meter.

The present invention relates to a computer-implemented system for identifying potentially available legal parking comprising a computing system including one or more processors and one or more databases capable of storing legal parking related data, one or more remote computing devices associated with one or more users, where the remote computing devices are capable of communication with the computing system through at least one communication network, and one or more non-transitory computer readable program storage media capable of storing instructions to instruct the processor(s) to issue one or more notifications. The legal parking related data is categorized by data type comprising at least one of: commercial vehicle legal parking related data or non-commercial vehicle legal parking related data. The one or more processors are configured to: receive, from the remote computing devices, user data comprising data selected from the group comprising: an identified location, a present time, and a user type; retrieve, from at least one of the databases, the legal parking related data relevant to the user type; identify, based on at least one of the legal parking related data and the user data, one or more potentially available legal parking locations for the user; generate, based on the one or more potentially available legal parking locations, one or more notifications comprising the legal parking related data; and transmit the notifications to the remote computing devices. In addition, the legal parking related data is categorized by the data type further comprising at least one of legal parking related data based on type of vehicle or legal parking related data based on type of vehicle plate.

The present invention further relates to a computer-implemented method for identifying potentially available legal parking, where the method comprises the steps of: (i) utilizing a computing system comprising at least one or more processors and one or more databases capable of storing legal parking related data, and one or more remote computing devices associated with one or more users, the one or more remote computing devices capable of communication with the computing system through at least one communication network; (ii) categorizing the legal parking related data by data type comprising at least one of: commercial vehicle legal parking related data or non-commercial vehicle legal parking related data; (iii) receiving, from the one or more computing devices, user data; the user data comprising data selected from the group comprising: an identified location, a present time, and a user type of the user; (iv) retrieving, from at least one of the one or more databases, the legal parking related data relevant to the user type; (v) identifying, based on at least one of the legal parking related data and the user data, one or more potentially available legal parking locations for the user; (vi) generating, based on the one or more potentially available legal parking locations, one or more notifications comprising the legal parking related data; and (vii) transmitting the one or more notifications to the one or more remote computing devices. In addition, the data type further comprises at least one of legal parking related data based on type of vehicle or legal parking related data based on type of vehicle plate.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings in conjunction with the following description. The drawings are not intended to limit the scope of this invention, which is set forth with particularity in the claims as appended or as subsequently amended, but merely to clarify and exemplify the invention.

Accordingly, a more complete appreciation of the present invention and many of the attendant aspects thereof may be readily obtained as the same becomes better understood by reference to the following detailed description when considered in conjunction with the accompanying drawings, where.

DETAILED DESCRIPTION OF THE INVENTION

Figure 1:
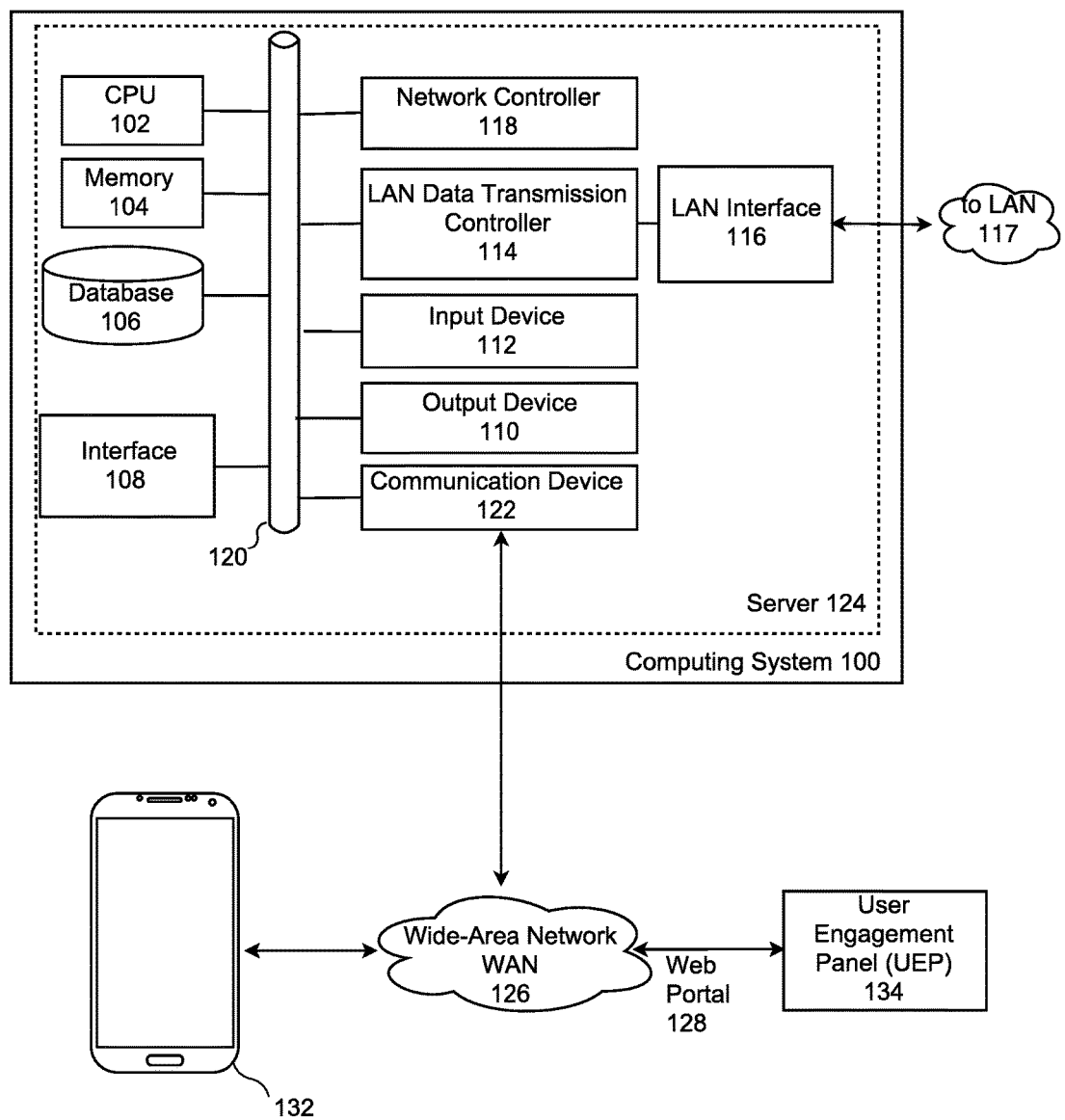
FIG. 1 is a schematic diagram illustrating a system for identifying potential legal parking in accordance with an exemplary embodiment of the present invention.

The present disclosure is not intended to be limited to the specific terminology so selected, and it is to be understood that each specific element includes all technical equivalents which operate in a similar manner. As required, a detailed illustrative embodiment of the present invention is disclosed herein. However, techniques, methods, systems, compositions and operating structures in accordance with the present invention may be embodied in a wide variety of sizes, shapes, forms and modes, some of which may be quite different from those in the disclosed embodiment. Consequently, the specific structural, functional and step-by-step details disclosed herein are merely representative, yet in that regard, they are deemed to afford the best embodiment for purposes of disclosure and to provide a basis for the claims herein which define the scope of the present invention.

In the following detailed description, specific embodiments that may be practiced are shown by way of illustration and explanation. The embodiments are described in sufficient detail to enable those skilled in the art to practice the embodiments, and it is to be understood that the logical, mechanical, and other changes may be made without departing from the scope of the embodiments. The following detailed description is therefore not to be taken in a limiting sense. In describing exemplary embodiments of the present invention illustrated in the drawings, specific terminology is employed for sake of clarity. However, the present disclosure is not intended to be limited to the specific terminology so selected, and it is to be understood that each specific element includes all technical equivalents which operate in a similar manner.

The term "driver(s)" herein may be used interchangeably with "user(s)," which is intended to encompass driver(s) and include those individuals who might not be drivers but, nevertheless, receive assistance or provide assistance by using the present invention. In addition, "user" is also intended to cover a wide array of subjects. A "user" may generally encompass private individuals and entities through its one or more representatives interested in finding potentially available legal parking; in essence, the word "user" is intended to describe any interested individual or interested individuals affiliated with entities registered with the present invention, not limited only to private individuals, such as artificial intelligence or self-driving vehicles. The terms "parking citation(s)," "parking ticket(s)," or "parking violation citation(s)" may be used interchangeably, and their meanings may be the same (e.g., ticket(s) received by a driver for a parking violation).

An exemplary embodiment of the present invention, as described herein, is not limited to applications involving conventional computer programs or programmable apparatuses that run them. It is contemplated, for example, that embodiments of the invention could include an optical computer, quantum computer, analog computer, or the like. Each element in the flowchart illustrations herein may depict a step, or group of steps, of a computer-implemented method. Further, each step may contain one or more sub-steps. For purposes of illustration only, these steps (as well as any and all other steps identified and described above) are presented in a particular order. However, it will be understood that an embodiment of the present invention can contain an alternate order of the steps adapted to a particular application of a technique disclosed herein.

According to an exemplary embodiment of the present invention, multiple "data types" corresponding to multiple "user types" may be disclosed herein. Though the present invention might be contemplated for use with numerous types of data corresponding to numerous types of users, it is also contemplated that the present invention be used to process one type of data for one type of user (e.g., only processing taxi related data and notifying taxi drivers about legal parking for taxis, or only processing truck data and notifying truck drivers about legal parking for trucks). In addition, it is also contemplated, and falls within the scope of the present invention, that data types and/or user types might be combined or separated in any conceivable manner. In another example, truck and taxi related data might be processed to alert truck and taxi drivers about legal parking for trucks and taxis, respectively. It will be obvious to one of ordinary skill in the art that embodiments of the present invention as described herein are intended as exemplary descriptions.

All such variations and modifications are intended to fall within the scope of this disclosure. The depiction and description of steps in any particular order is not intended to exclude embodiments having the steps in a different order, unless required by a particular application, explicitly stated, or otherwise clear from the context. The elements depicted in flowchart illustrations and block diagrams throughout the figures imply logical boundaries between the elements. However, according to software or hardware engineering practices, the elements depicted and the functions thereof may be implemented as parts of a monolithic software structure, as standalone software modules, or as modules that employ external routines, code(s), services, and so forth, or any combination of these. All such implementations are within the scope of the present disclosure.

In the description of the figures below, it is understood that the details described above may be combined with or used in place of similar attributes described below and that the figures are used only to illustrate a particular exemplary embodiment the present invention. It is to be understood, that for the purpose of providing simplified figures that are easy to understand, many of the details above have been omitted from the figures. However, it is contemplated that the details described above may be incorporated into the approach of the description below in any feasible manner. Exemplary embodiments described herein are illustrative, and many variations can be introduced without departing from the spirit of the disclosure. For example, elements and/or features of different exemplary embodiments may be combined with each other and/or substituted for each other within the scope of this disclosure.

In view of the foregoing, it may now be appreciated that elements of the schematic diagrams and flowchart illustrations support combinations of elements for performing the specified functions, combinations of steps for performing the specified functions, program instruction media for performing the specified functions, and so on, whether the steps are performed automatically or not.

An exemplary embodiment of the present invention comprises to the implementation of a system and method through a combination of hardware and software that operates on a portable computing device, which further comprises various pre-programmed features combined and integrated with components including but not limited to one or more servers, databases, mobile end applications, web portals, network settings, etc. With the support of these components, information may be provided through user interfaces, such as a website, an application, or an in-vehicle navigation system. In addition, there may be one or more servers that may be in a distributed structure with support from data centers that may be located anywhere around the world. These implementations may be communicatively linked and cross-platformed with the electronic map display, indicators which convey legal parking related information, profile, setting information, etc., so that a user on a computing device may be provided with legal parking related data relevant to a specific location.

It will be appreciated that computer program instructions may include computer executable code. A variety of languages for expressing computer program instructions are possible, including, but not limited to, C, C++, Java, JavaScript, Python, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more threads. The one or more threads can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing or the like. Therefore, embodiments that execute or process computer program instructions, computer-executable code, or the like can suitably act upon the instructions or code in any and all of the ways just described.

The invention may be described in the general context of computer-executable instructions, such as program modules, being executed by a computer. Generally, program modules include routines, programs, objects, components, data structures, etc., that perform particular tasks or implement particular data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system. It is to be appreciated that any of the software components of the present invention may, if desired, be implemented in ROM (read-only memory) form.

An exemplary embodiment of the present invention may be used by users of different user types, where "users" can be members of the general public and/or computer systems which include but is not limited to: professionals, civilians, vehicles, websites, robots, in-vehicle systems, global positioning satellites (GPS), and/or other systems. It is also intended that the present invention may be used not only within an application of a computing device 132, which may include smartphones, tablet computers, laptop computers, in-dash vehicle systems, etc., but may also be enlarged to encompass other systems or services which may process, utilize, and display the legal parking related data, for example, contributions to the field of information services for online mapping companies and GPS manufacturers, smart phone or mobile device manufacturers, wireless service providers, application creators and developers, and mobile operating system developers and distributors, automated vehicle systems such as self-driving vehicles, etc.

Referring first to FIG. 1, depicted is a schematic diagram illustrating a system for identifying potentially legal parking in accordance with an exemplary embodiment of the present invention. System components in communication with the computing system 100 may include computing device 132, WAN 126, web portals 128, and a user engagement panel 134. According to an exemplary embodiment of the present invention, a combination of hardware and software operates on an application of a computing device 132 and a computing system 100, such as a computer, generally with one or more connections to a wireless wide-area network 126 (WAN) (e.g., the Internet).

Computing system 100 may include, for example, a server 124 comprising one or more of the following: a central processing unit (CPU) 102, a memory unit 104, a database 106, an interface 108, an output device 110, an input device 112, (e.g., a keyboard, mouse, scanner, etc.), a local area network (LAN) data transmission controller 114, a LAN interface 116, a network controller 118, which can be connected to PSTN (public switched telephone network), and an internal bus 120. As shown, the system may be connected to a data storage device, for example, a hard disk comprising a database 106 via a link. The computing system 100 can include one or more servers configured the same or similar to the server 124 shown in this depiction, or one or more servers configured in a different manner, which may include different hardware or software. For example, the computing system 100 may comprise multiple servers hosted in multiple spaces such as data centers or server farms.

Computing system 100 may be configured to communicate with a network service coordinated through communication device 122. According to an exemplary embodiment of the present invention, communication device 122 may include any approach for communicating data over one or more networks or to one or more peripheral devices. Communication device 122 may include, but is not limited to, circuitry and control systems for providing wireless connections, wired connections, cellular connections, data port connections, Bluetooth connections, or any combination thereof and the device or means may include devices enabled to communicate using such communications approaches. One of ordinary skill in the art would appreciate that there are numerous approaches for communications that may be utilized.

Server 124 and computing system 100 may also be communicatively linked, through communication device 122 and WAN 126, to peripheral devices such as a computing device 132. According to an exemplary embodiment of the present invention, a computing device 132 may be a device which allows a user to interact with the computing system 100. Through computing device 132 and a web portal 128, the user can access a remotely or locally provided user engagement panel 134. The computing device 132 may be a handheld mobile device, an in-vehicle navigation system, or another device or system such as a laptop computer, desktop computer, tablet, etc. The user engagement panel 134 according to an embodiment of the invention may be a discussion board that can be accessed through an interactive display on the computing device 132, which allows users to hold discussions relating to parking, and which might include recommendations for finding legal parking, suggestions for disputing tickets, a way for users to assist each other with meter fees, etc.

Figure 2:
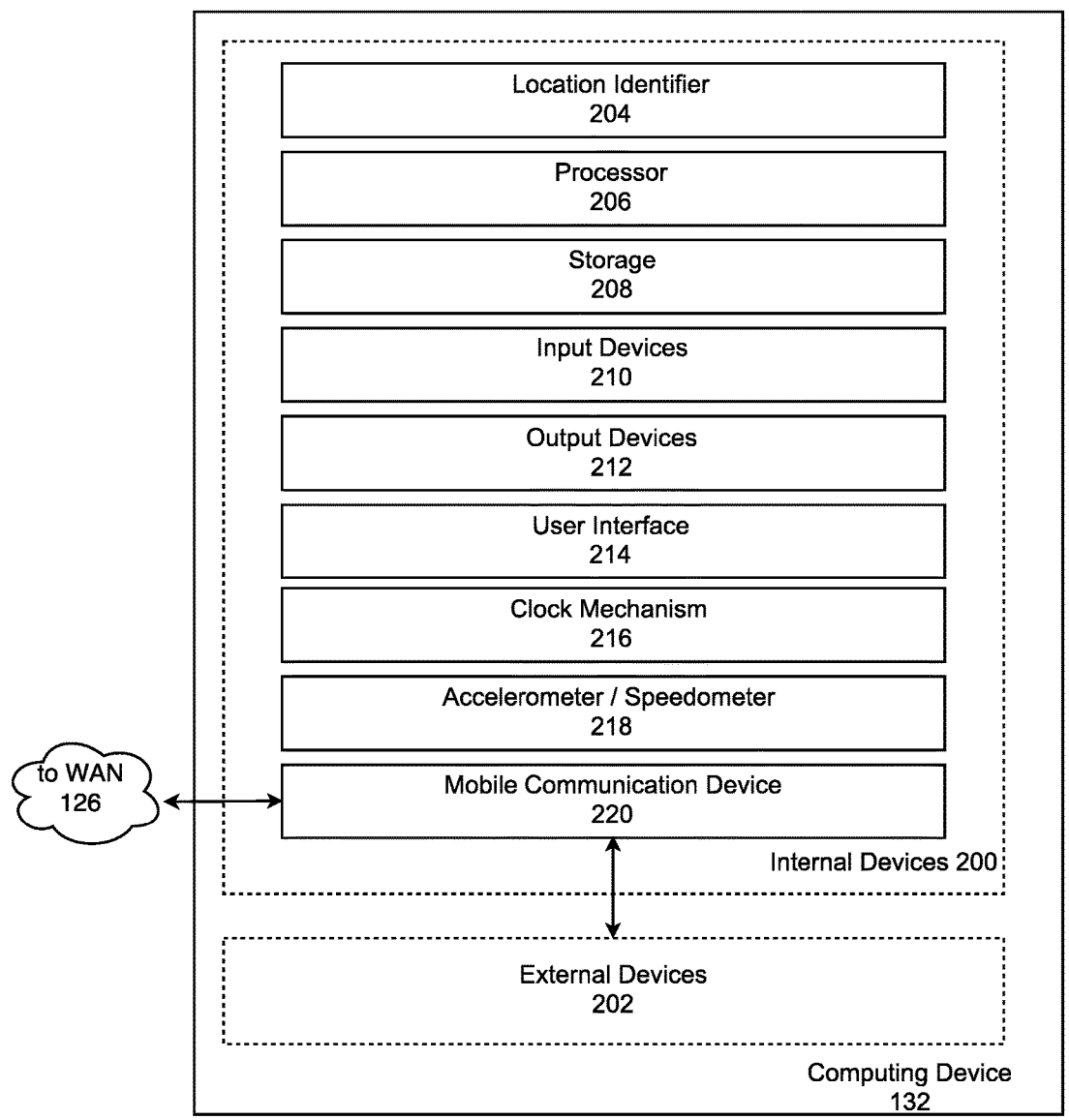
FIG. 2 is a schematic diagram illustrating the composition of a computing device for reporting parking violations and receiving a notification with legal parking related data, among other things, in accordance with an exemplary embodiment of the present invention.

Turning to FIG. 2, shown is a schematic diagram illustrating the configuration of a computing device 132 for enabling a user to interface with computing system 100 and for reporting parking violations, for reporting other information relating to potentially available legal parking locations, as well as receiving a notification with legal parking related data, all in accordance with an exemplary embodiment of the present invention. Remote computing device 132 may be in communication with all its components, tangible or intangible, and may incorporate internal devices 200 and external devices 202. Remote computing device 132 may also include and utilize mobile communication device 220 for receiving voice, text, and data for connecting to the computing system 100 such as over a WAN 126. A location identifier 204, such as a GPS receiver, may also be included in remote computing device 132 for identification of a present location. The location identifier 204 may determine the location of a remote computing device 132 in different ways, for example, through receiving location-based resources. One of ordinary skill in the art would appreciate that there are numerous approaches for providing location identification and location based services. In one example, the location identifier 204 can be instantiated through processing of received GPS data from location-based or geo-aware resources of the computing device 132. In addition, the location identifier 204 can also receive GPS data from other applications or programs that operate on the computing device 132. For example, computing device 132 may communicate with one or more other applications using one or more application program interfaces (APIs). The application can use the location information to cause a user interface component to configure a user interface framework based on the location information.

Computing device 132 may also include one or more of processor 206, storage 208, input devices 210, output devices 212, user interface 214, clock mechanism 216 and/or accelerator/speedometer 218. Processor 206 may be used for executing instructions, software, or program modules on the computing device 132. The remote computing device 132 may also contain storage 208, such as random-access memory (RAM) or flash storage. Input/output ("I/O") devices 210 may be used to connect the computing device 132 to other system implements, especially depending on the available functionalities of a computing device 132. For example, an in-vehicle navigation system might not have a camera, while a mobile device may have a built-in camera. In this instance, a mobile device's camera may be used as an input for the in-vehicle navigation system. Other I/O devices 210 may include a scanner, a microphone, a speaker, etc. The remote computing device 132 may also include a display 212, which may display a notification or other data to a user received from the computing system 100. The display 212 may, for example, be an electronic touchscreen display such as an LCD display, an LED display, or an active-matrix organic light emitting diode (AMOLED) display. The computing device 132 may also utilize an internal clock mechanism 216 to determine the time at any given moment during its use. An accelerometer or a speedometer 218 may also be in communication with the computing device 132, which may be used to measure speed, acceleration, directional changes, etc. An exemplary embodiment of the present invention may also implement a user interface 214, where content is displayed based on other user selections and preferences.

One or more of these components of remote computing device 132 might be combined to provide user features that are specific to user selections and user locations, and/or real-time conditions to enable a user to receive legal parking related information. These selections can be displayed to the user, and the user can use the user interface 214 to interact with information. For instance, the user interface 214 can correspond to a program that is downloaded onto a smartphone or other portable computer device such as a tablet computer or personal digital assistant (PDA). A user can download and install the application on a remote computing device 132 and register. An exemplary embodiment of the present invention may utilize pre-programmed features combined based on certain protocols or methods of integration of basic components, such as servers, databases 106, mobile end applications, web portals, network settings, etc., where the applications could be applications written for ANDROID, a mobile platform developed by Google and the Open Handset Alliance, IOS, a mobile platform developed by Apple, Inc., WINDOWS PHONE, a mobile platform developed by Microsoft Corporation, etc.

According to an exemplary embodiment of the present invention, a possible user interface 214 may include, but is not limited to, a homepage user interface, access to the user engagement panel 134, which may be used for one or more users to share ideas about finding legal parking, a summary interface, a location user interface, a database 106 access interface, or a combination of any of the features described. One of ordinary skill in the art might appreciate that there are numerous user interfaces that could be utilized or contemplated for use with any appropriate user interface 214. External devices 202 may also be connected to the remote computing device 132 through either a wired or wireless connection, and may be one or more devices that could provide additional or enhanced functionalities to computing device 132, whether it be a mobile device such as a tablet or smartphone or an in-vehicle navigation system or other computing device, etc. According to an exemplary embodiment of the present invention, the computing system 100 can retrieve a user's information and other data that is stored in the database 106. In some implementations, the database 106 can be stored remotely and user information can be retrieved from there.

Other integrated devices may include utilization of vehicle equipment, for example cameras, inertial sensor, gyroscope sensor, GPS sensor, and any other applicable equipment, etc. Utilization of this vehicle equipment may be used to obtain comprehensive real-time and historical activity information about the vehicle, for example its direction, speed, orientation and acceleration, etc. in order to issue an applicable and accurate notification to the user. An exemplary embodiment of the present invention can, for instance, be integrated with in-dash systems to enable full function within a vehicle. This integration is not limited to in-dash systems and may also be integrated in the vehicle by original equipment manufacture or third-party add-on equipment that may be mounted within a vehicle. The present invention uses direct integration of the disclosed parking space information system into the navigation and GPS in an onboard computer of original equipment manufactured vehicles. In such embodiments, the disclosed architecture can be integrated directly into a vehicle's computer system.

When integrated into an in-dash navigation system, the vehicle's display may be used to show a legal parking related notification in accordance with an exemplary embodiment of the present invention as described above. The in-dash integrated system embodiment can provide remote updates and communications to the user through an installed legal parking application on the user's computing device 132 to notify the user for example, when the parking time limit is approaching its expiration, impending street cleaning or street cleaning which just ended, or of other legal parking related data. The installed legal parking application can run on the computing device 132 and utilize resources which may include microprocessor, memory, GPS, wireless connection and display. The invention may be useful with respect to automated vehicle systems, such as self-driving cars, where data can be integrated in to the vehicle's navigation system and notifications can be sent directly to the vehicle. Though self-driving vehicles do not require drivers, the vehicle itself is still subject to parking violations that may be issued to the owner of the vehicle. Legal parking notifications integrated with the automated vehicle's navigation system may help the owner of an autonomous vehicle to avoid parking violations as the owner may not be present at the time the vehicle is in operation and in need of parking.

An exemplary embodiment of the present invention may optionally include a geographical information system (GIS) to capture, display, and otherwise analyze data. The GIS may integrate an electronic or digital map, for instance, as a layer (such as GOOGLE MAPS, which is an electronic mapping service provided by Google, a subsidiary of Alphabet Inc., etc.) to be viewed on a computing device 132. With this integration, roadways may be displayed from a map database which presents the analyzed data as to the location of potentially available legal parking and route planning to a parking zone with a greater potential of finding legal parking, where the options can be displayed to the user to help plan his or her route accordingly, or see automatically generated suggestions about routes, etc. For example, the user can be given a suggestion of a potential route to a parking zone where there is more available legal parking than in another area. Since parking locations may be occupied by vehicles of non-users and therefore might not be accounted for, the suggested route may direct the user to a parking zone with a greater number of available legal parking identified by registered users. However, a user may have the option to select an alternate route based on additional route criteria. For example, a user may select a parking zone based on distance even though the closer parking zone has less available legal parking. The GIS may integrate different layers, and data points with similar attributes can then be isolated and output as a layer. That output layer could show instances of certain data points that have similar attributes. Then, an inventory of other data points such as meter parking, locations of bus stops, commercial vehicle parking, taxi lanes, bus lanes, bicycle lanes, emergency lanes, locations of parking garages/facilities, street parking locations, parking restrictions, locations of fire hydrants, etc., can be gathered and applied through a GIS and output to the user's computing device 132 and visualized on a base map. This provides a way to usefully sort, access, and send the data to users of the computing device 132.

The GIS might include certain hardware, which might be another computing device or secondary device attached to it that enables the GIS to be functional, and software such as algorithms written using executable programming languages to store, analyze, and display geographical data and information. The GIS can be used to process certain data such as parking locations, maps, etc. According to an exemplary embodiment of the present invention, the GIS might be maintained by a technician, or other qualified personnel, with knowledge of upkeep procedures, especially those concerned with adjusting system functions to what might be required of a GIS.

Figure 3:
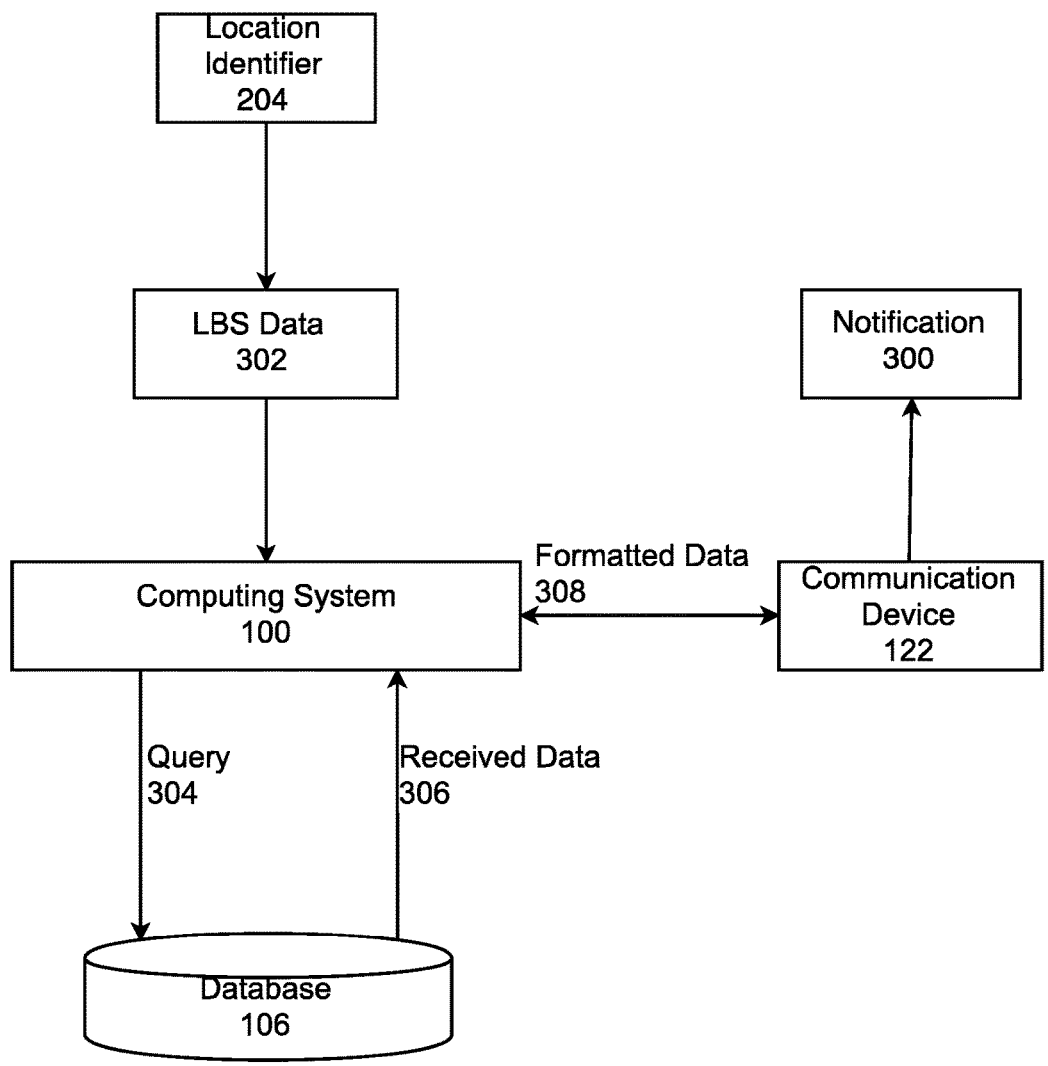
FIG. 3 is a schematic diagram illustrating a system and method for generating and transmitting a notification in accordance with an exemplary embodiment of the present invention.

Next, FIG. 3 shows a schematic diagram illustrating a system and method for generating and transmitting a notification relating to the identification of legal parking, illegal parking, areas of available legal parking, and the like, in accordance with an exemplary embodiment of the present invention. In operation, remote computing device 132 connects to the computing system 100 in order to transmit a notification when relevant. According to an exemplary embodiment of the present invention, a user may be provided with a visual and/or audio notification. The computing device 132 and/or the location identifier 204 send location-based services (LBS) data 302 to the computing system 100. When certain conditions are met (e.g., the user shows parking intent or manually requests parking information) the computing system 100 can query 304 data in the database 106. The computing system 100 might use a user type of the user (e.g., the user drives a Camry with commercial plates), which can be cross referenced with the location of the user (e.g., approximate address, geolocation, etc.) and the time (e.g., time of day, week, month, season, etc.) and identify relevant data for generating a notification, and tailor it to the user's customizable preferences (e.g., how the user wants to be notified, when the user wants to be notified, how many times the user wants to receive a notification, a time the notification(s) is/are issued, a distance to an intended destination, an amount of time before a user reaches an intended destination, a form of the notification(s), a number of times the notification(s) is/are requested, a content of the notification(s), and a location where the notification(s) is/are issued, etc.). The computing system 100 may periodically query 304 certain data sets in the database 106 to keep requests current or to look for new or different information in the database 106. Alternatively, the computing system 100 might access the database 106 using specific APIs, by subscription, or by this data being pushed as it is made available. During the process, the computing device 132 may connect with internal devices 200 and external devices 202 in order to communicate with the computing system 100 to relay data (i.e., time, date, location etc.), receive a notification, and process and display that notification to the user.

In an embodiment, the customizations may not be based on user preferences but may be automated from collected data from the database. The system may use a customization based on a predetermined number or percentage of users selecting a specific preference, or based on reasons, or based on randomization. For example, the system is using 75% as a predetermined percentage of users, so if 90% of users choose to be alerted one time for a specific location, then the system may automatically customize a one-time alert for that location. In another example, a majority of users chose to receive recommendations at a specific location, so the system automates recommendations for users at that location. Thus, customizations may be discretionary and selected by users, or may be automated by the system based on past user data.

The received data 306 from the database 106 based on the query 304 may be formatted at the computing system 100. The formatted data 308 can then be transmitted as a notification 300, through the communication device 122. To generate notification 300, the computing system 100 may query 304 different data sets within the database 106 (e.g., any historical citation information currently available; the user's identified location and present time; or any administrative notices or temporary notices applicable to the user type of that user, present location, and present time, etc.). Furthermore, the computing system 100 can search for weather related information, where weather patterns or conditions could have an effect on parking rules and regulations.

Notification 300 can be configured to be integrated with an interactive electronic map API or displayed on an electronic screen. A notification 300 that is specific for a commercial vehicle, for instance, might include specifically relevant information for commercial vehicle users in it. The information contained within a notification 300 can be based on specific data from the combination of data for commercial vehicles, as the notification 300 may be selectively issued based on the user's user type, further based on type of vehicle and type of vehicle plate. A notification may be short, conveying legal parking related data applicable to the location.

The computing system 100 may alert the user to potentially available legal parking locations by notifying the user through email, text message, phone call, phone alert, voice mail etc., automatically at the choice of the user who set this in advance in the settings. A notification 300 to the user can include reasons for the availability or unavailability of parking, such as if the legal parking is currently occupied or not. While referenced as "reasons," one of ordinary skill in the art would appreciate that in practice this phrase could be described in numerous manners, including, but not limited by phrases such as "cause," "explanation," or any other terms. No matter what term is used, the key point is that the term may be used herein to describe that the user is given an explanation as to why parking is unavailable or illegal at a given location.

In addition to reasons for legal parking availability, notifications may also provide recommendations for where the user may find available legal parking. For example, if a user is near a location where prohibited parking time limits are about to expire, the notification 300 may recommend to the user that parking at that location might become available in a given amount of time. While referenced as "recommendation," one of ordinary skill in the art would appreciate that in practice this phrase could be described in numerous manners, including, but not limited by phrases such as "suggestion," "advice," or any other terms. No matter what term is used, the key point is that the term is herein to describe an alert issued to a user about available legal parking and/or illegal parking in order to secure a legally available parking spot while avoiding parking violations.

According to an exemplary embodiment of the present invention, the system may display a comparison of parking rules applicable at different jurisdictions. The comparison may be displayed in different ways, such as a notification 300, through the user engagement panel 420, or by any other format. The comparison is made based on the information obtained from the user data provided from the user, such as driver license, driving history, preferences, etc. The system may use not only the driver license itself, but information associated with the driver license, such as the city, town, state, and authorities that issue the parking rules for the driver license jurisdiction, and which parking rules apply in that jurisdiction. For example, the system may compare rules that apply at the current location with the rules of the state that issued the user's driver license. A comparison of the relevant rules is necessary to notify users of the differences between the rules of their current locations and those from where the user's driver license was issued. This allows the user to find potentially available legal parking locations in other jurisdictions, or to plan a route to a specific location with more potentially available legal parking locations. This is important because parking rules may differ in different jurisdictions, for instance, local parking rules in one city may not be the same as another city, which has its own parking rules. It is important to identify which rules apply in which jurisdiction so as to provide efficient and accurate information about potentially available legal parking locations. A user may want to plan parking arrangements in advance before traveling to a specific location. The stored legal parking related data from those locations are summarized, compared, and analyzed to alert the user of potentially available legal parking locations, or of parking violations, based on the different parking rules between the user's original location and the current location determined by the user. The user may provide a specific location and view the potentially available legal parking at that specific location within a predetermined distance from the specific location. Or, the user may check the potentially available legal parking and comparison of parking rules of any location at any time. The user may select to view the potentially available legal parking, as well as the comparison of parking, of a specific address, or more broadly, of a specific town, city, jurisdiction, etc. In another scenario, a user may select and compare the parking rules of multiple other locations, for instance, locations that are not related to the user's current location or to the jurisdiction associated with the user's driver license. The differences may then be displayed on the user's computing device 132.

The system may provide this notification 300 automatically, or the user may manually select when and where to receive this notification 300. For example, the user may be able to view the notification 300 information by pressing a button on the screen of the computing device 132 at the location to check for different parking rules. Or, the system may be set to automatically alert the user within a predetermined distance from a determined location. A user may then rate the information on the notification 300 in part or in whole and also report the notification 300 to the system administrator if the user believes there is inaccurate or false information.

As an exemplary embodiment of the present invention records and stores accurate geolocation GPS coordinates (longitude and latitudes) of the user's computing device 132, the notification 300 sent to a user can be customized and localized to the user's location. Since the database 106 stores and analyzes RRLC from different municipalities and/or other authorities, geolocation and applicable RRLC may be matched to send a notification 300 according to the user's user type and current location or a location indicated at a user's request. For example, the location identifier 204 may transmit the location of the computing device 132 to place the user within a particular set of jurisdictions. This function may be useful for a user who drives across local, county, state or country lines and is unfamiliar with the RRLC from different cities, counties, states, countries, etc. The database 106 may have the user's driver license information, as the user may enter and store the information of the driver license with the state or country who issued the driver license when registering a profile. Using the location from where the user's driver license was issued with a user's current location data, the computing system 100 may send a notification for different rules or a summary of different parking rules to the user according to the location as it changes. Optionally, the user may press a button on the display of the computing device 132 to view the summary of the different parking rules when comparing the location of the entity that issued the user's driver license with the user's current location.

An exemplary embodiment of the present invention may also be integrated with third-party weather APIs to retrieve historical weather information for general or specific parking zones to predict future parking situations where weather may have an impact on legal parking availability based on indications of increased issuance of parking violations during certain weather conditions. For example, if the computing system 100 detects through a weather API an identified location that the user is looking for available parking in a location subject to any expected snowfall or flooding, it may compare this information to the historical legal parking related data within the database 106 to find out if there may be any weather-related parking restrictions and increasing number of parking violations in the zone which may be applicable. The user may receive a notification when the weather forecast is similar to situations from historical data that reflect an increase in the number of violations for a certain area due to the same weather conditions. For example, the historical data for a certain location showed an increase in parking violations when there is snowfall, such as an increase in parking violations as a result of the snow covering up a fire hydrant, leading drivers to believe they can park in the location since they cannot see the fire hydrant.

According to an exemplary embodiment of the present invention, a user may customize notifications 300 in accordance with his or her preferences. Thus, in addition to having a notification 300 issue on the basis of the data type corresponding to at least the user type that the user belongs to, the user can optionally specify further what he or she does or does not want to be notified about, which may result in precluding a single notification or a whole category of notifications. The notification preferences may include, but are not limited to time(s), location(s), distance to an intended destination, time before an intended destination, form or format of the notification(s), content of the notification(s), number of times the notification(s) is/are requested, a time the notification(s) is/are issued, an amount of time before a user reaches an intended destination, and a location where the notification(s) is/are issued, etc. As to time(s), a user may want notifications on nights and weekends while being turned off during business hours, or can make other customizations to limit notifications to certain times. As to location(s), a user who often parks in the same area each day could specify that the notification 300 relevant to that parking location might not need to be displayed, as the user may be familiar with the rules. As to distance to an intended destination, a user may predetermine a distance to an intended destination at which he or she would like to start receiving notifications. As to time before an intended destination, a user may predetermine an amount of time before an intended destination that he or she would like to start receiving notifications. As to format, a user may want to receive notifications in the form of text, image, audio, video, etc. or a combination of any. As to content, a user can specify the type of information he or she would like to see in a notification 300. For example, a user may specify that he/she does not wish to see any image of a sign or signage, instead opting to simply view a short description of that sign or signage. As to number of times, a user may also set the number of notifications the user would like to receive. For example, a user may want to receive an inquiry or notification once or twice, or the user might not want to receive any notification, etc. If the user does not respond to the notification 300, the computing system 100 may stop sending the notification 300 after it repeats for the number of instances set by the user. Whole categories of notifications 300 or specific parts of each notification 300 may be able to be turned off, too. For example, a user might not feel the need to see a notification 300 that serves as a reminder to pay meter fees or any other legal parking related data that the user feels to be well informed about. However, these are only examples and not intended to limit in any way the time customization that the user can specify with regards to which a notification 300 is issued, nor is it intended to limit what information does get incorporated into the database 106.

Figure 4A:
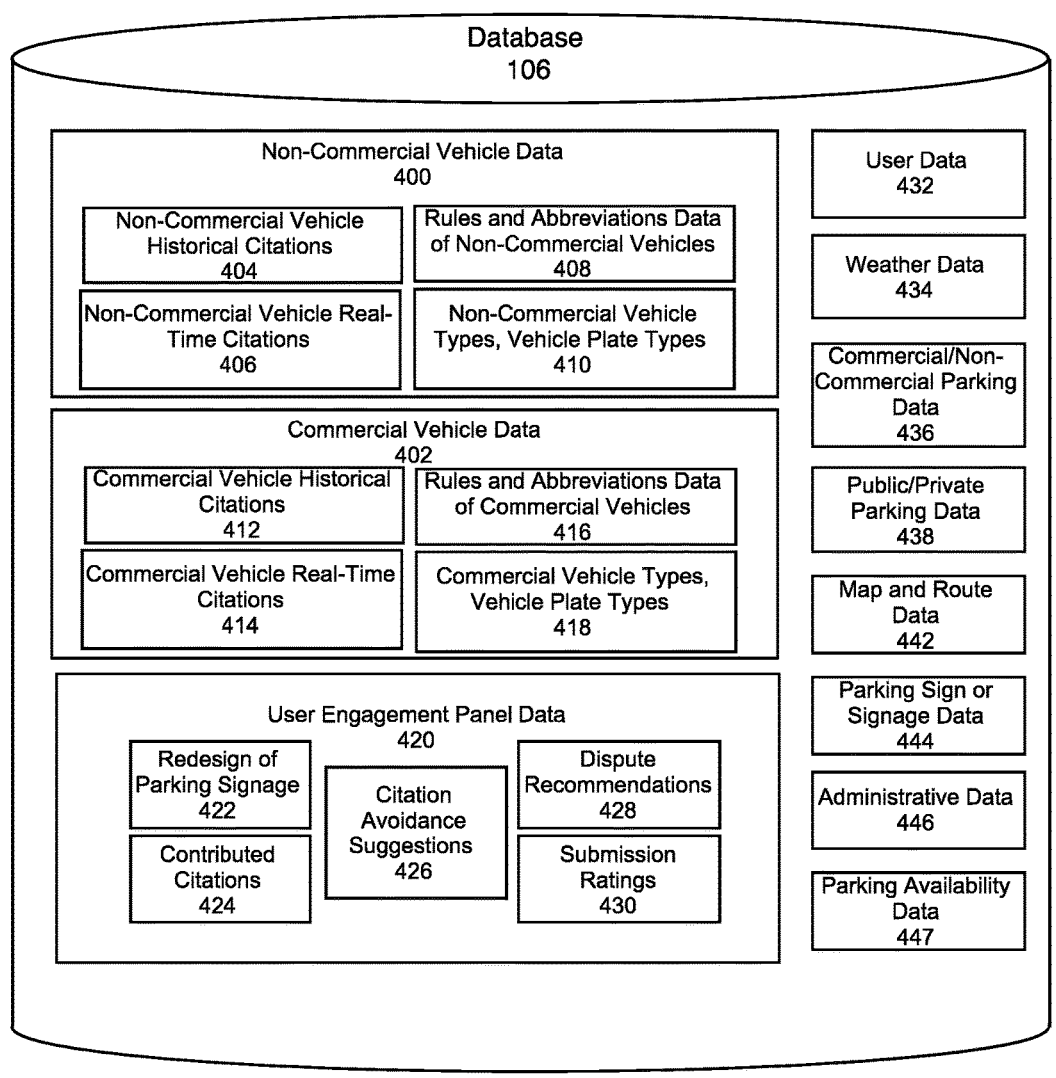
FIGS. 4A-4B are schematic diagrams illustrating database content and organization in accordance with exemplary embodiments of the present invention.

As seen in FIG. 4A, a schematic diagram illustrating the content and organization of database 106 in accordance with an exemplary embodiment of the present invention, the system may use a database 106 or a set of databases (or data storage media) disposed on a hard disk, one or more hard disks, or other storage means. In an exemplary embodiment of the present invention, the information in the database 106 may be stored in a non-relational or unstructured manner. One of ordinary skill in the art may appreciate that there are numerous methods for providing, storing, and organizing data in a database 106 or other data storage media. Additionally, there may be at least one backup database that may back up a primary database periodically in case of data loss in the primary database. While referenced as a "database," one of ordinary skill in the art might appreciate that in practice this could be implemented in numerous manners, including but not limited to a data storage medium, whether structured or unstructured, relational, or otherwise. One of ordinary skill in the art would also appreciate that there are numerous methods of providing databases and data storage media for the organization and retrieval of specific information, contemplated for use with any appropriate database 106 or other storage means. Further, as stated, the exemplary embodiments disclosed herein are contemplated for use with one type of data processed and stored corresponding to one type of user, though certain embodiments of the present invention may incorporate multiple types of data corresponding to multiple types of users, or one type of data corresponding to multiple types of users, or multiple types of data corresponding to one type of user.

According to an exemplary embodiment of the present invention, legal parking related data can be categorized in the database 106 according to different data types or data sets. For example, drivers of non-commercial vehicles may receive tickets for parking in commercial vehicle only standing zones, which only permit commercial vehicles to load and unload cargo. Therefore, the database 106 may store a record of citations that may include citation data from non-commercial vehicles 404, 406 and citation data from commercial vehicles 412, 414, which may be labeled and sorted accordingly. Legal parking related data based on vehicle type may show different types of vehicles which commit the parking violations. Based on this organization, different types of users may then be issued a notification with the type of data that correspond to at least their user types. A notification may be made more accurate, since citations can be grouped in separate categories depending on the type of vehicle and types of vehicle plate, which may be included in commercial vehicles, non-commercial vehicles, types of vehicles, or types of vehicle plates.

According to an exemplary embodiment of the present invention, user type is intended to cover every type of vehicle that may be subject to or restricted by parking regulations under various legal parking regimes. User types may be categorized into any one or more of the following: commercial vehicle user types, non-commercial vehicle user types, user types based on type of vehicle, user types based on type of vehicle plate, or any other user type. For example, trucks and taxis may be classified differently under the law and each may have its own distinct vehicle plate with parking rules affecting each type of vehicle differently. Therefore, a specific user type may be selected to access legal parking data that is corresponding only to that user type while precluding legal parking data for all other user types. Optionally, a user may select more than one user type to access legal parking data related to only the selected user type. Therefore, a user can receive notifications or updates based on data corresponding to each user type that has been selected, or for just one user type.

In accordance with an exemplary embodiment of the present invention, the database 106 may contain several data categories or groupings that establish data sets, including but not limited to non-commercial vehicle data 400, commercial vehicle data 402, user engagement panel data 420, user data 432, weather data 434, commercial/non-commercial parking data 436, public/private parking data 438, map and route data 442, parking sign or signage data 444, administrative data 446, and parking availability data 447. Non-commercial vehicle data 400 may further include non-commercial vehicle historical citations 404 and non-commercial vehicle real time citations 406, where the real time and historical sections of the database 106 may be independent or synchronized in order to retrieve information from both sections at the same time. All historical legal parking related data in the database 106 may also be corrected, updated, supplemented or otherwise modified by real-time legal parking related data or legal parking related data that had as of yet been unknown or unavailable. Real-time legal parking related data is considered to be real-time when one or more users share legal parking related data immediately. "Immediately" can be within a predetermined period of time close to the present time, such as fifteen minutes from receiving the parking violation or five minutes after street-cleaning is complete, or it may be virtually instantaneous with the present time. If the data does not meet requirements to be considered real-time data, then the data is considered historical data, but it may be used to update other historical legal parking related data already existing in the database 106.

Non-commercial vehicles data 400 may further include rules and abbreviations data (and their common meanings) relating to non-commercial vehicles 408 as used by law enforcement. On a ticket, abbreviations may appear in the area where the officer specifies the violation and/or location of the violation. Abbreviations may be processed and stored in the database 106 by gathering data from publicly available sources to provide the most accurate and up-to-date meanings. The user may be able to check the language to automatically change the abbreviations to plain-language meanings according to location when typing them into the computing device 132. The function may also be used when the user reports a ticket that contains abbreviations. For example, a user may receive a ticket for parking a vehicle in violation of the law at a certain location and intends to report it. The ticket violation may state, the "Place of Occurrence" is "E/S Main St. 0 ft N/of Second Ave." The user may, for example, type the abbreviated language into the computing device 132 when reporting, and then the computing system 100 may automatically change the abbreviations to plain and easily understandable explanations and then convert the address into a geolocation. For example, tickets with confusing abbreviations, "E/S Main St. 0 m N/of Second Ave." would be changed to "East side of Main Street zero meters North of Second Avenue" and then used to create the accurate geolocation through a third party's geolocation API to be entered into the database 106. This geolocation may then be precluded for purposes of identifying potentially available legal parking for a relevant user at a relevant time, because a user has received a ticked for parking illegally.

Non-commercial vehicles data 400 may also include data relating to non-commercial vehicle types and non-commercial vehicle plate types 410, which can be stored in the database 106 as such. This may include types of vehicles that fit the non-commercial vehicle type or have non-commercial vehicle plates for users, so that the users can be grouped properly by data type.

According to an exemplary embodiment of the present invention, the database 106 can also store commercial vehicle data 402. This data set may include: commercial vehicle historical citations 412, including past citations issued to commercial vehicles; commercial vehicle real-time citations 414, including real-time citations just issued to commercial vehicles; rules and abbreviations data of commercial vehicles 416, including abbreviations and rules that apply to commercial vehicle parking citations; and commercial vehicle types and commercial vehicle plate types 418, which include types of vehicles and types of plates associated with commercial vehicles. With respect to the type of vehicle or type of vehicle plate, the data type might correspond to at least the type of vehicle or type of vehicle plate. For example, trucks and taxis may each bear a different type of vehicle plate specialized for their respective industry, although they may both be classified as commercial vehicles, and each of these user types can receive data corresponding to at least a user type while precluding data for all other vehicle types. In other words, data corresponding to a particular user type, may be focused to that user type, whether based on type of vehicle or vehicle plate, or other specification, especially in a scenario where a parking prohibition or parking availability is based on the vehicle (e.g., commercial vehicle parking only).

The database 106 may also include user engagement panel data 420, which may include any information or data submitted by one or more users using the user engagement panel 134. This user engagement panel data 420 may include one or more of the following: submitted redesigns of a parking sign or signage 422 (e.g., to make the parking sign or signage clearer), citations contributed by users 424, which might include the discussion and/or comments related to that contribution, parking citation avoidance suggestions 426 that can be collected from users, which can include suggestions for a specific location or generally, dispute recommendations 428 from users who might give advice to others on effectively disputing parking tickets, and submission ratings 430 for the user engagement panel data 420. Ratings can be used as a way to sort or weight information within the user engagement panel 134 so that users might be able to see the most accurate or helpful information, and so that users who contribute meaningfully for doing so can be rewarded for their contributions.

The database 106 can also include user data 432 (i.e., information about the users), which can include where the user parks or has parked, and possible user registration information, such as the user type selected by the user, etc. According to an exemplary embodiment of the present invention, a user may be asked to register with the service by providing driver license pertinent information such as name, type of vehicle plate, type of vehicle, the state or country issuing the driver license, and an email address to create a user ID for each user of the application. User IDs may be used for the purposes of tracking reports and ratings made by each user. Credit card and/or debit card information may also be requested for subscriber fees for certain services provided for a certified user. A registered user may be allowed to use various features of the application which include but are not limited to reporting data and rating data. The subscriber fees collected may also directly or indirectly fund the monetary or non-monetary rewards implemented as an incentive for providing legal parking related data, including but not limited to received parking tickets. An exemplary embodiment of the present invention may include a user profile database 106 configured to store user information and associations between each user and the user's remote computing device 132 after registering. Once registered, a user may set and change the information in their user profiles, if desired. Settings that may require a user's input or preference may be subsequently changed by the user within the settings (e.g., on/off). For example, the user may change the type of vehicle the user is currently driving. Accordingly, this is also applicable to the type of plate associated with the vehicle. This can be included and stored with user data 432.

Weather data 434 may also be stored in the database 106, which might relate to past weather patterns and how they affect parking availability and the legality of potential parking places. For example, in certain bad weather situations rules regarding metered parking, legal parking time windows and limits, etc. might not be in effect.

The database 106 can also store data relating to commercial/non-commercial parking 436, and public/private parking 438, all of which can include alternative parking locations, government/public, commercial parking garages/facilities, or private garages/facilities where the user can legally park. Alternative lots listed with price and location can be used if a user would like to know in a notification a nearby parking garage, price, drive time to it, how full the garage or a parking lot is or how full certain sections or levels of the garage are, etc. These parking options may be listed with information from third parties, whether government or public parking, commercial parking garages or facilities, or private parking garages or facilities, which may have registered their parking garage information with the computing system 100 (i.e., name, address, price, hours of operation, availability, and height, size, or weight restrictions, if any), and that information can be stored in the database 106 for reference. By having parking garages or facilities register information with the system, the garages/facilities can also indicate in real-time whether parking is available currently or if the garage is full so the computing system 100 may indicate availability when notifying the user, where garage capacity and/or occupancy can be shown through a format that displays how full a garage might be. If the parking garage is full, then it may not be displayed as an available option. Additionally, when the user is viewing the list of alternative parking options, the user may press on the name of the garage whereby the mobile application may automatically start routing the user from the user's current location to the parking garage. In addition, this can be also done with surface lots or other aboveground parking, etc. Furthermore, a user can register and submit that parking in a garage might be full, a submission which can be subject to ratings by other users.

Users may also be allowed to pay for parking directly on a remote computing device 132 if available through a web portal or a third-party API that connects to the applicable parking garages' or facilities' payment systems and/or website. Commercial/non-commercial parking 436 can include surface lots which might be used by patrons of a business or employees at a company which makes a certain amount of parking available. Public/private parking 438 can also include parking spots that individuals might list and offer for free or for a certain price. These types of parking spots might be made available for special events or at any time.

Similarly, map and route data 442 can be stored in the database 106. Map and route data 442 might additionally be stored in an individual map database or within a general database, where map and route data 442 can be queried for ETA information through cross reference with traffic conditions, road density, etc.

The database 106 may also include parking sign or signage data 444, for example, parking sign or signage location information and parking sign or signage images from the websites of various government sources. Parking signs that apply to a user's current location or the location of a vehicle may be automatically displayed for the user on the computing device 132 after a user temporarily stops or parks in a location. In some embodiments, applicable parking signs can be displayed through the user engagement panel and can be rated by the user, or applicable parking signs can be displayed to the user through one or more notifications. Accordingly, a user might not have to physically leave the vehicle to spend time walking to the sign to figure out if parking is allowed, putting them at risk of receiving a ticket during this time. In addition, a concise, easy-to-understand description of the parking rules indicated on the sign may be provided to the user so as to avoid any misunderstanding of the sign, potentially with a translation into another language or explanation in plain language.

The database 106 may also include rules and administrative data 446 as well as user data 432. Administrative data 446 may include, but is not limited to, data related to dispute resolution, quality control, etc. Historical data is kept track of partly by assigning a tracking number or service ID number that would be assigned to ticketing or related information to help refer back to it if it comes into question. Information that could be held within this identification may be information, such as the reason a ticket may have been issued, who or what agency issued it and where it took place, such as address-specific information including house or building number, zip code, borough, city, or state, how much the fine is and how the payment for the service took place if it did.

Figure 4B:
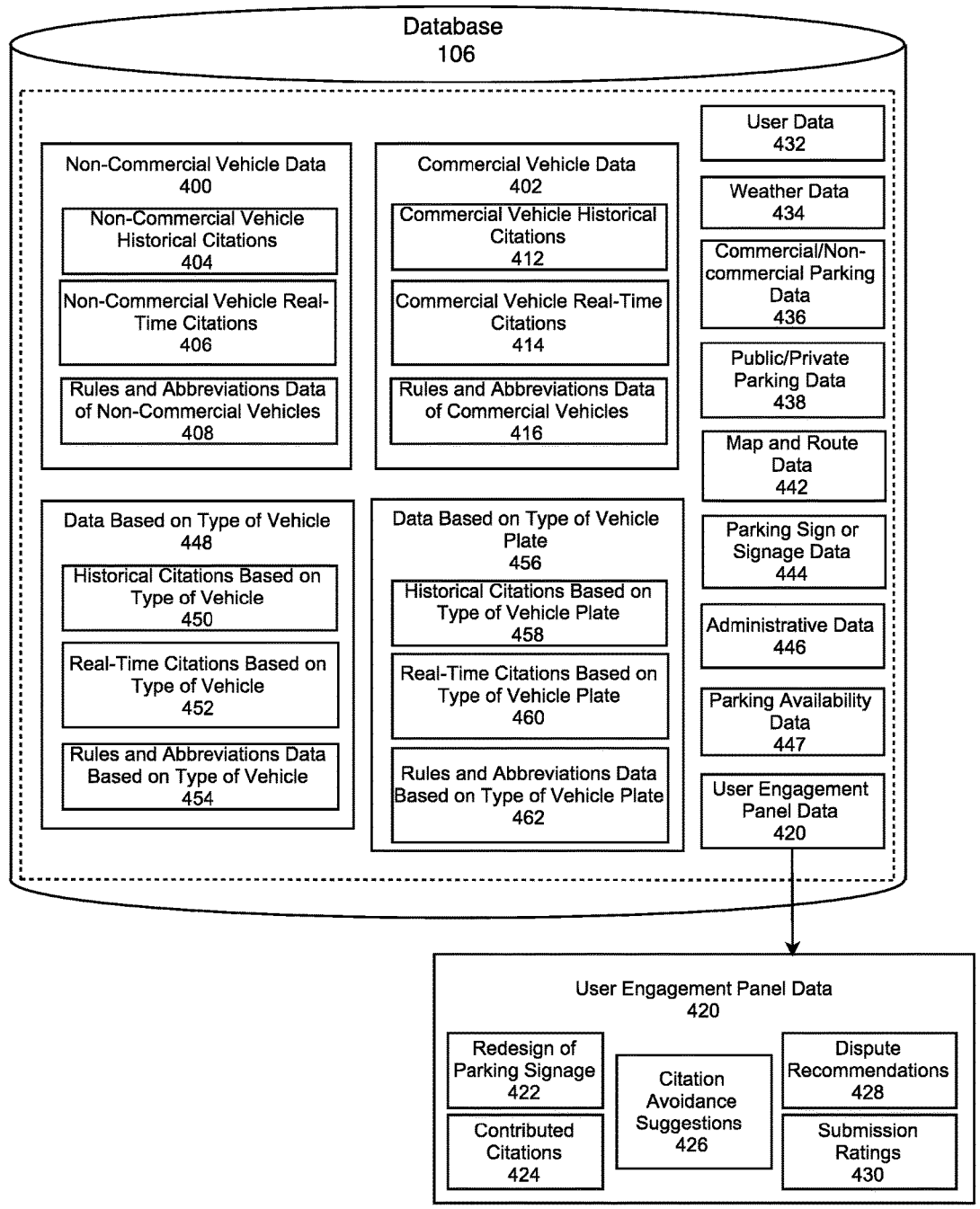

In an alternative embodiment of the database 106 in accordance with the present invention, FIG. 4B shows that the database 106 may contain several data categories or groupings that establish data sets, including but not limited to non-commercial vehicle data 400, commercial vehicle data 402, data based on type of vehicle 448, data based on type of vehicle plate 456, user engagement panel data 420, user data 432, weather data 434, commercial/non-commercial parking data 436, public/private parking data 438, map and route data 442, parking sign or signage data 444, administrative data 446, and parking availability data 447. Non-commercial vehicle data 400 may further include non-commercial vehicle historical citations 404, non-commercial vehicle real time citations 406, and rules and abbreviations data of non-commercial vehicles 408. Similarly, commercial vehicle data 402 may further include commercial vehicle historical citations 412, commercial vehicle real-time citations 414, and rules and abbreviations data of commercial vehicles 416. Data based on type of vehicle 448 may further include historical citations based on type of vehicle 450, real-time citations based on type of vehicle 452, and rules and abbreviations data based on type of vehicle 454. Data based on type of vehicle plate may further include historical citations based on type of vehicle plate 458, real-time citations based on type of vehicle plate 460, and rules and abbreviations data based on type of vehicle plate 462. User engagement panel data 420 may further include redesign of parking signage data 422, contributed citations data 424, citation avoidance suggestions 426, dispute recommendations 428, and submission ratings 430. This organization of data in the database 106 allows for data based on type of vehicle 448 as well as for data based on type of vehicle plate 456 to be its own data set within the database 106.

An exemplary embodiment of the present invention may promote transparency and accuracy of legal parking related data in the database 106 gathered from various sources by utilizing a platform for a user to access the data in the database 106 in a user-friendly application interface. To build the database 106, raw legal parking related data, which may include but is not limited to parking violation citation data, may be obtained from various sources, uploaded, and formatted to include relevant data used for running analysis and providing notifications. This parking violation citation data may be crowdsourced and may comprise real-time or historical data. The uploaded legal parking related data may then be split into two sets of data for cleaning (i.e., updating, correcting, supplementing or otherwise modifying). The first set of data may be legal parking related data which is already verified as to having all the necessary information in the right format, while the second set of data may be legal parking related data that needs to be reformatted to include all the necessary information.

Some of the historical legal parking related data may be provided as public open data from the government agencies and may also be available through a request for records, if not available through public government websites. Legal parking related data, such as parking violation related data, may also be obtained by crawling (e.g., systematic internet browsing) or otherwise connecting to relevant government or law enforcement websites that store legal parking related data for a specific user. However, in order to access such data, prior authorization may need to be obtained from the user to search for that user's legal parking related data, such as issued parking violation citations. Based on that, the computing system 100 might send a notification to the user which provides a warning for pending or unpaid parking violation citations. With the authorization from the user, the information from these citations may be input as data into the database 106 to further build the updated comprehensive database 106 to help identify potentially available legal parking. Although locations identified in such government released legal parking related data might not be as accurate as geolocation coordinates, such data is nevertheless useful. And, to better identify locations from government released data, these locations may be transformed to geolocation coordinates, through any qualified third-party software that provides a location geocoding service for latitude and longitude coordinates, before the citation location data is input into the database 106.

According to an exemplary embodiment of the present invention, the computing system 100 or the system administrator may additionally or alternatively obtain legal parking related data through the input from a user and/or interested individuals as well as private entities, for example, transportation companies, or any other organizations that specialize in transportation who may have access to issued parking violation citations or other legal parking related data. The database 106 may utilize a collection method for the collection of legal parking related data. Legal parking related data may be collected and summarized manually, for example, by a system administrator or system employee, or automatically, for example, by an artificial intelligence algorithm, to correct, update, and supplement the database 106.

It is to be understood by one skilled in the art that the database 106 updates and syncs dynamically whenever there are changes or updates in data blocks. The server and database 106 may dynamically update the data to reflect the latest changes. Any backup database 106 related to the database 106 may also change accordingly to also reflect the latest changes. In an exemplary embodiment of the present invention, such information may be organized or structured in a manner allowing for effective sorting and retrieval.

According to an exemplary embodiment of the present invention, a user may access historical records, may explore the database 106, and may retrieve related data by using a search function or other means. Each time an input or request from a user who wants to see related information is made, a safe access channel with database 106 may be opened and the computing system 100 may send out the query sentences through the access channel to a database 106 management module. If the database 106 is a relational database, then the data tables may have one kind of relationships, such as one-to-many relationships, many-to-many relationships and one-to-one relationships with other data table(s). Based on the relationships between data tables, the database management module follows the query sentences and finds the specific data table(s) by using ID(s), table names and columns names of the tables with or without joining two or more data tables together. If the database 106 is a non-relational database, instead of data tables, the data may be stored in key-value pairs, then the database management module follows the query sentences and finds the specific data by using keys that query sentences provide. Whether a relational or non-relational database is used, after the database management module retrieves the targeted data, the computing system 100 may send a search result back to the server through the secured access channel. Then the secured channel is closed until the next time it is opened. The relevant data that has been organized within the database 106 may thus be retrieved.

The raw legal parking related data entered, processed, stored, and analyzed may include but is not limited to legal parking related data, parking violation related data, parking sign or signage information, alternative parking data, parking availability or unavailability data, parking availability data, street cleaning data, and parking meter data. Parking violation related data may include parking rules and regulations, type of violation, the causes or reasons for the violation, the name of a law enforcement officer who issued the ticket, law enforcement officer comments on the ticket, registration state, plate type, vehicle type, issue date, violation code, violation statutory code, issuing agency, violation time, house number; street name, law section, subdivision, days parking in effect, from hours in effect, to hours in effect, violation description, any other relevant factors, and/or other legal parking related data from the database 106, etc.

Reasons for parking ticket violations may include but are not limited to: standing in a no standing zone, where it is prohibited to wait or stop to load or unload packages or merchandise at curbside and only allows for stopping to expeditiously drop off or pick up passengers; stopping in a no stopping zone, where it is prohibited to wait, stop to load or unload packages or merchandise or drop off or pick up passengers; parking tickets related to blocking areas, such as parking in front of or blocking an entrance, exit, or crosswalk, as well as blocking a mailbox; parking within a prohibited zone based on a distance from a bus stop or fire hydrant; parking too close to a railroad crossing; parking restrictions based on timing such as holiday, parade route, or other special event parking that only applies selectively; or parking prohibitions that relate to double parking, whether for a certain amount of time or any time at all. Some parking prohibitions relate to a revolving schedule, such as street cleaning parking prohibitions, which happen on given days of the week between two different times. Prohibitions can also relate to user oversights, such as remaining parked after a time expiration. Parking tickets can also relate to parking within a zone or area that is restricted to certain types of vehicles or people, such as parking in a handicapped spot or within handicapped zone or in a bike lane, in addition to parking in a private parking zone or a zone with a required permit. Furthermore, parking tickets can relate to prohibitions or limitation for parking for certain for certain kinds of types of vehicles, such as motorcycle-only parking or parking a bicycle in areas banning bicycle parking. In addition, there may be selective zones that have different penalties associated with them, such as parking in a tow-away zone. Thus, parking violation related data may be mined for identifying a potential parking violation applicable directly or by inference at a specific location and for precluding illegal parking locations.

Figure 5A:
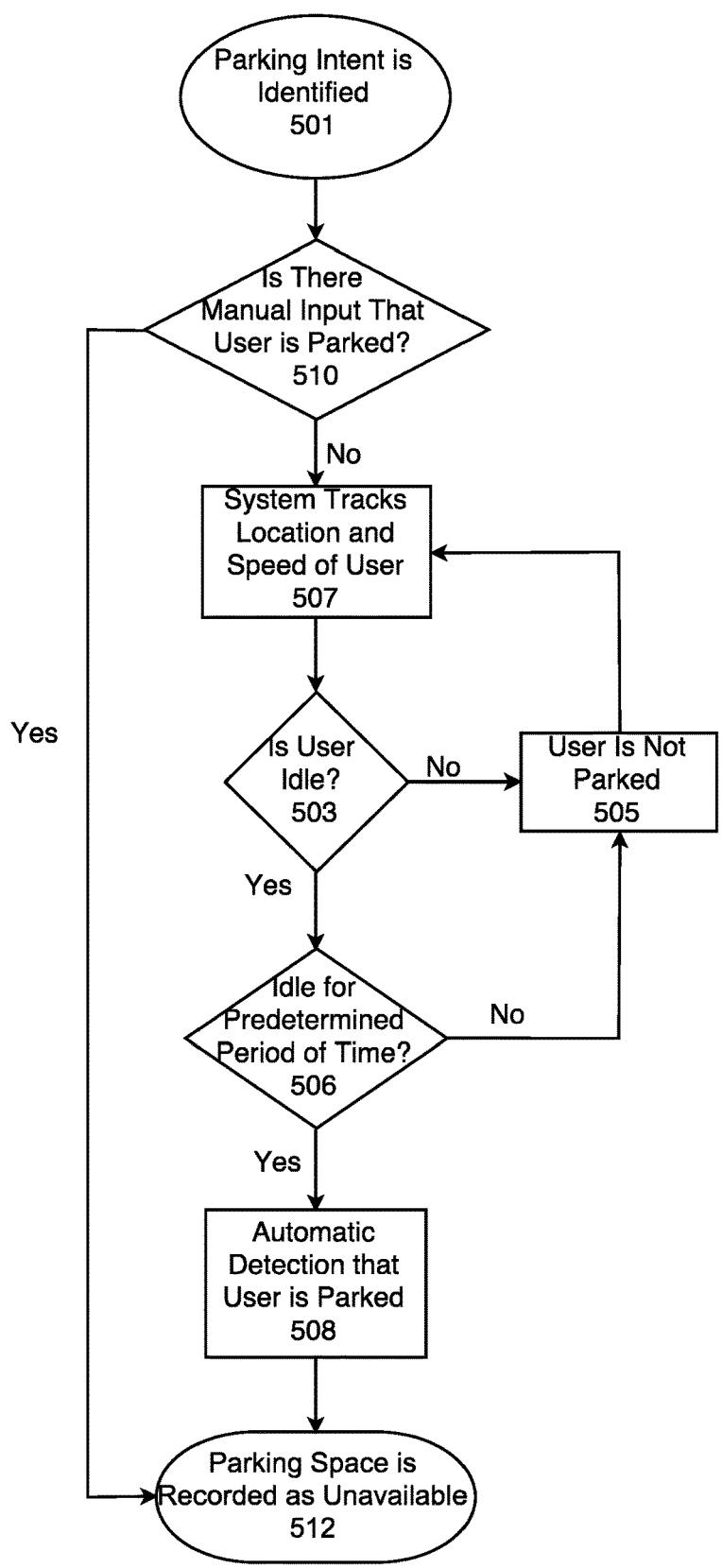
FIGS. 5A-5B are flowcharts illustrating an approach for obtaining and processing parking occupancy related data as part of potentially available legal parking related data in accordance with an exemplary embodiment of the present invention.

Referring next to FIG. 5A, shown is a flowchart illustrating an approach for obtaining and processing parking occupancy, availability, or unavailability related data as part of potentially available legal parking related data in accordance with an exemplary embodiment of the present invention. For purposes of identifying potentially available legal parking locations, in addition to precluding illegal parking locations, parking locations which are identified to be legal but currently occupied are precluded from identification as potentially available legal parking locations as well. Thus, once parking intent is identified (Step 501), the system determines whether there is manual input, i.e. by pressing a button on the computing device, that the user is parked (Decision 510). If there is manual input that the user is parked, the system then records the location, or parking space, as unavailable (Step 512). Alternatively, if there is no manual input the system tracks the user's speed and location (Step 507) to determine whether the user is idle (Decision 503). If, however, the user is determined to still be moving, then the user is determined to not be parked (Step 505), at which point the system continues tracking the user's speed and location. If the user is determined to be idle based on the user's traveling speed going down to no movement, the system then determines whether the user has been idle for a predetermined period of time (Decision 506). If so, the system recognizes this as automatic detection that the user is parked (Step 508)

or at least that the location is not available, and records the parking location as unavailable (Step 512). If not, and the user's travelling speed has gone down to no movement for less than the predetermined period of time, the user is determined to not be parked (Step 505). For example, this may be the case if the user is briefly waiting at a traffic signal.

When the user leaves the space he or she is occupying, a leaving intent of that parked user is identified (e.g. automatically through leaving intent detection or manually input by the user), the parking availability or unavailability data, which may include data regarding the occupancy status of a parking location, may be updated to reflect that the location is now available for parking. Essentially, the more registered users including, but not limited to, drivers, motorcyclists, cyclists, and automated vehicles, utilize the invention, the more comprehensive and accurate the data in the database might be, and therefore more data can be used in identifying potentially available legal parking locations. As a result, notifications of potentially available parking locations can be more accurate. By recording one or more locations where users are currently parked in addition to identifying illegal parking locations, the system can more effectively notify users of potentially available legal parking.

As a result, these parking locations, whether occupied, illegal, or potentially available legal can be displayed to the user through, for example, different formats where the user can tell what might be an illegal parking location, an occupied parking location, or a potentially available parking location. If the user wants the computing system to identify all parking locations, the computing system might employ three different formats, such as three different colors or shapes, to clearly separate the three groups of parking locations from each other. However, since not all parking locations identified by the computing system as potentially available might indeed be available, at least due to the fact that not all drivers may be registered with the system, the user might prefer the computing system to identify only occupied and illegal parking location. In this case, the computing system may only employ two different formats. It is possible that the user may wish to use the system for the sole purpose of identifying occupied parking locations, in which case only one format might be needed. This may be through a notification or on an electronic map display, for example. Further, a notification may include reasons for the intended destination not having legal parking, such as legal parking locations are occupied, parking locations are illegal for the user type the user belongs to, etc. These reasons may factor into route planning for the user. Users may be concerned with parking locations that are illegal and are occupied or unavailable. In some situations, users may only be concerned with occupied parking locations and only want to receive legal parking related data about parking locations that are occupied. Or, users may only be concerned with illegal parking locations and only want to receive legal parking related data about parking locations that are illegal.

Figure 5B:
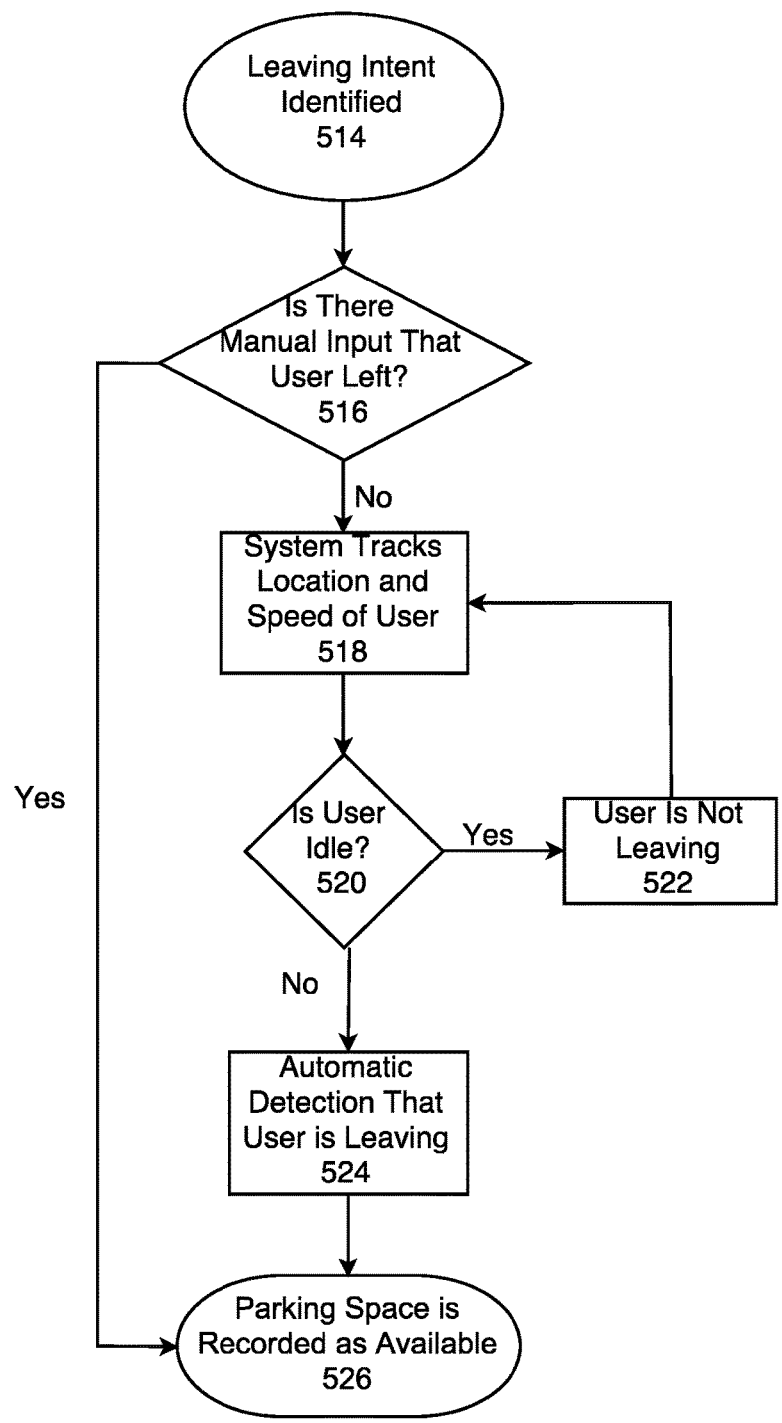

Referring next to FIG. 5B, shown is a flowchart illustrating an approach for obtaining and processing parking occupancy, availability, or unavailability related data as part of potentially available legal parking related data in accordance with an exemplary embodiment of the present invention. For purposes of identifying potentially available legal parking locations, in addition to precluding illegal parking locations, parking locations identified as being legal but currently occupied are also precluded from identification as potentially available legal parking locations. Thus, once leaving intent is identified (Step 514), the system determines whether there is manual input, i.e., by pressing a button on the computing device, that the user has left (Decision 516). If there is manual input that the user has left, the system then records the location, or parking space, as available (Step 526). Alternatively, if there is no manual input the system tracks the user's speed and location (Step 518) to determine whether the user is idle (Decision 520). If, however, the user is determined to still be idle, then the user is determined to not be leaving (Step 522), at which point the system continues tracking the user's speed and location. If the user is determined to no longer be idle based on the speed of the user's traveling speed, the system recognizes this as automatic detection that the user is leaving (Step 524) or at least that the location is now or may become available, and records the parking location as available or potentially available (Step 526).

According to an exemplary embodiment of the present invention, the system may recognize at least one of the following four user types: commercial vehicle user type, non-commercial vehicle user type, a user type based on type of vehicle, a user type based on type of vehicle plate, or any other user type. A person of ordinary skill in the art would appreciate that the system may recognize only one user type at any time, all user types at any time, or any combination of the user types at any time. Since different RRLC may apply differently to different users depending on a user type resulting in different types of parking violations, a user who indicates in the user's profile that he or she drives a commercial vehicle may be automatically marked in the category for only commercial vehicles; whereas a user who indicates in the user's profile that he or she drives a non-commercial vehicle may be automatically marked in the category for only non-commercial vehicles. Additionally, users may differ based on a type of vehicle they are driving. Types of vehicle may include, but are not limited to, tractor-trailers, trucks, buses, taxis, and limousines, etc. An even further differentiation of users is based on type of vehicle plate. For example, two users both driving Toyota Camry's may nevertheless belong to two different user types based on the fact that one of them drives a Toyota Camry that has a taxi license plate. While referenced as "user type," one or ordinary skill in the art would appreciate that in practice a user may choose to select one or more or any combination of user types.

In order to accommodate users of different user types, i.e., to effectively assist every user in finding potentially available legal parking, the system provides for selective notification of users, that is based on at least the data type corresponding to at least the user type that the user belongs to. Accordingly, the system may recognize at least one of the following four data types of legal parking related data in the database: commercial vehicle legal parking related data, non-commercial vehicle legal parking related data, legal parking related data based on type of vehicle, and legal parking related data based on type of vehicle plate, or any other type of data. The data in the database may also be categorized according to the issuing agency of the parking violation citations. A person of ordinary skill in the art would appreciate that the system may recognize only one data type at any time, all data types at any time, or any combination of data types at any time. To notify a user of potentially available legal parking, the system may pair the data type with at least the corresponding user type. For example, commercial vehicle legal parking related data would correspond to at least commercial vehicle user type. Since some legal parking related data may apply to more than one user type, a notification with that same legal parking related data may be sent to all applicable user types. However, if any of the legal parking related data applies to only a single user type, for example a taxi, that data may then be isolated for notifications of only taxi users, while precluding all other user types. In the case that a user selects more than one user type, the system may utilize the database to retrieve data of the data type corresponding to each of the selected user types, so that all applicable data may be made available to that user.

An exemplary embodiment of the present invention may include self-driving and self-parking technology. This technology may be integrated within the autonomous car sensors, which measure the distance from the car to obstacles, and within the cameras that detect traffic objects like lights and road signs, and help recognize moving objects like other vehicles, pedestrians, and bicyclists. Although self-driving cars might not have a need to park because they can vacate a spot when needed, for example to minimize the number of idling or double-parked vehicles during times of high traffic, self-driving cars may be integrated with a comprehensive system for identifying potentially available legal parking as provided by the present invention.

An exemplary embodiment of the present invention may be configured to integrate algorithms to detect duplicate data. If the tickets issued on dates and times match those in the database 106, they may be labeled as duplicate data and automatically removed from the data set. However, tickets issued on dates and times not included in the database 106 may be added to the database 106, and notifications may be updated to properly reflect added data to then properly alert a user with updated information.

Figure 6:
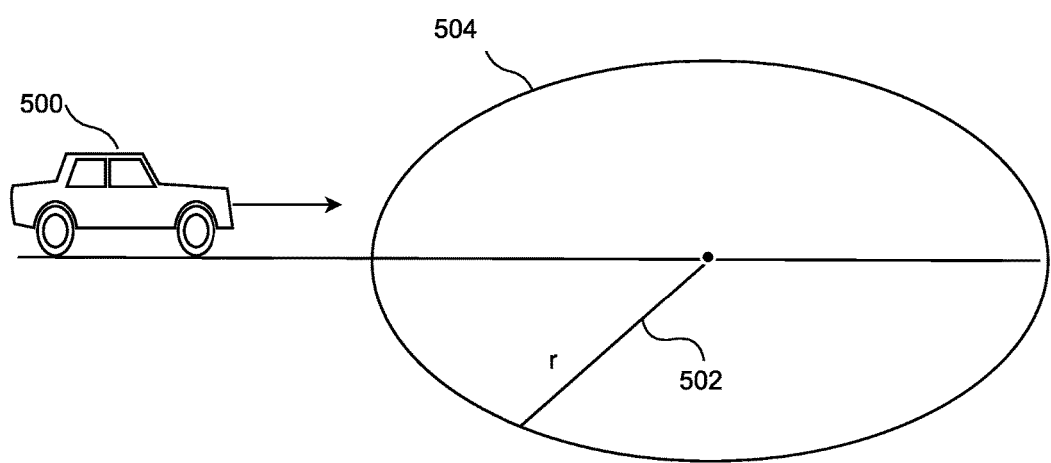
FIG. 6 is a schematic diagram illustrating an approach for sending a notification to a user in accordance with an exemplary embodiment of the present invention.

Referring now to FIG. 6, shown is a schematic diagram illustrating an approach for sending a notification to a user in accordance with an exemplary embodiment of the present invention. The computing system 100 may determine when the user shows parking intent through identifying speed and location, or through an actual request. As depicted, the computing system 100 may provide the user with a notification of potential parking violations at a time when the vehicle 500 (i.e., having the remote computing device 132 located in it) is within a predetermined radius "r" 502 of a destination. The destination may, for example, be a desired location or region the user wishes to park, or may be a determined location having available legal parking. The area which is established by this radius 502 is referred to herein as the impact zone 504. When the computing system 100 detects parking intent of the user by identifying the current speed and location of the vehicle 500, or otherwise, the computing system 100 may query the database 106 for the legal parking related data and parking rules data stored in the database 106, and then generate a notification based on the process disclosed in at least FIG. 3.

The location of each individual user may be recorded while driving, along with the user's speed, in which a slow speed (e.g., 1-5 km/h), may be indicative of the intent to park within a predetermined radius 502 of the intended destination as preset by the user. Based on the user's location and speed, an inquiry may be sent which asks for example, "Parking?" If the user chooses "Yes" then any potentially available legal parking locations within a predetermined radius 502 of a destination may be identified. Alternatively, the user may proactively indicate to the computing system 100 that he/she is looking for parking or to start looking when he/she is within a certain distance of the desired destination, as well as indicate the desired location for such parking. The predetermined radius 502 may be preset by the user to be a certain distance, because a user may prefer a predetermined radius 502, say, of or within 150 meters from a destination, whereas another user may prefer a predetermined radius 502 of at least 300 meters. If a user does not preset this, there may be default settings for the predetermined radius 502, which may vary depending on the location. For example, a default setting for a predetermined radius 502 may depend on the city in which a user is located. Since a road map may be integrated in the database 106, if the vehicle slows down or stops in the middle of the road due to traffic or other reasons, or is too far from the intended destination, the computing system 100 may recognize such location through the geolocation GPS coordinates and speed data, and may automatically know to not send a parking intent notification, since parking is not allowed in the middle of the road.

According to an exemplary embodiment of the present invention, a notification may be sent regarding alternate-side of the street parking, as historically determined by authorities, for streets that do not allow parking during certain times due to government street cleaning services, which, for example, may be applicable for only one half an hour (e.g., 9 AM-9:30 AM). The street cleaning parking restrictions often cause problems and are a disruption to one's schedule, as they typically are of a limited (e.g., 30 minutes) duration on the sign but may in actuality take only a few minutes for the street cleaning vehicle to clean a street. The computing system 100 may also inform users of temporary changes in alternate-side parking rules (e.g., when alternate parking rules are suspended to severe weather conditions, emergencies, holidays, etc.). The computing system 100 can be connected with the remote computing device 132 to provide the user with a notification reminding the user to move a vehicle due to street cleaning rules that may be in effect soon. The user may set up and/or adjust one or more different advance reminder alerts with varying lengths of time. The alert may remain in effect until the user indicates they have seen the alert and/or moved their vehicle. The user may turn these alerts on or off in the settings of a mobile application. The system of the remote computing device 132 might have information on the exact location of where the user may have parked, since the user may press a button on the display of the screen of their mobile communications device after parking to lock in and record the location as occupied with the system, or the location can be recorded by the system automatically, using the location identifier 204.

Also, government street cleaning regulations may be tracked. Normally, a vehicle would not be able to park during the time frame designated for street cleaning. However, after the street cleaning has been completed, a vehicle may park on that street, despite a 30-minute time frame. To maximize parking location efficiency, the system may notify users in accordance to when the street cleaning starts and finishes. This street cleaning information might come from crowdsourcing. Additionally, the system administrator may work in cooperation with municipalities or street cleaning companies to obtain this data. For an even more complete logging of street cleaning times, the administrator may hire an employee or a third-party company for the purpose of driving a vehicle and following the street cleaning vehicles around to provide the most up-to-date information. This may ensure that users are able to utilize these parking spaces as soon as possible, and do not have to wait for the 30-minute time frame. Additionally, the computing system 100 may inform users of temporary changes in alternate-side of the street parking rules, e.g., when alternate side of the street parking rules are suspended due to severe weather conditions, emergencies, holidays, etc. The computing system 100 may issue a notification to the user reminding him/her to move a vehicle due to street cleaning rules. The user may set up and/or adjust one or more different advance reminder alerts with varying lengths of time depending on the particular rule in effect. The alert may remain in effect until the user acknowledges the alert and/or indicates to have moved the vehicle. The user may turn these alerts on or off in the settings of a mobile application, for example, using the remote computing device 132.

After the data is processed, it may go through a subsystem for information provisioning, and then be delivered to a user's in-vehicle navigation system. In vehicles that do not have an in-vehicle navigation system, legal parking related data may be integrated into one or more computing devices, which may be GPS enabled.

The system according to an exemplary embodiment of the invention may increase the user's chance to find legal parking by processing and analyzing data for three types of situations, for example, when parking is legal all the time (i.e., no restrictions), when parking has a limitation (e.g., certain hours, certain days of the week, certain months of the year, rules for certain types of vehicles), and when parking is illegal at all times (i.e., no standing anytime zone), and then sending a notification to the user based on available information, where a notification can include a parking sign image that displays automatically to the user. Some areas contain on-street parking that do not have any applicable parking signs where parking is legal all the time. This is common to residential areas but may also exist in other areas. Usually on-street parking might contain some sort of limitation which allows or disallows parking during either certain time frames of the day, certain days of the week, certain months of the year, or may require a certain type of vehicle or permit to be allowed to park. The variety of possible restrictions is often a source of confusion for drivers as there may be multiple signs indicating different applicable rules. These areas may be precluded as legal parking options if the time falls within the provided illegal parking time frame. If the signs indicate that there are limitations, then the times outside the limitations in these areas may be shown as a legal parking option through a notification or on an electronic map display. Other on-street parking that may be precluded at all times is areas where parking is illegal all the time because it is a no standing anytime zone.

Figure 7:
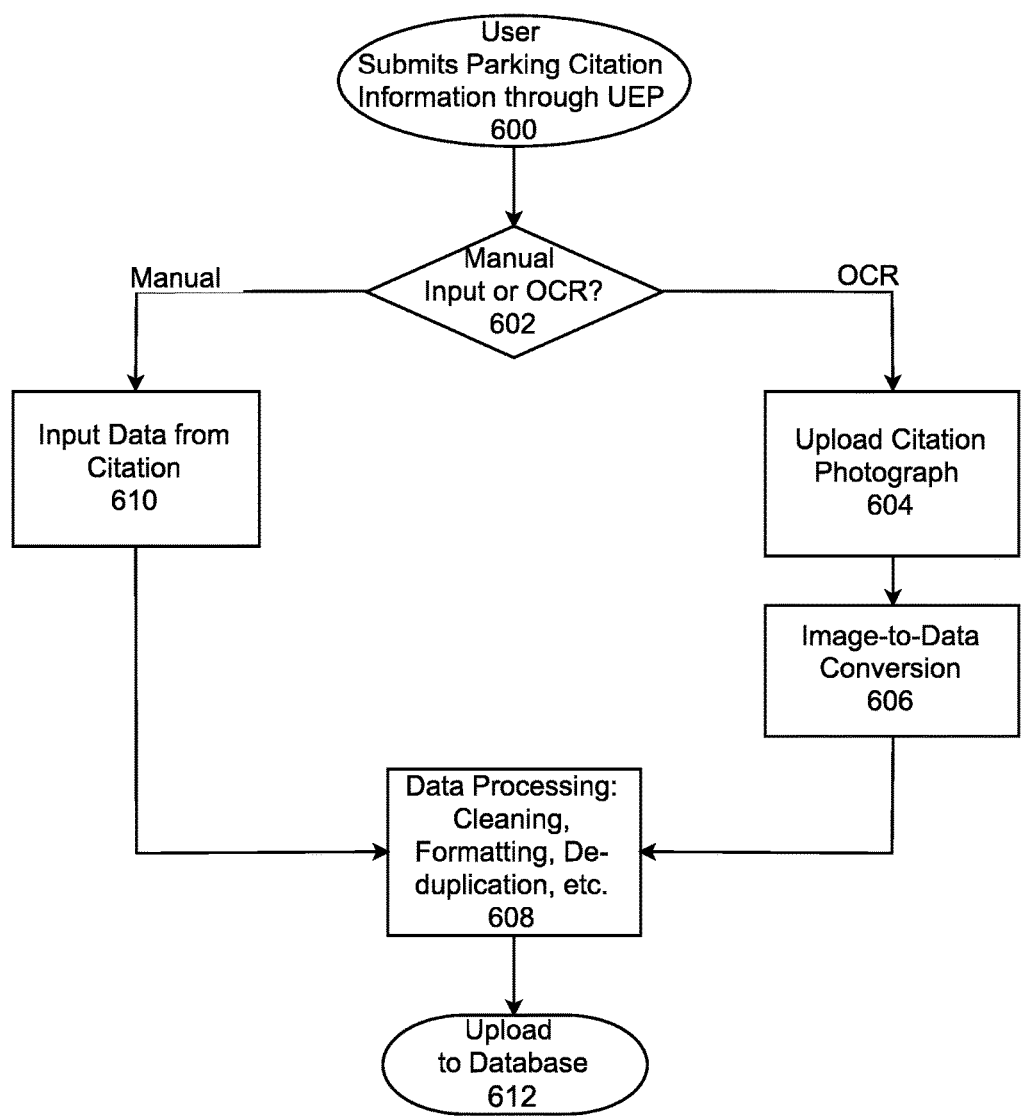
FIG. 7 is a flowchart illustrating how the parking ticket information reported through the user engagement panel is recognized, processed, and uploaded to the system in accordance with an exemplary embodiment of the present invention.

In accordance with an exemplary embodiment of the invention, as shown in the flowchart of FIG. 7, parking ticket information reported through the user engagement panel 134 may be recognized, processed, and uploaded to the system. That is, various legal parking related data as reported by a user (i.e., crowdsourced data) may be collected through a user engagement panel 134 (i.e., a platform for the collaboration and sharing of legal parking related data). It will be understood by one of ordinary skill in the art that "user engagement panel" herein is used to denote a panel or interface that a user can access and through which the user may exchange legal parking related data as well as share relevant ideas. Other potential terms may be used to describe this function, such as "forum," "discussion group," "online meeting," etc. The user engagement panel 134 may be used by one or more users, or other interested individuals, or entities such as the government, government agents, municipalities, non-governmental organizations (NGOs), private entities, and community organizations, or media sources. The user engagement panel 134 may be accessible through a terminal or remote computing device 132, where the user may interact with the user engagement panel 134 through the display 212 of the computing device 132.

Crowdsourced data may be periodically or continuously collected through the user engagement panel 134 and analyzed to build a more accurate, up-to-date database 106. As used herein, "crowdsourcing" is a distributed data collection method that utilizes online and offline resources to compile services, ideas, and/or content by the solicitation and/or capturing of data from a variety of people native to a special community that is targeted by the crowdsourced subject. Crowdsourcing may be used in gathering data that is not provided through other sources. Crowdsourced data may be in the form of real-time data or historical data.

As depicted in FIG. 7, a user may submit parking citation information through the user engagement panel 134 (Step 600), which can include but is not limited to accurate location according to GPS, time of receiving violation citation, reason for receiving violation citation, type of vehicle and type of vehicle plate, and any other additional relevant information, etc. Parking citation information may be input manually by the user, or the computing system 100 may perform optical character recognition (OCR) to obtain the information (Decision 602). Where the input is through OCR, the user may provide a photograph, scan, or other image of the relevant citation (Step 604). If the user takes a picture of the ticket to upload to the database 106, the application may allow the user to edit the image with an image editing function by covering, blurring, or redacting information and/or sharpening the image prior to uploading the picture, or this may be done automatically by recognizing certain private information such a license plate number or vehicle registration information. Using OCR to sharpen unclear images increases the success rate for the computing system 100 to recognize the information in the image and convert it to data (Step 606). As an alternative, the database 106 may also allow a user to scan the parking violation citation by utilizing camera or scanner software downloaded on a remote computing device 132. Where the input is manual, the user may enter data related to a received parking violation citation by selecting available options (Step 610). This may include input through drop-down menus or accordion fields on an interactive touch screen display, or the user can input through voice commands, etc. After conversion or after manual user input, the data can be processed or modified, which might include cleaning, formatting, and deduplication of redundant data (Step 608). After it is processed, the data can be uploaded to the database 106 (Step 612) according to the data set by which the data can be sorted.

Figure 8:
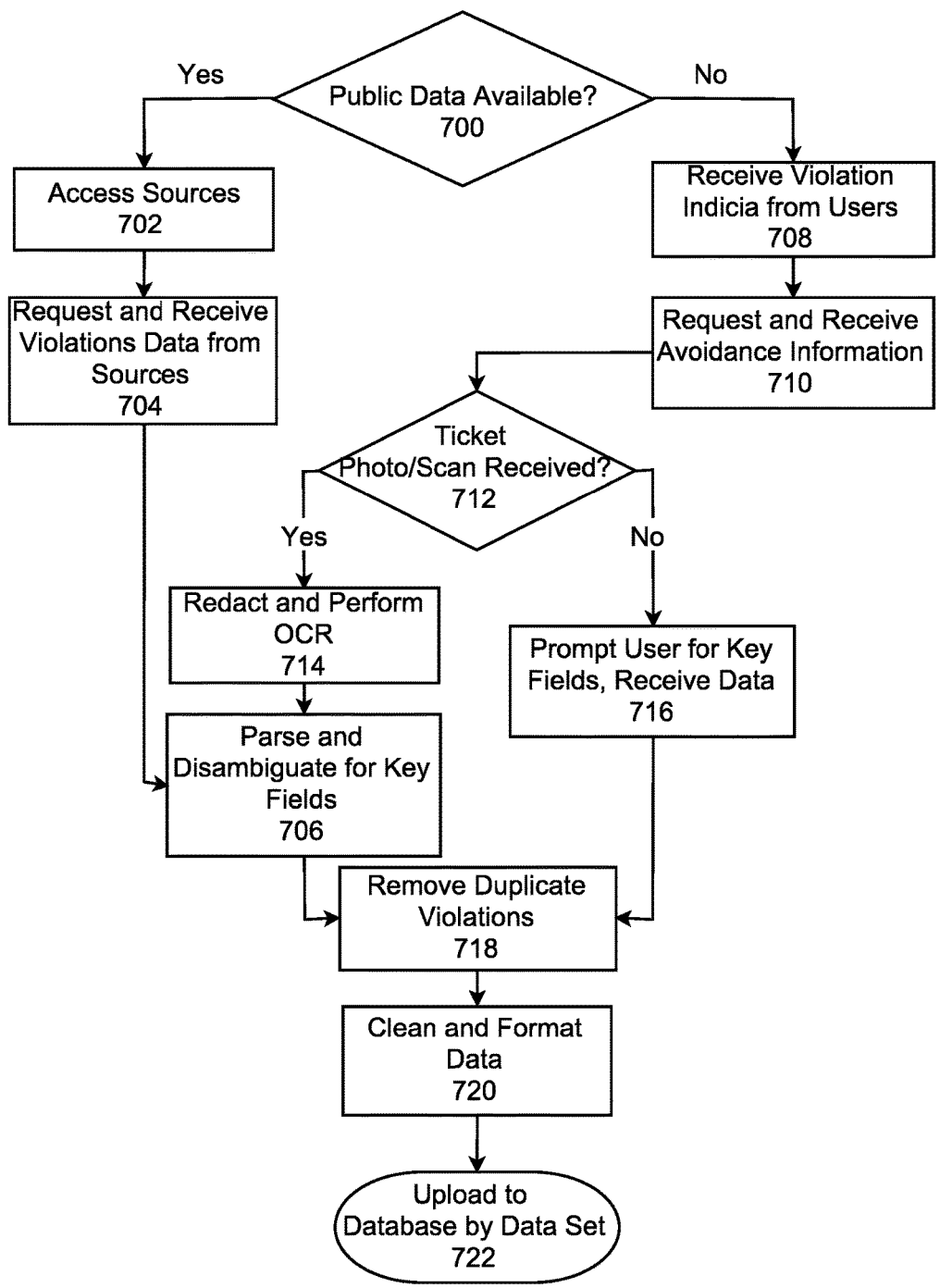
FIG. 8 is a flowchart illustrating an approach for obtaining and processing parking violation related data as part of legal parking related data in accordance with an exemplary embodiment of the present invention.

Next, in FIG. 8, the flowchart illustrates an approach for obtaining and processing parking violation related data as part of legal parking related data, in accordance with an exemplary embodiment of the present invention. Legal parking related data may be grouped by historical parking violation related data set for non-commercial vehicles and commercial vehicles, and real-time parking violation related data set for non-commercial vehicles and commercial vehicles. The first determination to be made is whether or not there is public data available (Decision 700). If so, sources of this available public data may be accessed (Step 702). These sources may be any source that makes parking violation related data publicly accessible may be accessed. This can include but is not limited to entities such as the government, government agents, municipalities, non-governmental organizations (NGOs), private entities, and community organizations, or media sources. Media sources may include, but are not limited to, websites, blog posts, social networks, newspapers, magazines, professional articles, broadcasts, television programs, and any other resources where legal parking related data generally available to the public can be collected. Access may be automatic and periodic. Once access has been established, legal parking related data may be requested from the sources and received once a request is granted (Step 704). As this data may be in a form defined by the source, the received violations data may be parsed for key fields, and the key fields can be disambiguated (Step 706).

Legal parking related data may additionally originate from private data, such as one or more users or interested individuals or private entities. Thus, if there is no data publicly available from a public agency or posted in a location accessible publicly such as a published website, then indicia of a parking violation citation may be received from another user (Step 708). Indicia inform the computing system 100 that the user has received a citation for a parking violation, and thus the process for collecting citation data from the user may begin. During this process, the computing system 100 may request the pertinent citation data from the user as well as solicit potential suggestions on how to avoid a citation (e.g., avoidance information) (Step 710). Next, it is determined if a photograph or scan of the citation is received (Decision 712). If a photograph or scan is received, OCR may be performed on the photograph image, which may have been redacted (Step 714). Once OCR has been performed, the OCR text may be parsed for key fields and key fields can be disambiguated (Step 706). It may be understood that in writing the citations, the same location may be described in many different ways. For example, the parking space may be referred to by the address that it is in front of, or, in some cases, across from. This address may also be provided in many different ways. For example, a single street may be written as "sixth ave," "sixth avenue," "6th ave," etc. Disambiguation therefore converts all data into a single format, for example, a location can be geocoded into latitude/longitude coordinates so it is more exact. Disambiguation may also be used to standardize violation names, for example, with reference to the abbreviations.

However, in situations where the user does not provide a photograph or scanned image of the citation, the user may be prompted to fill in the key fields with pertinent data (Step 716), for example, in an unambiguous way such as by selecting from various options or manually typing into a text field or text box. Disambiguation may or may not be necessary in this case. Further, the computing system 100 might provide recommendations for address input for the user, so that entries can be standardized before final entry. In either event, all of the collected data may have duplicate violations removed (Step 718), and may be cleaned and formatted (Step 720) for the database 106. Format can include how the data can be presented, such as leaving data as a human-readable address or geocoding, if necessary, to ensure that the same instance of a citation is not counted twice. This may be done, for example, with reference to a citation number that is specific to the issuing agency. Once the data is cleaned and formatted, it may be added to the database 106 by the data set (Step 722).

After relevant legal parking related data has been cleaned, the location data can be extracted in a data frame to be used in a third party geocode API, for example, GOOGLE GEOCODING API, which is a location geocoding service provided by Google, a subsidiary of Alphabet Inc., or SMARTYSTREETS, which is a location geocoding service for latitude and longitude coordinates provided by SmartyStreets, LLC, etc., to output a file with all the geocoded information of relevant locations, where the file may be a file such as a .csv file. Assuming the geocoding methods disclosed herein do not provide accurate geolocation, any other type of technology may be adopted or developed to more accurately identify the location or geolocation related to a parking violation as well as to a potentially available legal parking location. The output may be reviewed and corrected by the system administrator for accuracy and completeness. Parking sign or signage data and RRLC data files may also be uploaded, cleaned and merged with the citation data into the database 106. The data can be added to the database 106 based on data set. For example, if new data pertains to a non-commercial vehicle, the data may be stored in non-commercial vehicle data set 400. If the new violation data pertains to a commercial vehicle, the data may be stored in commercial vehicle data set 402. In addition, new data may be sub-grouped by type of vehicle and type of vehicle plate. Data may include time, day, and location-linked rules for commercial and non-commercial vehicles for the system to determine parking rules.

Figure 9:
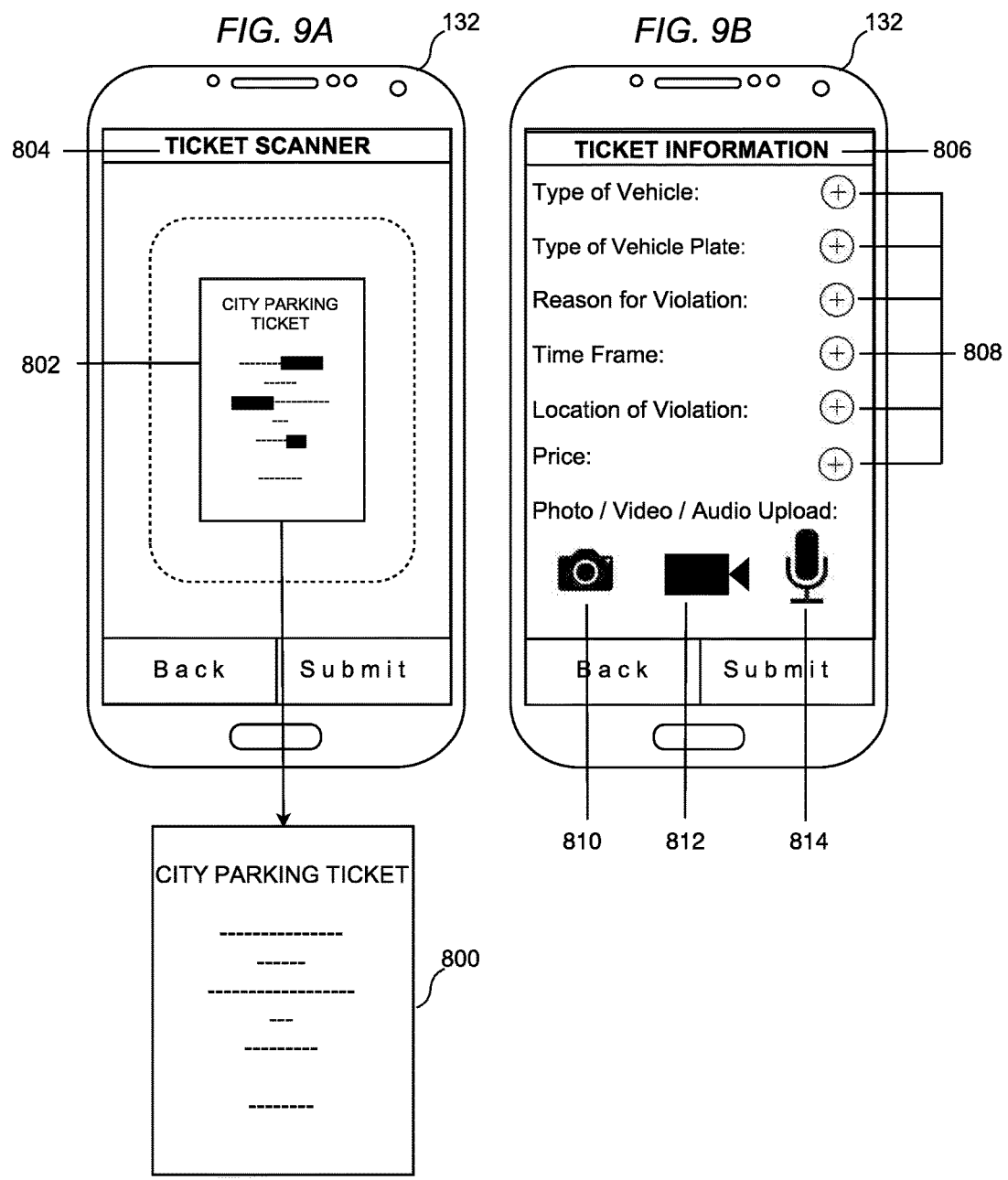
FIGS. 9A-9B are schematic diagrams of a remote computing device further illustrating a user's interaction with the computing system using the remote computing device when reporting a parking ticket in accordance with an exemplary embodiment of the present invention.

Turning next to FIGS. 9A-9B, shown are schematic diagrams of an exemplary embodiment of the invention illustrating a user's interaction with the computing system 100 using the remote computing device 132 when reporting a parking ticket in accordance with an exemplary embodiment of the present invention. For purposes of this illustration, the computing device 132 is depicted as a mobile device such as a smartphone; however, it is to be understood that the remote computing device 132 is not so limited, and it may be a vehicle integrated information or entertainment unit or any other computer device or communications module. When a user is issued a citation 800 for a parking violation, the user may use the computing device 132 to take a picture or scan 804 of the citation 800, as depicted in FIG. 9A. As the citation 800 may include sensitive information such as the vehicle identification number (VIN) and other personal data, such as name, residential address, etc., sensitive information can be redacted to create a redacted citation image 802 either automatically or manually by the user. Alternatively, as seen in FIG. 9B, the user may input the ticket information 806 manually into the computing device 132, for example, by selecting from menu subheadings 808 and/or by entering it, and other information, into free text fields. The menu subheadings may include type of vehicle, type of vehicle plate, reason for violation, time frame, location of violation, or price. The user may also use the remote computing device 132 to choose the type of vehicle or type of vehicle plate, or to provide a photograph, a video and/or an audio message with the ticket or other relevant information using the still image camera 810, video camera 812, or microphone 814 of the remote computing device 132.

Figure 10:
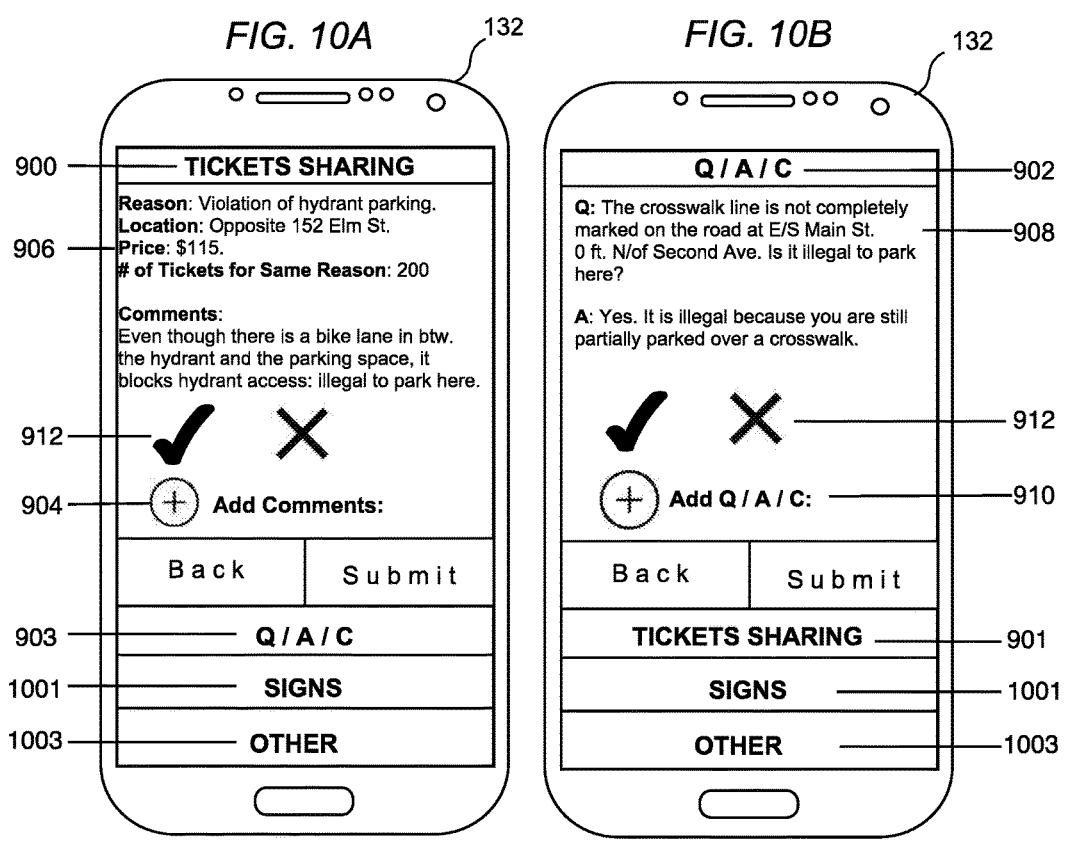
FIGS. 10A-10B are schematic diagrams of the remote computing device shown in FIGS. 9A-9B further illustrating a user interface of the user engagement panel showing a "Tickets Sharing" panel and a "Q/A/C" (i.e., questions, answers, comments) panel based on a specific location in accordance with an exemplary embodiment of the present invention.

After reporting a parking ticket as depicted in FIGS. 9A-9B using the remote computing device 132, the system may provide an interface for the user via the user engagement panel 134. Referring to FIGS. 10A-10B, shown are schematic diagrams of the remote computing device 132 shown in FIGS. 8A-8B further illustrating a user interface of the user engagement panel 134 on the user computing device 132 showing a "Tickets Sharing" panel 900 (FIG. 10A) and a "Q/A/C" (i.e., questions, answers, comments) panel 902 (FIG. 10B) based on a specific location in accordance with an exemplary embodiment of the present invention. Here, a user may rate posts positively or negatively 912 (e.g., by selecting the check-mark for a positive rating and the "X" for a negative rating) within the user engagement panel 134 of user computing device 132, as well as add any comments 904. Information 906 on the user engagement panel 134 can include reasons, location of the violation, ticket penalty amounts, the number of tickets previously issued for the location, and other comments about a citation. In the Q/A/C panel 902 of FIG. 10B, the user can submit a question 908 about, for example, a particular location, and then receive an answer 909 from the computing system 100. A user may also choose to submit questions, answers, and comments 910 in the Q/A/C panel 902. Here too users can rate posts positively or negatively 914 (e.g., by selecting the check-mark for a positive rating and the "X" for a negative rating) within the user engagement panel 134 of user computing device 132, as well as add any comments 910.

Figure 11:
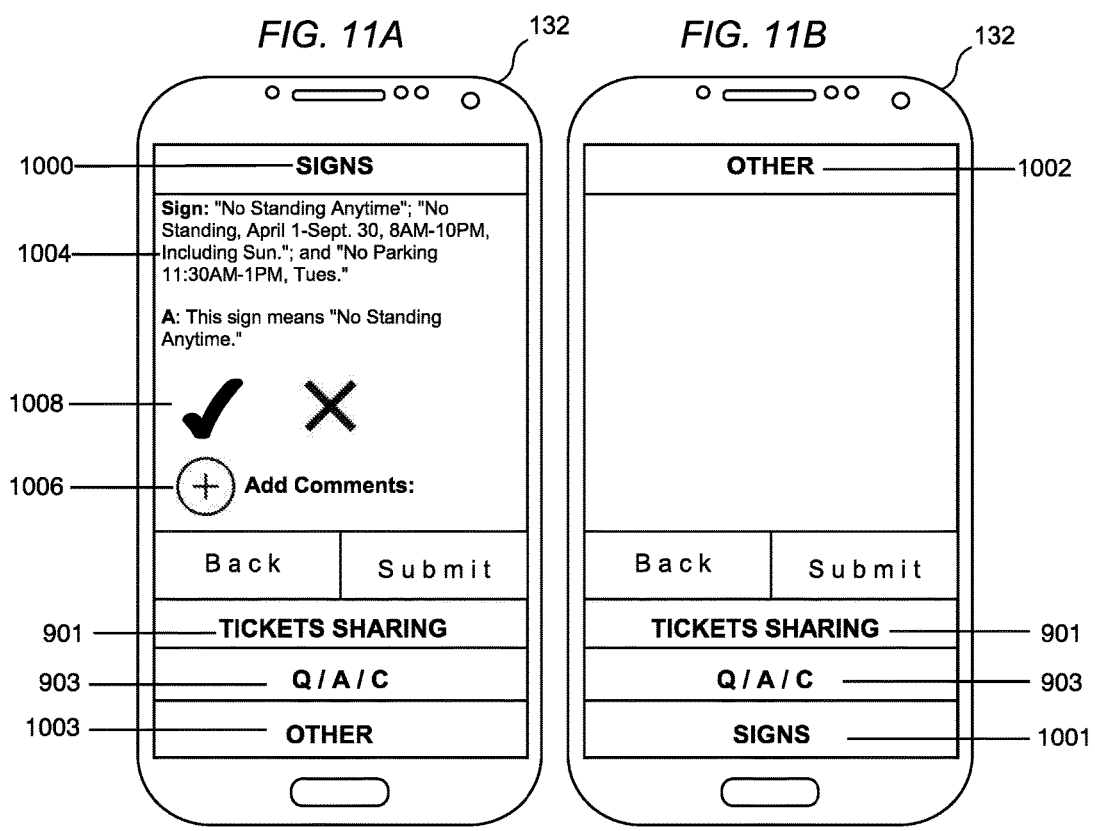
FIGS. 11A-11B are schematic diagrams of the remote computing device shown in FIGS. 9A-9B further illustrating a user interface of the user engagement panel showing a "Signs" panel and "Other" panel in accordance with an exemplary embodiment of the present invention.

Similarly, FIGS. 11A-11B show diagrams illustrating a user interface related to the user engagement panel 134. In these depictions are shown a "Signs" panel 1000 (FIG. 11A) and an "Other" panel 1002 (FIG. 11B). The "Other" panel 1002 can show any information related to miscellaneous subjects, and might be based on a specific location or a general location. The signs panel 1000 might be a resource for a user to access clarifications of parking signs 1004, where potential questions may have been asked or can be added that might be or have been answered by another user and rated by those who might view it or are qualified to rate it. Here too a user may rate posts positively or negatively 1008 (e.g., by selecting the check-mark for a positive rating and the "X" for a negative rating) within the user engagement panel 134 of user computing device 132, as well as add any comments 1006. Users may toggle between the Tickets Sharing, Q/A/C, Signs and Other interfaces at any time using buttons 901, 903, 1001 and 1003, respectively.

Figure 12:
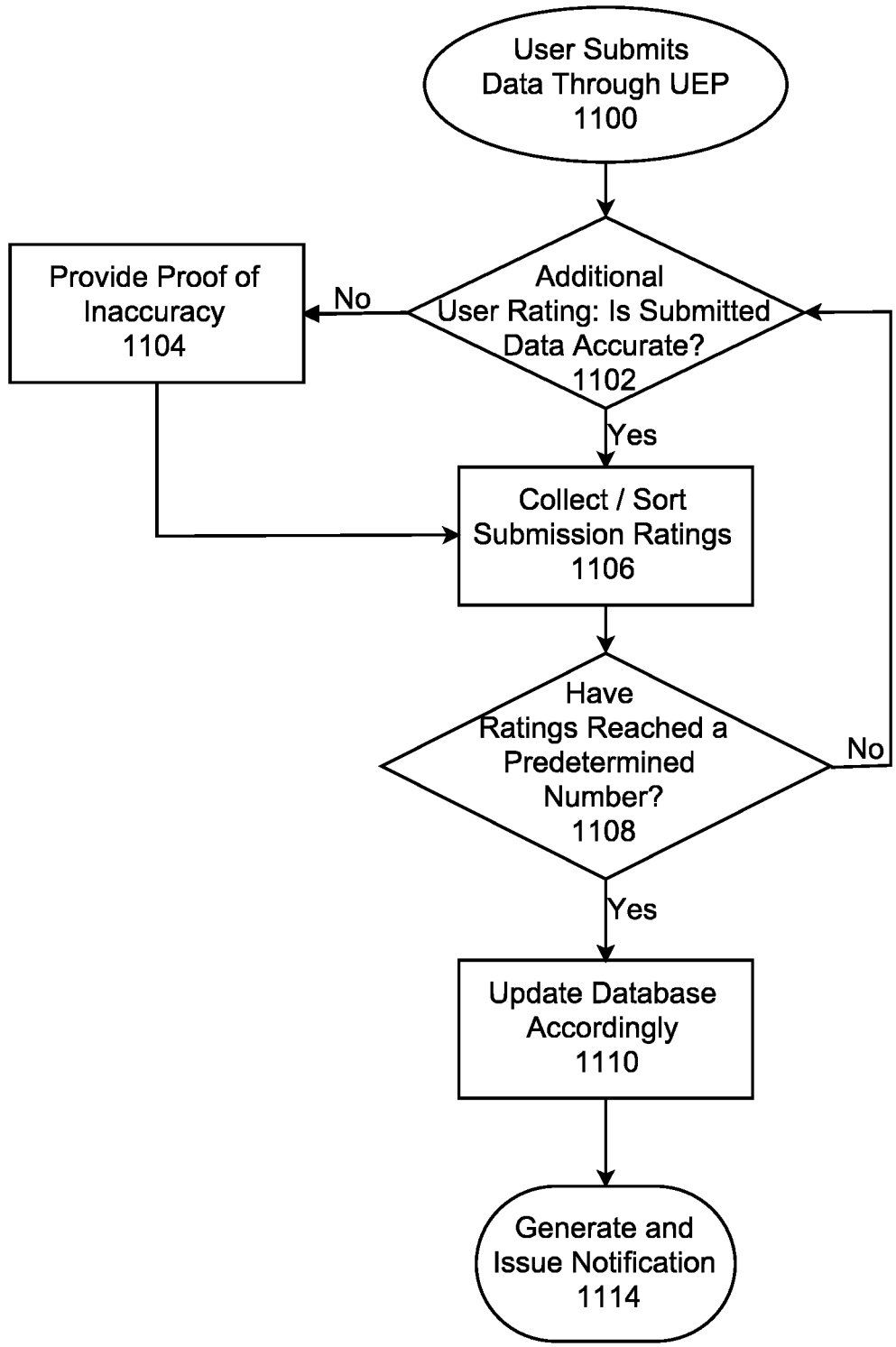
FIG. 12 is a flowchart illustrating a process of rating legal parking related data submitted using the user engagement panel and how those ratings of the submitted data affect the data within the database in accordance with an exemplary embodiment of the present invention.

Referring next to FIG. 12, shown is a flowchart illustrating the process of rating legal parking related data submitted through the user engagement panel 134 in accordance with an exemplary embodiment of the present invention, and how those ratings of the submitted data affect the data within the database 106. The first step in this process might be the user submitting legal parking related data to the user engagement panel 134 (Step 1100). This legal parking related data may include, for example, a parking sign or signage redesign regarding translation into a different language or clarification of content, suggestions on how to avoid parking violation citations, etc. That information may then be rated by other users. The user might be prompted to rate the data based on whether or not the submitted data is accurate (Decision 1102). User ratings (i.e., positive or negative) are collected and used to sort the contributed legal parking related data. If any user rates the submitted legal parking related data negatively as to its accuracy, that user has an option to provide proof of why that legal parking related data may be wrong (Step 1104). All submitted ratings, positive and negative, may be collected and sorted (Step 1106) by the computing system 100 until a predetermined number of ratings (i.e., positive, negative, or total) has been reached (Decision 1108).

If the number of ratings has not reached the predetermined number (Decision 1108), the computing system 100 may continue to collect more ratings from other users (Decision 1102). If the number of ratings has reached a predetermined number (Decision 1108), then the additional legal parking related data may be used to correct, update, supplement, or modify the database 106 accordingly (step 1110). Thus, correcting, updating, supplementing, or otherwise modifying the database 106 may be from positive or negative ratings. Positive ratings may be used to replace or reinforce the data in the database 106, and negative ratings may be used to identify or invalidate inaccurate data. Once in the database 106, the contributed legal parking related data may be used to issue a relevant notification regarding that legal parking related data. For example, if the legal parking related data submitted to the user engagement panel 134 was a suggestion on how to find a free parking spot at a particular location, that suggestion or its data may be included within the notification that is relevant to that location and that is subsequently generated and issued to an applicable user (Step 1114).

According to an exemplary embodiment of the present invention, the process by which the database 106 is kept current involves, in part, a user rating the notification that the user receives. However, the user may only rate the notification if the user has firsthand experience. A user with firsthand experience is identified as a user who has received a notification with legal parking related data about a specific location by passing within a predetermined radius of that specific location. This radius may be set by default or preset by the user through the settings. For purposes of identifying the firsthand experience, the remote computing device 132 capable of determining a location and transmitting the identified geolocation of the user having firsthand experience with such location to the computing system 100 may be used.

This process can be illuminated through an example of a notification informing a user that there were no parking prohibitions in effect when in fact the user's parking location was subject to a temporary prohibition regarding street cleaning. In this case, the user may, on the user interface, rate the notification, e.g., provide a negative rating. A user may substantiate a negative rating by submitting proof that the notification was inaccurate. The user in this example may take a picture of the sign that announced when the street cleaning was in effect, or any other relevant signage. This feedback is collected along with the ratings, which may update the database 106 to reflect the new user-submitted data. If the data that the user provides through this negative rating turns out to be accurate, it may be used to correct, update, and supplement the database 106. However, the data or information provided by negative ratings would have to exceed a predetermined number to overturn a notification. If a negative rating and its corresponding information have not passed the predetermined number, the user's negative rating may be shown in the notification by including an indication that a small percentage of users have rated the notification negatively and/or as inaccurate. When those negative ratings do reach the predetermined number, the new information provided through those ratings may replace the existing relevant data in the database 106. This in turn updates the content of the notification that is issued. In the above street cleaning example, if the user is the first to indicate that there is a relevant street cleaning regulation, and the user engagement panel 134 receives ten more negative ratings saying that the notification in effect is incorrect, supported with information similar to or the same as the first user, then once there have been enough submissions or ratings, the database 106 may be corrected, updated, and supplemented based on this corroborated information.

The number of submissions or ratings sufficient to be "enough" for purposes of correction, updating, supplementing or otherwise modifying the database 106 may be a predetermined number (e.g., 10, 25, 35 ratings or submissions, etc.), or may be a predetermined percentage of total ratings (e.g., a 25%, 10%, or 1% negative rating threshold may trigger a data review), or may be based on some other predetermined information setting. The predetermined number of ratings may also differ based on location. In a busy location such as a central business district or downtown area, the density of parking violations and the demand for specific parking locations may be higher than in more rural areas. In addition, there may be more users sharing or rating the legal parking related data. Therefore, these different locations may have different standards for predetermining a number of ratings.

The positive ratings are used to verify that the data provided in the notification is accurate. When the notification reaches a certain number of positive ratings that may be predetermined, the computing system 100 can confirm the validity of the legal parking related data that the notification is based on. If the notification that reaches a predetermined number of positive ratings is based on and inferred violation, such inferred violation may turn thus be determined to be accurate. According to an exemplary embodiment of the present invention, when an inference is substantiated by a citation at some later point (e.g., a parking violation citation is issued at a certain time), that information regarding the inferred potential violation may be changed to reflect a direct application of database 106 data.

According to an exemplary embodiment of the present invention, the user who is the first to provide corrective or new information through the user engagement panel 134 that then is incorporated in one or more notifications that receive a predetermined number of positive ratings may be provided with a monetary or non-monetary reward or award for being the first to contribute useful information (e.g., information and/or data that reaches a predetermined number of positive ratings). This feature provides incentive to users to provide accurate and timely information, thereby keeping the database 106 current and accurate. An incentive to the user is rewarding efficient and useful reporting of information to help other users. Incentives are useful in obtaining both active participation from one or more users and also for obtaining accurate and truthful information. Active participation is important because statistical analysis can be made more accurate with large groups of data and it is important to continuously obtain real-time data of current situations.

Additionally, incentives may be used to encourage reporting of legal parking related data by a user to correct, update, supplement, or otherwise modify the data in the database 106. This incentive structure paired with an administrative quality control center may be used to ensure the quality and reliability of the data in the database 106, as this data is subsequently used to identify potentially available legal parking and therefore needs to be kept to high standards of accuracy and reliability. Each data input, whether crowdsourced or sourced elsewhere, historical or real-time, may be assigned a unique tracking number, allowing at least the system administrator to track the data back to its original source if necessary.

For example, a reward or award may be issued to a user who reports ticket information at a location that has no prior ticket history of parking violations in the database 106, if that ticket is incorporated in the notification that reaches a predetermined number of positive ratings from one or more additional users with firsthand experience. The amount the user may receive may be the total amount stated on the user's ticket or an amount that is set by the system administrator according to the amount of positive ratings received for providing ticket information along with comments and recommendations on how to avoid parking violation citations. Through rewards a user may potentially incur no net losses from ticket violations and may also educate others to better comply with RRLC by sharing ideas to avoid future parking ticket violations.

The reward system may involve several steps. For example, in order to be eligible, the user may be required to be the first user to fully report new ticket information in detail for that specific location that did not have any prior ticket history by reporting the date; the time from the issued ticket with specific information on the reasons for the ticket; and giving beneficial suggestions, ideas, and/or advice on how to avoid the same violation. However, other users may be allowed to enter ticket information if a ticket for the same location indicates different reasons or violations which may qualify for a reward. The application may allow a user to take a photo of the ticket, which may be redacted or sharpened before submission as described. Each location may allow for the submission of one original ticket report which may allow one user to receive a reward. The system administrator may change the type of reward and/or amount of reward to different users who report parking ticket information by descriptions in different circumstances. For example, a reward for the first user may pay double amount of the reward or give a gift as a monetary reward. Also, a user who actively participates in supplying user-collected (i.e., crowdsourced) information may do so without expecting to be rewarded. In this case, the user may opt out of receiving rewards through settings in the user engagement panel, or may simply decline a reward when one is being offered.

According to an exemplary embodiment of the present invention, additional users with identified firsthand experience may rate the data provided in the notification as a whole. If, however, an additional user with firsthand experience happens to agree with part of the data conveyed by the notification but disagrees with another part because the user finds the latter part being inaccurate, the user may rate the part he or she agrees with positively and the inaccurate part negatively. The user may then provide any information in support of a negative rating. Additionally, in the case where only a part of the data in the notification reaches a predetermined number of positive ratings, the user who was responsible for submitting that data through the user engagement panel 134 in the first place may still receive an award but such award may only be partial. In the case where the inaccurate part of the notification receives a predetermined number of negative ratings, the data of that part may be removed from the database 106. The dual process of rating of the data submitted through the user engagement panel 134 as well as subsequent rating of the notifications allows for correcting, updating, supplementing, or otherwise modifying data in the database 106. This may be the cycle that keeps the data in the database 106 dynamically updated regarding any changes or inaccuracies.

Since a notification is short and meant to alert the user with quick, summarized information about the potentially available legal parking locations, the user may utilize the user engagement panel, including but not limited to a forum module, to obtain more comprehensive and detailed information from posts which include but are not limited to inquiries, responses, discussions, pictures, videos, written descriptions, and any other information that may be posted. The combination of receiving a notification and accessing a user engagement panel 134 may provide more useful and extensive information for a user because a notification provides quick, time-sensitive information while the user engagement panel 134 provides the detailed, extensive information useful to gain full knowledge of the situation.

The user engagement panel 134 according to an exemplary embodiment of the invention may incorporate two aspects: a specific user engagement panel that connects to a specific location on the electronic map, and a general user engagement panel 134 where a user may discuss general ideas not related to specific locations. The user can select a specific location or zone within the map display to choose "Panel," to access the user engagement panel, which may include different categories where information may be exchanged between users (e.g., Tickets Sharing; Questions or Answers or Comments; Parking Signs; and/or Other categories not included in the above, if any etc.), as shown in and discussed more specifically with respect to FIGS. 9A-9B and 10A-10B herein. The content that is automatically supplied in the user engagement panel 134 might be based on the user's current location. The questions or answers or comments category may allow a user to ask any questions, input any answers, and input any comments related to legal parking related data for the location in addition to viewing all this information contributed by other users. The parking signs category may allow a user to exchange information regarding parking signs, such as redesign of a parking sign regarding, or translation to a different language or clarification of content. Other categories not included in the above may be added or deleted at the discretion of the system administrator. When a user might have an inquiry regarding legal parking related data for a location, the application may allow the user to post such inquiry using the user engagement panel 134 to obtain more information. The terms "general" user engagement panel or "specific" user engagement panel is meant for identification purposes only, in order to distinguish the type of information that is conveyed. The terms are not intended to limit the scope to a particular kind of device, application or system. In fact, the name "general user engagement panel" and "specific user engagement panel" can be changed by a user or by the system and the name of the user engagement panel can be labeled as a forum, section, part, or even re-named as "Panel A" or "Panel B," for example. No matter what name is used, the purpose to identify the portion of the system and the functions that it performs under the user engagement panel remains the same as disclosed herein in the present invention.

According to an exemplary embodiment of the present invention, the user engagement panel 134 may also be accessed for content in other areas. For example, this may refer to a user in one location who intends to rent a truck to move to another town in a different part of the country. The user might like to see legal parking related data applicable to a certain area where the user intends to unload the truck. Since a truck is often considered a commercial vehicle, and different areas might have different regulations regarding parking and unloading a commercial vehicle in the street, it might be convenient for the user to become familiar with legal parking related data applicable to that certain area in advance. It is to be understood by one of ordinary skill in the art that this is one example out of many possible reasons a user may want to access the user engagement panel 134 content for areas other than the user's immediate surroundings.

The user may also be allowed to do a general search for potentially available legal parking locations in the specific parking zone within the user engagement panel, and may further search based on type of vehicle or type of vehicle plate. According to an embodiment herein, there are different formats to identify the density of previously issued parking violation citations at specific locations. For example, the higher the density of issued parking citations in any particular location, the darker the color. This format is applied for both broad and narrow geographic areas; whether that area be a borough or a street. Furthermore, this format identifies a fluctuation in number of issued parking violation citations based on the time of day. Additionally, the parking spaces may be indicated by different formats, such as different colors or shapes. For example, a solid red line would represent that the space is illegal, whereas a dotted red line would represent a legal parking space, but is occupied by another user; green color between the dotted lines would represent an available legal parking space. The user or users who view this information might be split into two categories: commercial vehicle users and non-commercial vehicle users. Each type of user might view a different format at least related to the type of vehicle that they are driving or type of vehicle plate they have, and can further categorize into different vehicle type or different type of vehicle plate. For example, users in commercial vehicle user types may see a green format for a particular location to indicate that legal parking is available, while users in non-commercial vehicle user types may receive red color format in the same areas as the commercial users to indicate that the parking is illegal because that location is restricted for non-commercial use.

According to exemplary embodiments of the present invention, different formats, such as different colors or shapes, may be utilized to indicate and differentiate legal parking data. However, in one embodiment, there may be at least three formats used to display at least legal parking related data. These formats may include potentially available legal parking, complete illegal parking, and occupied or unavailable parking. A user may choose to display one of the formats, all of the formats, or any combination of two formats. The system may automatically display at least one or more of the above formats. These formats and the information associated with these formats may be dynamically changing based on the data in the database. For example, at one minute in time a parking location may be illegal for a particular user type due to street cleaning, but the next minute that parking location may be legal for the user type because the street cleaning is over. Similarly, at one moment a parking location may be occupied, but only shortly thereafter, the same parking location may be available. This information is dynamically changing, therefore the database is dynamically updated and changing the at least three formats. Such data may be changed according to the time of day, location, etc. To view this data on the electronic map display, the user may input a specific location along with current time, a time frame, and/or a certain point in time or a period of time in the future and is presented an electronic map on their mobile phone. This helps the user save time and resources by not having to first drive to the location itself in order to ascertain whether legal parking is available. If, for instance, the user is able to see on the map that at the same time tomorrow the possibility of finding legal parking at the same present location is not available because alternate side of the street parking rules are in effect, the user may simply plan to go to another location with prior knowledge of available legal parking.

In essence, the user may view potentially available legal parking for the current time, a time frame, or a certain number of hours in the future at any location and at any time, for example by hour or half hour increments and, if parking is illegal, choose an alternative legal parking location. Therefore, the user may look into the current situation or the future situation at the location for when the user expects to arrive at the intended destination. The information on the charts can be changed depending on if the user indicates he/she is driving a non-commercial vehicle or a commercial vehicle. The user may also press on a specific location within the electronic map display of the mobile application to view this information.

If the self-search does not result in an answer that satisfies the user, the user may have the option to post inquiries in the user engagement panel 134 regarding a specific location or area. By educating other users through sharing at least their own legal parking related experience, users may be more conscious of their parking actions, which may help in compliance with legal parking.

An exemplary embodiment of the present invention may use a third-party service and/or API, for example, GOOGLE TRANSLATE, which is a language translation service provided by Google, a subsidiary of Alphabet Inc., or the system administrator may hire professionals with expertise in parking compliance and also competent translators to translate the content to different languages or provide explanations in plain English. A user may also translate information, which may be subject to positive and negative ratings.

Another exemplary embodiment of the present invention of the application may also connect to a third-party electronic map, for example, GOOGLE MAPS, to provide a street view function on the user engagement panel 134 for specific places with a high number of previously issued parking violation citations. Other media, for example, photos, videos, etc. for the location may also be provided by a user or employee of the system. This is especially useful for those locations with a predetermined number of violations where more information should be provided or for those locations where a user may be unfamiliar. The user's privacy or the public's privacy may be protected when uploading photos, videos, etc.

Although government websites may provide information on locations and the applicable rules for parking signs, the data might not be complete or may be unavailable. Therefore, the user engagement panel 134 allows for user reporting of parking sign information, which may be used in identifying potentially available legal parking locations by precluding illegal parking locations.

A user can also upload legal parking related data to the user engagement panel, for example, parking violation citation data. There may usually be two types of tickets: either a handwritten or machine-generated ticket from a law enforcement officer or a machine-generated ticket from a street camera image. Different law enforcement agencies may also use different forms for ticket violations. Any user reported information may include the information such as location, time, reasons, and also any suggestions, advice and/or solutions the user can contribute in order to share knowledge to educate other users to avoid the same type of violation again. The person who receives the ticket may be in the best position to submit suggestions, advice and/or solutions based on firsthand experience.

According to an exemplary embodiment of the present invention, a user may also use the user engagement panel 134 to post a picture of a parking or street signage at a specific location and ask about the plain language of the sign. Drivers often experience difficulty in understanding parking signs, especially when there are multiple signs for different parking rules. In addition, many drivers might not have a strong command of the meaning of the signage language, which leads to further difficulties in interpreting the signs. Therefore, the user engagement panel 134 may provide information on the parking signs associated with a specific location and translate these parking signs not only into another language, but also into easy-to-understand, plain-language terms. Since some parking signs are confusing, a user may participate in redesigning them to make new designs. A user may create redesigns or translate traditional parking signs to different languages to be more understandable. Their design images may be subject to a rating system, where the top-rated design may remain at the top of the list so other users can view and easily understand the meaning of the signs.

The user engagement panel 134 may also allow a user to update parking restriction conditions to indicate for example, the condition has been changed temporarily or permanently, etc. The government agency or law enforcement agency, such as the police department may release information on their web sites or post a temporary notice on the street regarding a temporary notice of "No Parking" areas on certain streets for certain time. Temporary notices also include no parking notices due to some special events, for example gatherings, road repairs, movie productions, etc. However, people might not know of or might not necessarily see these notices posted on the parking sign or the notices might not readily be apparent. When a user parks his or her vehicle, the user may be notified by the computing system 100 of any applicable temporary notices for these reasons.

When a user discovers the information, the user can report the notice to the user engagement panel 134 and upload a picture of the notice, whereby the database 106 may apply the stated parking rule to the whole street. As a result, a user who has parked his or her vehicle on the applicable street during the applicable time frame and/or distance frame restrictions or who has indicated in the settings that he or she wants to receive a notification for any temporary notices on the street may receive a notification. The computing system 100 may prevent this user from potentially receiving a ticket or being towed away since the notification may warn the user of the temporary notice. This reporting method may also be applicable to other situations where any RRLC may be updated if the database 106 does not detect it by itself. A user may submit and upload any relevant information through various media that include but are not limited to: photos or images from cameras, sensors, videos, hand drawn pictures, written descriptions, and any other mediums to accurately describe the situation for the location through the user engagement panel. To encourage a user to report the discovery of any changes in RRLC, a user may earn rewards. The system administrator may also hire employees or third-party contractors to report the temporary notices so a notification may be sent to the user.

Reported information may be subject to a review and/or ratings by the system administrator and also other users to ensure that credible information is being collected to provide a notification. Comments, suggestions, etc. may be listed in the user engagement panel 134 according to ratings, and the ones with the highest number of positive ratings may be listed at the top, so other users can clearly view the posts that are rated as the most accurate. The user may be allowed to report to the system administrator any potentially inaccurate information with applicable proof. The system administrator may be able to open a case where an employee and/or user may be sent to conduct an investigation of the purported inaccurate information to verify the quality of the information.

In addition, when legal parking related data is identified as time-sensitive, whether submitted through a user engagement panel 134 or collected from another source, the system administrator may be given the discretion to immediately incorporate this time-sensitive data into a notification, because there may be a need to notify a user as soon as possible, such as in the case of a temporary notice or a tow away zone, and because some information regarding a time-sensitive prohibition may be preferable to no information. In this scenario, the time-sensitive data may not need to reach a predetermined number of positive ratings prior to being incorporated into a notification. If a notification with time-sensitive legal parking related data reaches a predetermined number of negative ratings, this time-sensitive data may be removed from the database 106.

Figure 13:
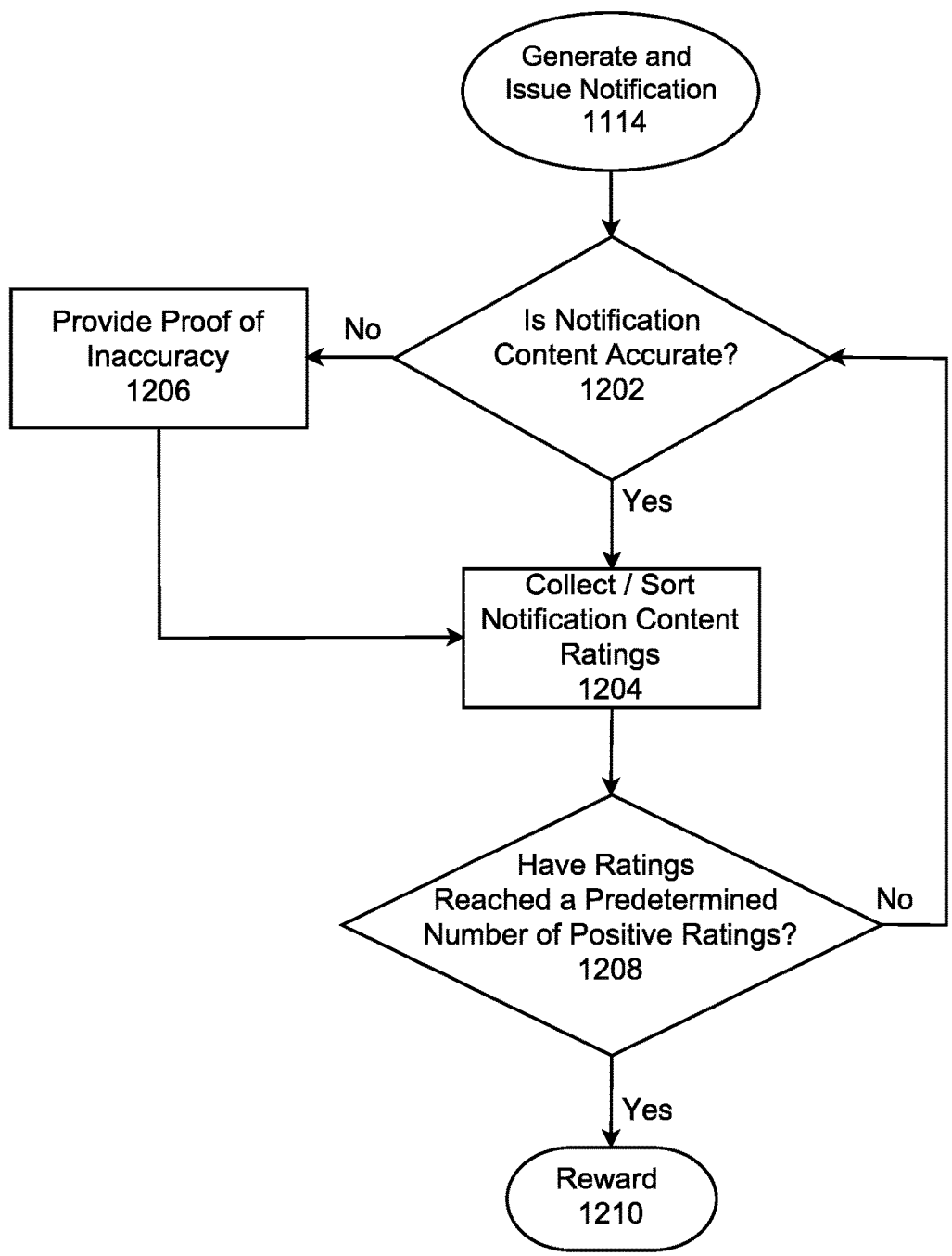
FIG. 13 is a flowchart illustrating a process of rating a notification in accordance with an exemplary embodiment of the present invention.

Turning now to FIG. 13, shown is a flowchart illustrating a process of rating a notification in accordance with an exemplary embodiment of the present invention. Once a user's intent to park is identified, the system may use legal parking related data contained within the database 106 to generate and issue a notification (Step 1114) according to the process described herein. A notification may be in part based on the legal parking related data from an informational source, or it may be in part based on legal parking related data from a submission to the user engagement panel 134 which received enough ratings to be incorporated into a notification as described in FIG. 12 herein. In any case, this information allows the user to park knowing the parking rules that apply to the current parking location.

After a notification is generated and issued (Step 1114), the user with firsthand experience may judge on whether the content of it was accurate by rating it (Decision 1202). If the user rates the content of notification positively (e.g., that the notification was accurate), the system may collect and sort the notification content ratings (Step 1204). Accordingly, accurate data that leads to an accurate notification may be reinforced and otherwise kept in place. If the user rates the notification content negatively (e.g., that it was inaccurate either in part or in whole), the user may then provide proof of why the notification was inaccurate (Step 1206). A negative rating may be given to the content of a notification when, for example, the parking prohibitions in effect for a particular location are in fact different from those cited in the notification, such as incorrect timing or day of the week information. In the case where the notification does not accurately reflect the parking rules, a user would submit a picture of the parking sign or another type of evidence as proof of that notification's inaccuracy in that situation. The ratings, both positive and negative, are recorded and collected until a certain type of rating has reached a predetermined number (Decision 1208). If the number of ratings does not reach the predetermined number, the system continues to collect and sort notification ratings. If the number of ratings reaches that predetermined number, then a monetary or non-monetary reward may be implemented to the user who first submitted legal parking related data contained in the rated notification (Step 1210).

After a notification has been issued, of the system receives feedback about the notification's accuracy from a user to correct, update, supplement, or otherwise modify legal parking related data within the database 106 in accordance with an exemplary embodiment of the present invention. When a user is approaching a specific parking location that the computing system 100 has identified as a potentially available legal parking location for that user, then the computing system 100 may issue a notification to the user to park. After that, three different situations may occur. First, the notification issued by the computing system 100 is inaccurate, where the user parks and finds out that a parking violation may potentially be issued. Second, the notification issued by the computing system 100 is inaccurate, where the user parks and receives a ticket. Third, the notification issued by the computing system 100 is accurate and the parking location is indeed legal, where the user parks and does not receive a ticket. In the case that the notification is inaccurate and a user finds out that a potential parking violation may be issued, the user may proof of inaccuracy through the user engagement panel that may be subject to ratings collected from additional users with firsthand experience. In the case that the notification is inaccurate and the user receives a ticket, the user may submit the ticket through the user engagement panel, which may also be subject to ratings from additional users with firsthand experience. If the user's submission reaches a predetermined number of ratings, the computing system 100 may update or otherwise modify the data in the database along with any corresponding notification and issue a reward to the user who made the submission (e.g., with payment equal to the amount of the citation received). Alternatively, however, the computing system may wait until the notification updated or otherwise modified by the user's submission reaches a predetermined number of ratings and only then issue a reward as described in FIG. 12 starting with step 1110 and further in FIG. 13.

Figure 14:
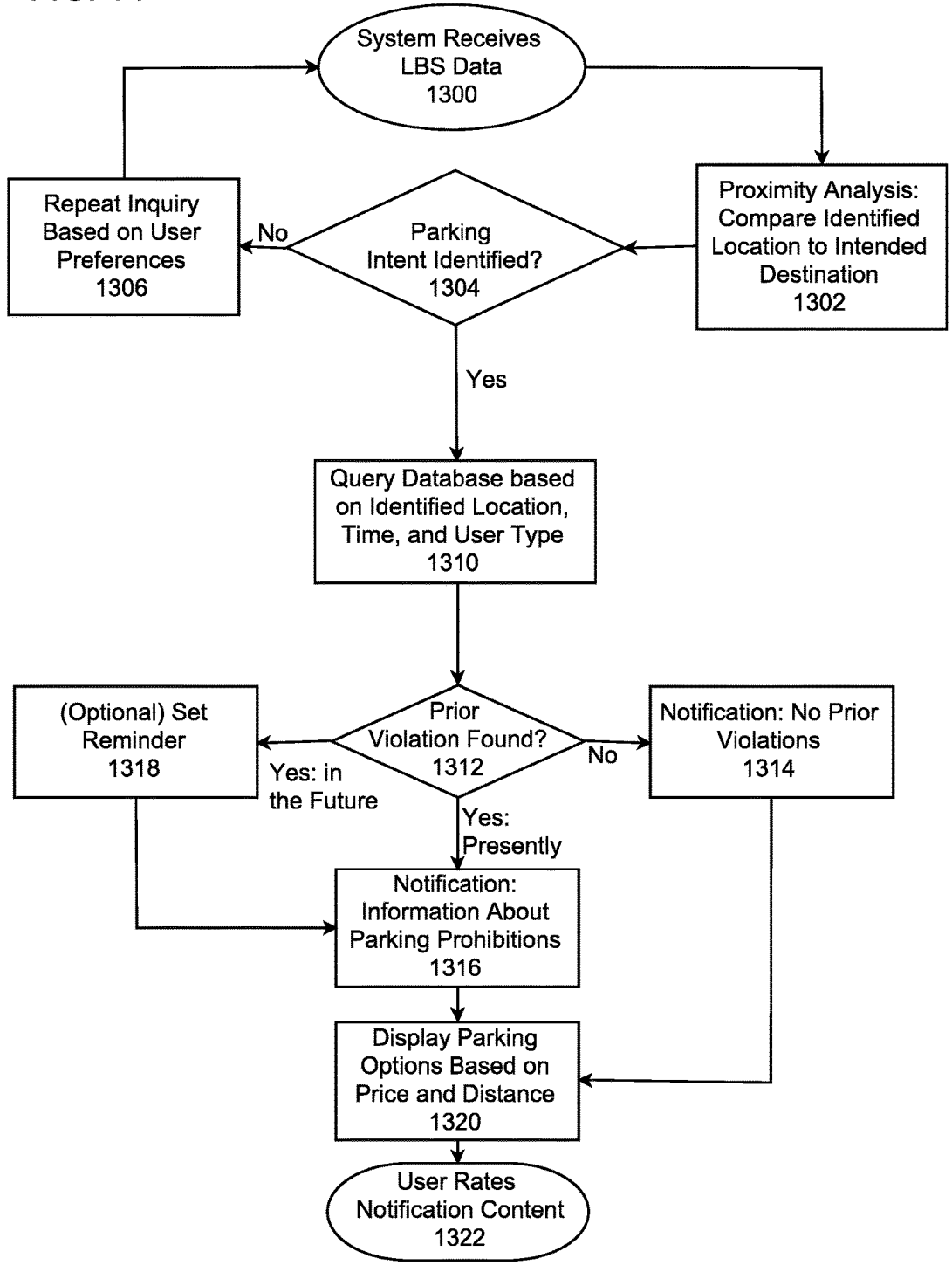
FIG. 14 is a flowchart illustrating a process of alerting the user to potentially available legal parking, among other things, based on the data in the database in accordance with an exemplary embodiment of the present invention.

Next, FIG. 14 is a flowchart illustrating a process of alerting the user based on the data in the database 106 in accordance with an exemplary embodiment of the present invention. The location coordinates (e.g., location data from a location based service (LBS)) of a remote computing device 132 may be periodically transmitted to and received by the computing system 100 (Step 1300). The computing system 100 can then compare the identified location to the intended destination of the user (Step 1302). If the user is close enough or otherwise indicates a desire to park (e.g., within a predetermined distance, moving at a certain speed, inputs a certain command), the computing system 100 may attempt to identify parking intent (Decision 1304). If no parking intent is identified, the computing system 100 may repeat the parking query based on the user's preferences (Step 1306) (e.g., a user may only want two notifications asking about parking intent). The computing system 100 may continue to receive location data from the remote computing device 132, in addition to data such as the vehicle's location and speed.

Once parking intent is identified, the computing system 100 may correlate the information it has received with the current time. The database 106 may be queried by the computing system 100 based on the identified location, the present time, and the user type (Step 1310) to determine if there is any applicable prior parking violation within an impact zone (Step 1312), in order for the computing system 100 to preclude potentially illegal parking locations. Where it is determined that the database 106 does not contain data of prior violations for that location, then the user may be issued a notification that the user may park at that location if it is available (Step 1314). Where it is determined that citations have occurred at the location and are applicable to the driver's user type and to the present time/day, then a notification may be issued to the user about applicable parking prohibitions that apply (Step 1316). Where it is determined that citations have occurred at the location at a time or day or there are prohibitions that might be applicable in the near future (e.g., within a period of time that the user is to be parked for), then an optional follow-up notification may be set (Step 1318), so that the user may be provided by the computing system 100 with a notification (Step 1316) at a later time to remind the user of the need to leave the parking location prior to potentially receiving a parking violation citation.

Additionally, available parking options can be displayed to the user based on the user's preferences or on a default regarding the price and/or distance from the identified location (Step 1320). The computing system 100 may obtain ratings from the user (Step 1322), as to whether the notification he or she received is accurate. Optionally, the system may be configured to automatically provide an alarm or other alert to the user once parked to indicate that the user is parked in an illegal parking location.

Figure 15:
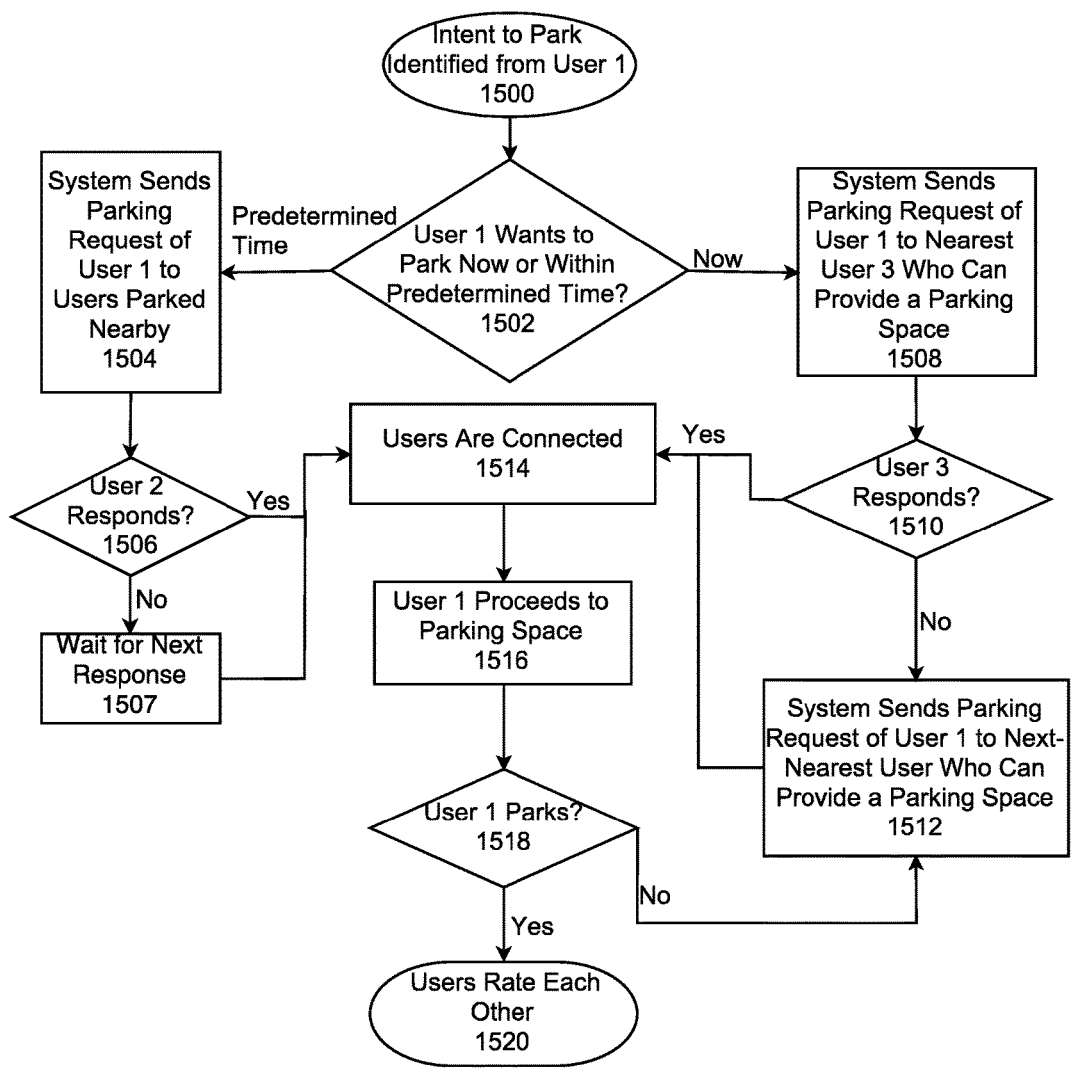
FIG. 15 is a flowchart illustrating an approach for users to post a demand or request for a parking spot to find another user who is about to vacate or might be willing to give up a parking spot to the user in accordance with an exemplary embodiment of the present invention.

An exemplary embodiment of the present invention can be implemented so that a user can either submit a request or receive an offer for a parking space. FIG. 15 shows a flowchart illustrating an approach for users, using the system of the present invention, to post a demand or request for a parking spot in order to find another user who is about to vacate or might be willing to give up a parking spot to the user in accordance with an exemplary embodiment of the present invention. When parking intent is identified for User 1 (Step 1500), the computing system 100 can send an inquiry to User 1 about whether User 1 would like to park now or sometime in the near future (Decision 1502). If User 1 wants to park in the near future, then the computing system 100 can send User 1's parking request to other users who are parked nearby (i.e., within a predetermined range) based on User 1's current, identified, or desired location (Step 1504). The system may determine if there is a first User 2 who responds to User 1's request (Decision 1506). If so, User 2 may be connected with User 1 and subsequently may allow User 1 to park at his or her parking space (Step 1514). Optionally, User 1 may be provided with more than one (1) users responding to User 1's request so that User 1 can choose from a plurality of nearby parking locations. The definition of "nearby" may be based on the user's preference or on a default. If there is no user who responds, the parking request may continue to be sent to users parked nearby for a predetermined amount of time to wait for a response (Step 1507).

If User 1 needs to park immediately, then the computing system 100 sends User 1's parking request to the nearest User 3 who can provide an available parking space (Step 1508). User 1 then waits for User 3 to respond (Decision 1510). If User 3 does not respond, then the request goes to the next closest User 3, until the request is accepted or expires (Step 1512). If a User 3 accepts the request, then the users are connected (Step 1514). When User 3 (or the next available user who responds) responds, User 1 and User 3 are connected (Step 1514). User 1 might then drive to the parking space (Step 1516), or may choose to start this process again if User 3 (or whoever accepted the request) does not eventually leave (Decision 1518) or may just park at the parking spot after User 2, 3, and so on, leaves the parking spot, and the users rate each other (Step 1520). In such an embodiment, the computing system 100 may be configured to provide a plurality of legally parked users with the option to indicate a location where they are legally parked and a time at which they may be vacating the legal parking location.

In another embodiment, the system may send a parking request of User 1 to the nearest user within a predetermined distance who can provide a parking space. If that user declines or does not respond, the system may send the parking request to the next-nearest user within a predetermined distance who can provide a parking space. If no users respond to the parking request, the system may expand the predetermined distance for which to send the parking request to additional users.

Indicating parking intent may prompt the computing system 100 to lock the user's location and to send a notification to the users who have the intent to leave and may be matched with the original user who wants to park. Indicating leaving intent might also prompt the computing system 100 to lock the user's location and to send a notification to the users within a certain radius or distance of the user who has the intent to park. Either indication of parking intent may allow any potential providers to send offers with relevant parking space information to the user who is trying to find a parking space. Matching users may make full use of the social media feature as users are connected in order to successfully send and receive offers within the platform of the system. Additionally, another purpose of matching and connecting users with parking intent or leaving intent is to allow users to communicate with other users with a specific purpose without having users randomly approach or drive around to ask if drivers are leaving. This method may be more time efficient, as users might approach other users with a specific purpose of assisting each other. Socially connecting users also promotes future transactions between the users due to prior successful parking transactions. Users may be able to control whether or not they receive these notifications by either turning this function on or off in the settings of the system. Social connections are also helpful because the government may not allow for the exchange of parking spaces for a user's monetary gain. However, if allowed by law, the system may also allow for monetary payment and/or non-monetary rewards as a consideration option for accepting parking related information.

Figure 16:
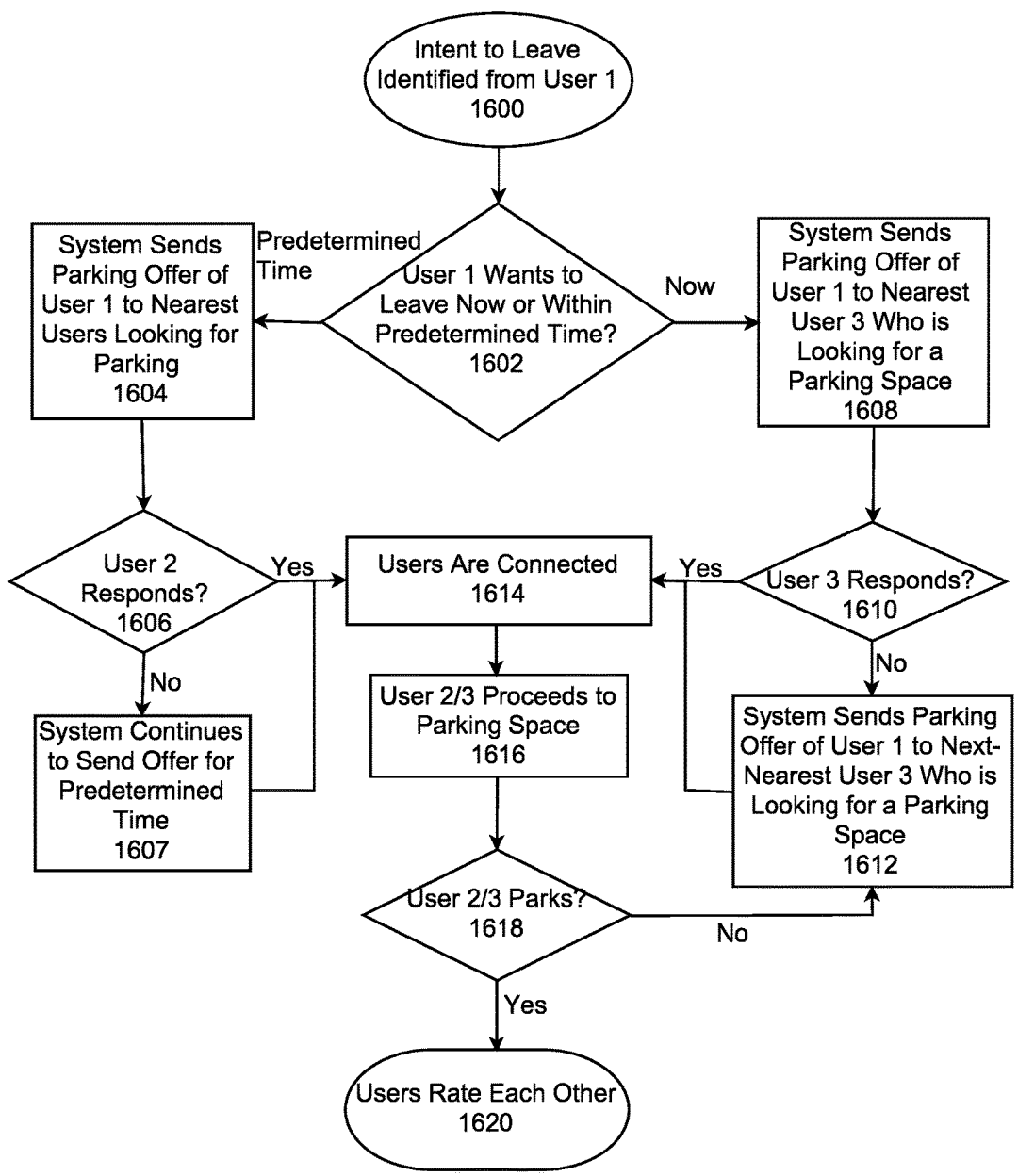
FIG. 16 is a flowchart illustrating an approach for users to post an offer for a parking spot to find another user looking for available legal parking and willing to accept the offer of a parking spot in accordance with exemplary embodiment of the present invention.

Similarly, FIG. 16 shows a flowchart illustrating an approach for users to post offers for a parking spot to find another user looking for available legal parking and willing to accept the offer of a legal parking spot in accordance with exemplary embodiments of the present invention. As discussed above, exemplary embodiments of the system and method of the invention may be used to find a match and/or generate a notification when a User 1 shows intent to leave his or her parking spot (Step 1600). After the computing system 100 receives User 1's offer of an available parking spot, it determines if the offer is for now or within a predetermined time (Decision 1602). If User 1 is offering a parking spot at some later predetermined time, then the computing system 100 may send User 1's offer to other users located nearby (User 2) based on the identified location (Step 1604). The system may determine whether a first User 2 responds to the parking offer (Decision 1606). If so, the first User 2 to respond may then be connected to User 1 to discuss being able to park at User 1's parking spot (Step 1614). If there is no user who responds, the system may continue sending the parking offer to nearby users for a predetermined amount of time to wait for a response (Step 1607).

If User 1 is offering his or her parking spot now, then the computing system 100 may send User 1's offer to the closest other user (User 3) who is looking for a parking space (Step 1608). If the nearest User 3 does not respond (Decision 1610), then the offer may be sent to the next closest User 3 until the request is either eventually accepted or expired (Step 1612). If a User 3 responds to the offer, then User 3 may connect with User 1 (Step 1614). After connection, the computing system 100 may send the parking space location to User 3 who accepted the offer, allowing him or her to drive to User 1's parking space (Step 1616) and wait for the spot to become available by User 1 leaving. After User 1 leaves and/or User 3 parks (Step 1618), the users can rate each other (Step 1620). The system may also be configured to issue monetary or non-monetary awards or rewards to users giving up their legal parking spots through the system.

Alternatively, the system may be configured to enable User 1 to compensate User 2 or 3 for giving up their legal parking space through the system.

In another exemplary embodiment of the present invention, a user (e.g., User 1) may post a demand or request for a continuous parking space for duration of 10 hours and an amount he/she is willing to spend (e.g., $15) in a neighborhood. Those who have the authority to manage parking spaces or parking garages/facilities in that neighborhood and are registered with the system, may see this demand or request, and based on their own availability, pricing, and/or other factors affecting parking space availability, may make an offer to User 1 with details on how long they can provide a space, pricing information, and the location of the parking space/garage. Alternatively, another user, for example User 2, may see User 1's demand and offer User 1 a space at User 2's garage to negotiate for $20 for the 10 hours. A third user, for example User 3 may offer User 1 a space at User 3's garage in another nearby neighborhood, for $10 for the 10 hours. User 1 may have several options when viewing these offers. User 1 may, for example, decide to message User 2 or 3 to make a counteroffer and negotiate the terms of the pricing or duration depending on User 1's needs. For example, User 1 may ask for a cheaper price from User 2 because User 1 would prefer to make a deal with User 2 since User 2's garage may be in a more convenient area for User 1. Accordingly, users may communicate back and forth until the terms are agreed upon by both parties. Final prices can be kept confidential and the deal may not be disclosed to any third parties. User 1 can also decide not to answer these offers and wait for other possible offers from other users. Additionally, whichever user accepts User 1's offer first may complete the deal and all other users may be precluded. If no other users accept the offer, then the cycle may begin again where User 1 can initiate another demand with a different price, which may create an acceptance from another user, resulting in a successful deal. Communications within the system of the mobile application between the user who needs a parking space and the users who can provide a parking space includes but is not limited to, live-chat, messaging, and any other form of communication as allowed by the Administrator of the proposed Application.

Intent of the user to leave a legal parking space may also be identified by determining and analyzing the speed and location through the accelerometer and the location identifier 204, respectively. When the computing system 100 detects motion after a vehicle has been in park, it may track the geolocation of each individual user along with the vehicle and/or user's speed, in which a change in acceleration or change in location can trigger the system to recognize leaving intent. Based on the change in acceleration and change in location, the system may then send a notification to the user to ask if the user is leaving a parking space, for example, "Leaving?" If the user chooses "Yes" then the system may find other users within a certain radius of the current user's location who are showing parking intent or users who request to be connected because they are looking for parking. However, if the user does not respond to the alert after a certain time, for example, 3 seconds then the inquiry may disappear automatically. Users may also press a button on the screen of the mobile device to show leaving intent and specify that the user is leaving now or leaving at a certain time in the future.

Figure 17:
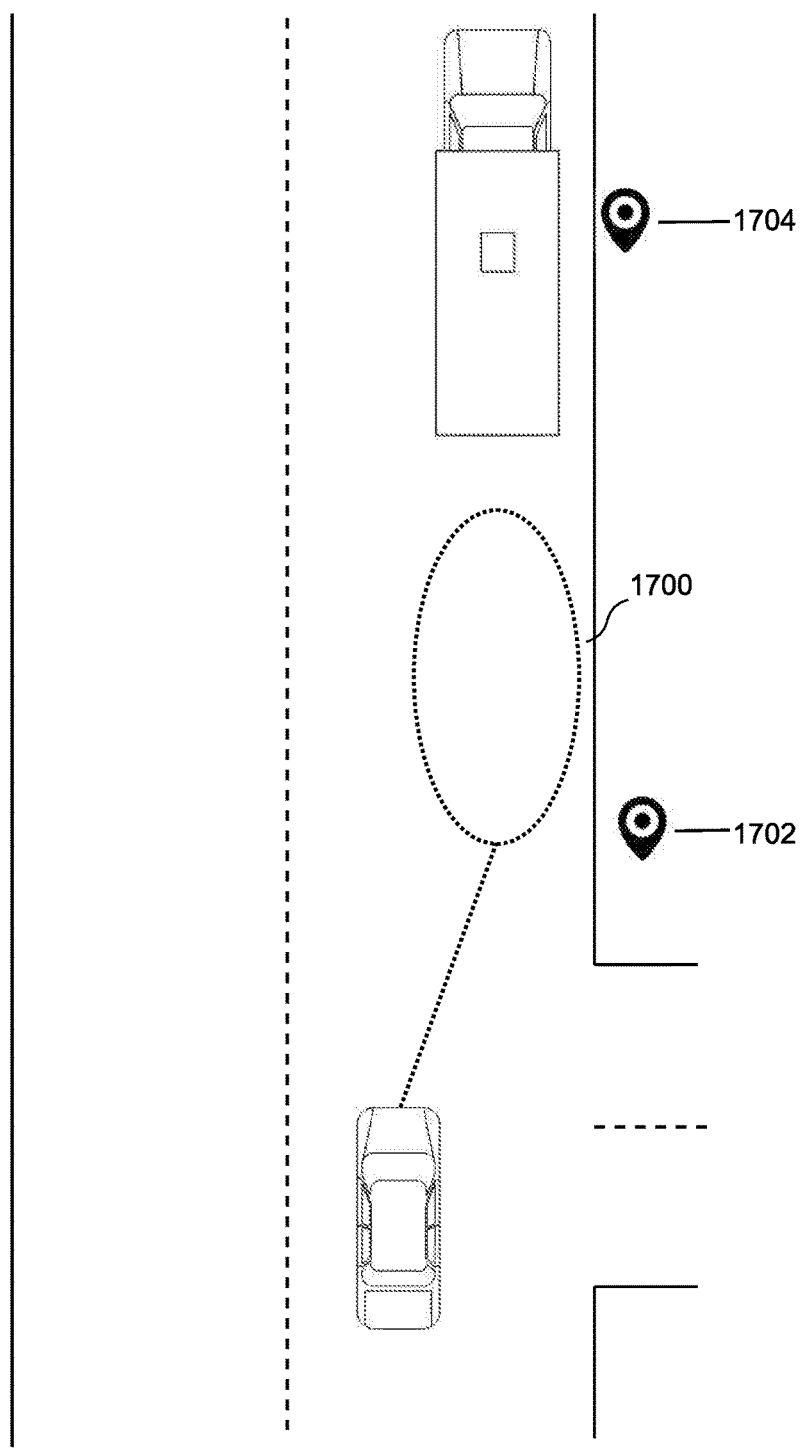
FIG. 17 is a schematic diagram illustrating a system for inferring a potential parking prohibition based on location in accordance with an exemplary embodiment of the present invention.

Computing system 100 may also be configured to infer potential parking prohibitions based on certain relevant data stored in database 106. In FIG. 17 shown is a schematic diagram illustrating a system for inferring a potential parking prohibition based on a location in accordance with an exemplary embodiment of the present invention. Here, the computing system 100 may infer a parking prohibition based on location to preclude that location from potentially available legal parking locations. The computing system 100 may analyze legal parking related data that is available in the database 106 for the surrounding locations, and compare such data with RRLC. If the intended parking location 1700 of the user falls between at least two locations, 1702 and 1704, with a record of previously incurred parking violation citations applicable to the user type of the user, the computing system 100 may infer that the user may receive a parking violation citation at that intended parking location 1700. This may cause the parking location to be precluded from being displayed as a legal location. Each of the two previously incurred parking violation citations may be based on the same reasons, and those reasons may correspond to the inference. Those reasons may be for the same parking violation citation, such as parking in a No Parking Any Time zone. An inference might not be made accurately if, for example, one parking violation citation is for an expired meter fee while the other parking violation citation is for parking in a loading zone. Furthermore, some parking violation citations may not be the basis of an inference such as a parking violation citation issued for the reason of an expired meter.

The distance between locations where the intended parking location falls may depend on various factors. One factor which may affect the distance between those two locations may be what RRLC applies and based on parking violation data. The computing system 100 may predetermine this distance based on the applicable RRLC. In addition, the distance may be predetermined based on location, where the distance in a denser city with higher instances of parking violation citations may be smaller than that of a rural area with low instances of parking violation citations. The predetermined distance between locations may be on the same side of the street on a city block, or it may be a shorter predetermined distance between locations. Based on the inferred prohibitions of parking violation data, one or more locations where it would be illegal for the user to park can be precluded from being listed as potentially available legal parking.

According to an exemplary embodiment of the present invention, to preclude illegal parking locations for purposes of notifying a user of potentially available legal parking locations, illegal parking locations that are applicable to at least the user type that the user belongs to need to be identified first. There may be an occasion when the computing system 100 may find a parking violation by directly correlating the user type with the present location and the present time in mining the database 106 for legal parking related data. A direct correlation may be in such a case where there has been a parking violation citation issued at the current location at the current time, which was issued based on a parking prohibition relating to the same user type, and relating to the same type of vehicle or type of vehicle plate. For example, a direct correlation may be when a non-commercial vehicle user is given a notification that warns against parking at Location X at 5:15 PM on a Tuesday because there is data in the database 106 which matches the situation: a non-commercial vehicle receiving a parking violation citation for parking at Location X at 5:15 PM on a previous Tuesday. At least these three points—type of vehicle, location, and present time—all correlate directly, as the two times (5:15 PM) occur at identical points in time. In this instance, a potential parking prohibition does not need to be inferred, as there is an exact data point which establishes the basis for the notification.

Since violation codes may be different depending on the agency that issues tickets and collects ticket penalties, violation codes data input into the database 106 may include violation codes from various agencies and/or statutory codes as they appear when written into law. The computing system 100 may use these violation codes with the matching section codes and their respective meanings, which are stored in the database 106, to infer the time frame and distance frame to which the no standing rule applies as no standing is usually for 24 hours and may extend for a whole street block. If a user does not participate by reporting, then the system administrator may hire an employee to physically inspect the location and verify the distance frame. The computing system 100 may use this information to accurately alert the user based on the vehicle's distance or time frame. Though inferences might not be 100 percent accurate all the time, as there are sometimes exceptions to rules on a certain street between two similar locations, the combination of knowing the codes that underlie the reasons for getting a ticket in the first place and having a user rate the notification and the information allows for that potential inaccuracy to be accounted for. Tying a notification back to a user engagement panel 134 may increase efficiency and accuracy, allowing the notification to be corrected, updated, supplemented, or otherwise modified, as well.

According to exemplary embodiment of the present invention, in addition to precluding locations which are identified to have data of one or more potential parking prohibitions either directly applicable to the user or applicable by inference, the central processing unit may be configured to preclude locations in or near a tow zone area which includes but is not limited to private parking only, permit only, temporary road repairs, access for emergency services, and driveways which cannot be blocked. Other situations may include handicapped parking, reserved parking, permit parking only, and any other parking spaces designated for special purposes, wherein special purposes parking locations may be reported by one or more users, interested individuals, private entities, and the system administrator who may also collect such information from sources. "No parking," "Tow away zone," "24 hours active driveway," etc., are usually indicated with lines, signs and/or words that state for example, "Tow Zone" or "Private Parking Only." Tow away zone information may include a time frame when parking is illegal at an identified location of the user and the user's vehicle; the distance to or from the tow away zone where parking is illegal; and information about private and public tow away zones, along with relevant information about towing companies and costs and penalties associated with the user's vehicle being towed away.

People who are authorized to manage such spaces subject to towing can register towing information, or a user can report this information, which may be used by the computing system 100 to notify other users who are not authorized to park in the space at any time. Important towing information includes but is not limited to location of the tow zone, towing company name and telephone number, penalty for parking in the tow zone, and other relevant contact information. The user may check the parking location by pressing a button on the display of the computing device 132 to show the towing information such as the phone number, towing penalties, and other contact information if it has been registered by the people who are authorized to manage or access such tow zone space. Both time and resources may be saved because a user is deterred from parking in the tow zone. Tow zone areas may also be indicated on the map display through different colors to reflect that temporary parking is not allowed, for example, due to a temporary tow zone notice for road repairs.

Potential parking prohibitions directly applicable to a user are predicted based on parking violation related data including a location identical to an illegal parking location, parking violation related data including a point in time identical to the present time, or parking violation related data including a location identical to an illegal parking location corresponding to a point in time identical to the present time.

Alternatively, the computing system 100 can predict potential parking prohibitions applicable to the user by inference based on at least relevant parking locations, relevant parking times, or relevant parking locations corresponding to relevant parking times. Based on relevant parking locations, the computing system 100 can predict potential parking prohibitions applicable to the user from at least two relevant parking locations corresponding to one parking time, where each of the two relevant parking locations has at least one previously issued parking violation citation. In this situation, the illegal parking location is between the two relevant parking locations, and the two parking locations are at a predetermined distance from each other.

The computing system 100 can also predict potential parking prohibitions applicable by inference based on at least two relevant parking times corresponding to one relevant parking location. Here, each of the two relevant parking times will have at least one previously issued parking violation citation, and the present time is between the two relevant parking times and the two relevant parking times are within a predetermined time frame. This time frame may be based on a point in time such as a time of day, a time of week, a time of month, or a time of year. In this situation, the illegal parking is at a location with at least two relevant parking times.

Additionally, the computing system 100 can predict potential parking prohibitions applicable by inference based on at least two relevant parking locations corresponding to at least two relevant parking times. The illegal parking location of the user here is between at least two relevant parking locations at a predetermined distance from each other corresponding to the present time being between at least two relevant parking times within a predetermined time frame.

Also, the computing system 100 can predict potential parking prohibitions applicable to the user by inference based on at least previously issued parking violation citations for the same type of parking violation from an issuing agency.

To identify potentially available legal parking locations, the computing system 100 may also preclude occupied parking locations as well as parking locations which are predicted to have potential parking violations from being considered as potentially available legal parking locations. Thus, based on the parking locations that are precluded, the remaining parking locations are identified to be potentially available legal parking locations. Thus, in one scenario, if potential parking violations are predicted at a specific location at a certain time or within a certain time frame, the computing system may infer that at all other times not including that certain time or at all other times outside that certain time frame, that specific parking location is a legal parking location. For example, if the only potential parking violations are predicted at a location from 7:00 AM to 7:00

PM, then the computing system may infer that from 7:01 PM to 6:59 AM the same location may potentially be a legal parking location. In another scenario, if potential parking violations are predicted at the identical time or within an identical time frame for at least two relevant locations, the computing system 100 may infer that locations that do not fall in between these at least two relevant locations and that do not have any violation at that identical time or within that identical time frame, may potentially be legal parking locations at that identical time or at that identical time frame. For example, if potential parking violations are predicted at 7:00 AM or between 7:00 AM and 8:00 AM at both location A and location B but not for relevant location D, which is not between A and B, then the computing system may infer that at 7:00 AM or between 7:00 AM and 8:00 AM location D may potentially be a legal parking location. Essentially, these predictions of potential parking violations may be used to identify parking locations as potentially legal parking location.

In another embodiment of the present invention, the computing system 100 may identify potentially available legal parking locations directly applicable to a user based on previous available legal parking locations including an available legal parking location identical to the intended parking location; including a point in time identical to the present time; or including an available legal parking location identical to the intended parking location corresponding to a point in time identical to the present time.

The computing system 100 may predict by inference whether a location is a potentially available legal parking location based on whether the present time is associated with previous legal parking locations for the user type of the user at the same time, and that same time is within a predetermined time frame.

The computing system 100 may also predict by inference if an intended parking location is a potentially available legal parking location based on whether the intended parking location falls between at least two locations with a record of previous legal parking locations for the user type of the user.

The computing system 100 can also predict by inference if an intended parking location is potentially available legal parking location applicable based: on at least two relevant parking locations corresponding to one parking time, where each of the two relevant parking locations has a record of legal parking for the user type of the user; at least two relevant parking times corresponding to one relevant parking location, where each of the two relevant parking times has a record of legal parking for the user type of the user (e.g., the present time is between the two relevant parking times and the two relevant parking times are within a predetermined time frame, which may be based on a point in time such as a time of day, a time of week, a time of month, or a time of year); and/or at least two relevant parking locations corresponding to at least two relevant parking times. The potentially available legal parking location of the user would be between at least two relevant parking locations at a predetermined distance from each other corresponding to the present time being between at least two relevant parking times within a predetermined time frame. These predictions which are directly applicable or applicable by inference may cause the parking location to be displayed as a potentially available legal parking location.

Figure 18:
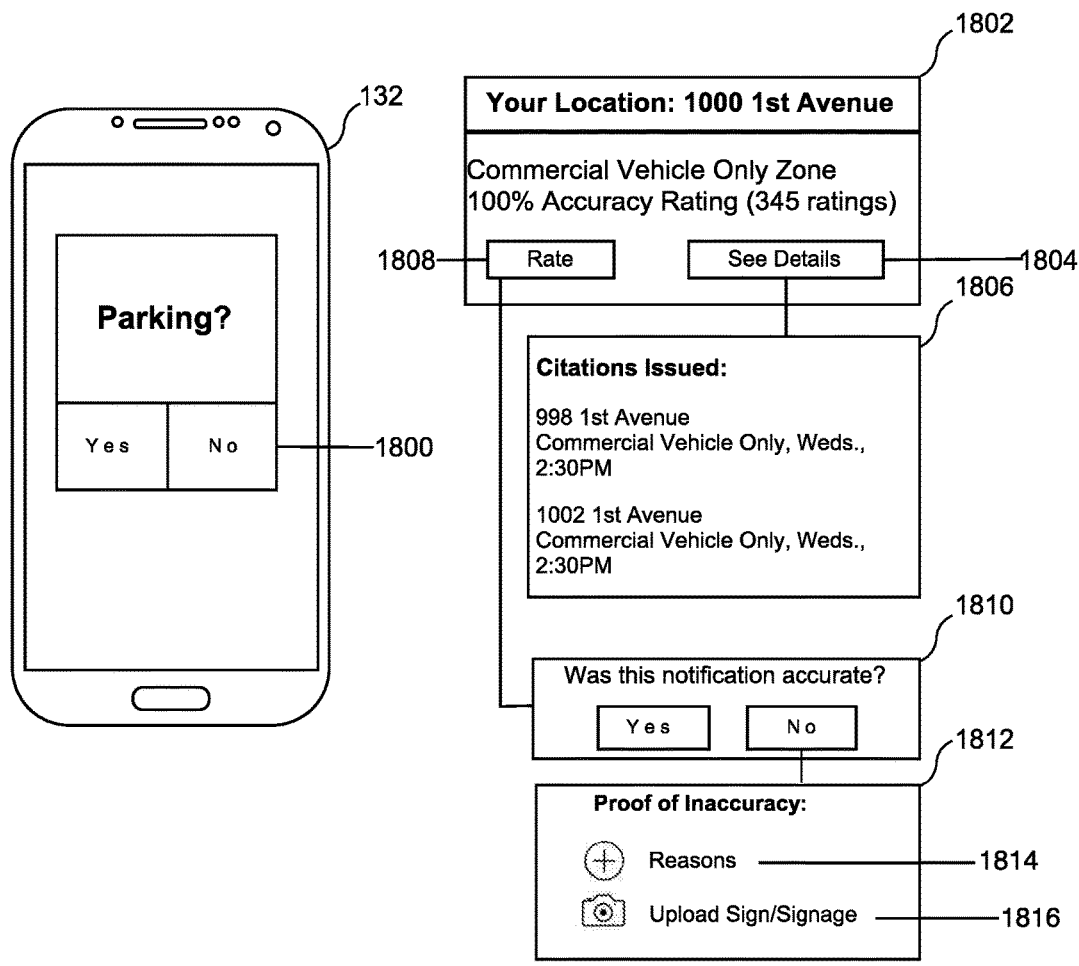
FIG. 18 is a schematic diagram illustrating a user's remote computing device and a notification that a user may receive regarding a potential parking prohibition based on location in accordance with an exemplary embodiment of the present invention.

Referring next to FIG. 18, shown is a diagram illustrating a user's remote computing device 132 and a notification 1802 that a user may receive regarding a potential parking prohibition based on location in accordance with an exemplary embodiment of the present invention. Once the computing system 100 identifies the user's parking intent, it issues a prompt 1801 to the user to confirm his or her parking intent on the user's remote computing device 132 by clicking either "yes" or "no" 1800. When the user is parking and has clicked "yes," the system may be prompted to display a notification to the user regarding a parking prohibition 1802 based on the user's current location. Although these windows are not illustrated as being displayed within the user's remote computing device 132, it is to be understood that this depiction is merely for purposes of providing a clear illustration and that these dialog windows would be displayed within the user's remote computing device 132.

In the example shown in FIG. 18, the user's identified location is 1000 1st Avenue. There may be a summary of relevant information, such as what parking rule or regulation applies to the user's intended parking location, which in this case is a prohibition regarding non-commercial vehicles parking in a commercial-vehicle only zone. Also displayed is a comparison of the collected ratings for this notification 1802. In this example, the user's notification has been proven to be accurate by 100 percent of users' ratings. If the user would like to know the reasoning behind this notification, the user may click "See Details" 1804 to view details relating to why the computing system 100 has generated this notification 1802. A dialog box containing relevant citations issued 1806 can then be shown to the user. In this example, there are two relevant citations issued on the relevant day of the week at the relevant time, respectively. As shown, both citations were issued to non-commercial vehicle users for parking in a commercial-vehicle only zone. The user can then rate this part of the entire notification and its related information regarding its accuracy by clicking on a "Rate" button 1808, which brings up a notification rating panel 1810 on the user's computing device 132. This way the user may give a positive rating of "Yes" or a negative rating of "No" to the notification. By giving the negative rating, the system may prompt the user to further submit proof of inaccuracy 1812. In this prompt, the system may ask the user to submit or type in the reasons 1814 as to why the notification was inaccurate or submit a picture of the signage 1816 in question or a parking violation citation.

Figure 19:
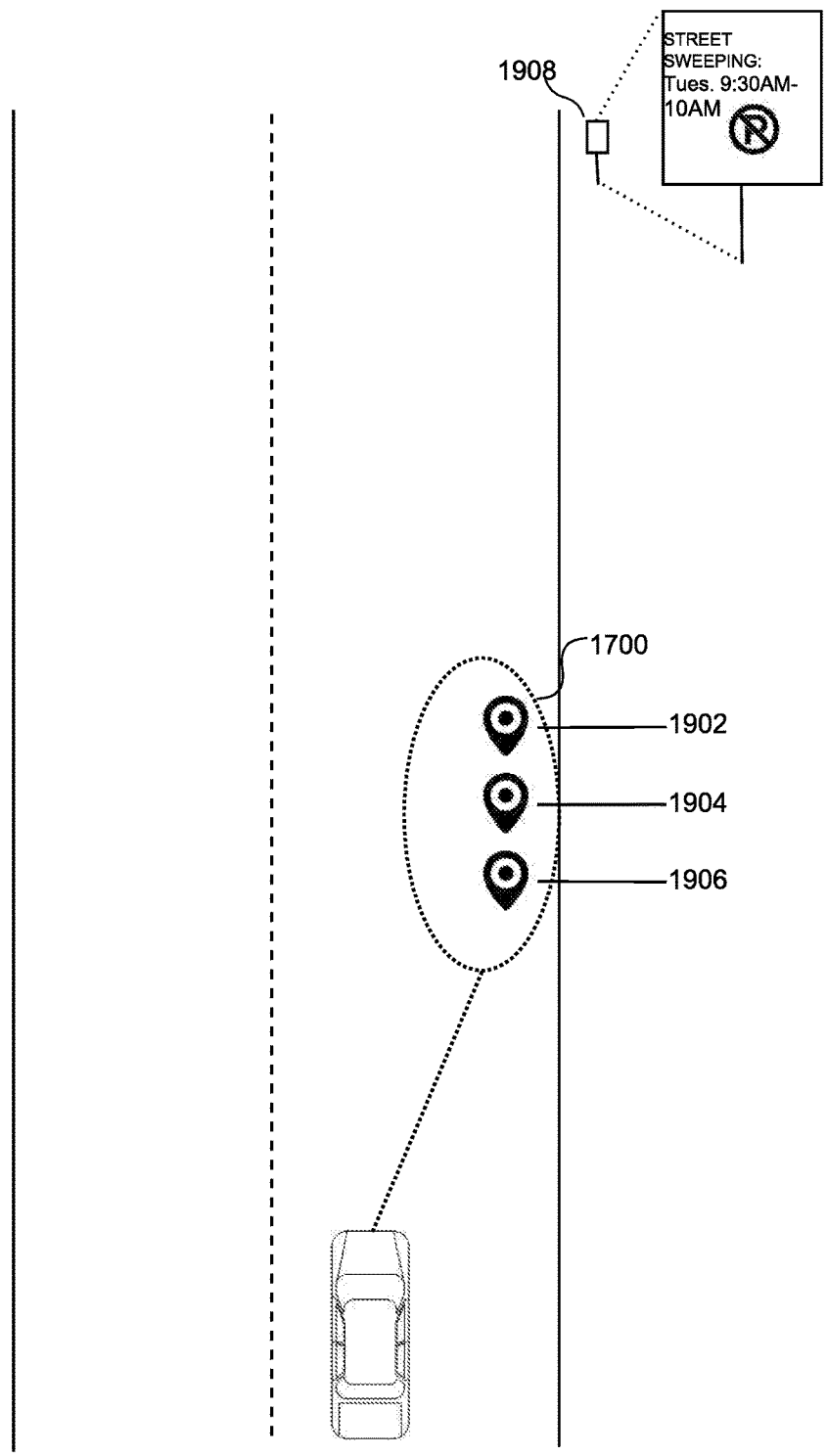
FIG. 19 is a schematic diagram illustrating a system for inferring a potential parking prohibition based on time in accordance with an exemplary embodiment of the present invention.

Another inference scenario may be seen in FIG. 19, which shows a diagram illustrating a system for inferring a potential parking prohibition based on time in accordance with an exemplary embodiment of the present invention. Here, the computing system 100 may infer a parking prohibition based on time at the user's intended parking location 1700 to preclude that parking location from having potentially available legal parking locations. If the present time is associated with one or more parking violation citations, 1902, 1904, and 1906 within a predetermined time frame, which all relate to the same parking prohibition 1908, the computing system 100 may infer that the user may receive a parking violation citation at that intended parking location 1700 and at the present time, and therefore preclude that parking location as illegal parking location for that user at that present time.

The predetermined time frame may be predetermined based on applicable RRLC, or the predetermined time frame may be a time frame that is based on the time of issuance of a parking violation citation. This time frame may also be a time frame such as one, two, or three hours, or a larger time frame such as ten hours or any other duration depending on relevant factors, such as a prohibition for street cleaning which applies for an hour and a half.

For example, a possible parking prohibition may be no parking between 9 AM and 5 PM, where the time frame may be an eight-hour time frame. The database 106 may have a record of a parking violation citation received by a vehicle parked at Location A at 9:13 AM, where the known RRLC is a parking prohibition due to street cleaning which applies from 9:00 AM-10:30 AM. The time frame in this scenario may be predetermined to be an hour and a half based on the duration of the street cleaning prohibition. The computing system 100 may analyze the parking violation citation to infer that the same or different vehicle parked at Location A may receive a parking violation citation if they park at 9:51 AM, because 9:51 AM is within the predetermined time frame. In another scenario, the database 106 has a record of a parking violation citation at Location K at 7:15 PM. A notification may be issued to a user who intends to park at Location K at 7:21 PM where Location K is precluded from being identified as a potentially available legal parking location, because 7:21 PM falls within the same half-hour time frame as the parking violation citation.

A time frame may be applicable to several situations: for example, "No Standing Anytime" where the time frame would need to indicate 24 hours, so any user whose geolocation data shows a location that is in a No Standing Anytime zone may receive a notification at any time. Time frame data may also be applicable to alternate-side parking, for streets that do not allow parking during certain times due to government street cleaning services, which for example is usually applicable for half an hour (e.g., 9:00 AM-9:30 AM) or temporary tow zones notices, which for example, are usually applicable for a day or a few days. The database 106 may connect with the computing device 132 to send an automatic notification, reminding the user to move a vehicle due to street cleaning rules.

According to an exemplary embodiment of the present invention, the computing system 100 may also infer a parking prohibition based on time by analyzing similar times on different days of the week. If the times are at the same time every day, or at the same time on the same day, the computing system 100 may infer that there may be a parking prohibition at that time on that day, or that time every day. For example, a vehicle at Location B at 9:30 AM on Tuesday receives a parking violation citation. The same or different vehicle at Location B at 9:30 AM on Wednesday receives a parking violation citation. The same or different vehicle at Location B at 9:30 AM on Thursday receives a parking violation citation. The computing system 100 may analyze these parking violation citations to infer that the same or different vehicle parked at Location B at 9:30 AM on a Friday may most likely receive a parking violation citation. In another example, a vehicle at Location C at 9:30 AM on Tuesday, September 1st receives a parking violation citation. The same or different vehicle at Location C at 9:30 AM on Tuesday, September 8th receives a parking violation citation. The computing system 100 may analyze these parking violation citations to infer that the same or different vehicle parked at Location C at 9:30 AM on Tuesday, September 15th may receive a parking violation citation. One of ordinary skill in the art may appreciate that a notification based on an inference may not be completely accurate, as implied by the word "infer." However, it is also to be understood that a notification may be corrected, updated, supplemented, or otherwise modified by ratings from users. A notification containing legal parking related data that is based on inference is valuable for a user because it may be sent to a user even when there may not be much information available; in this manner, a user may be given reasonably accurate information in situations with potentially little data regarding legal parking.

Figure 20:
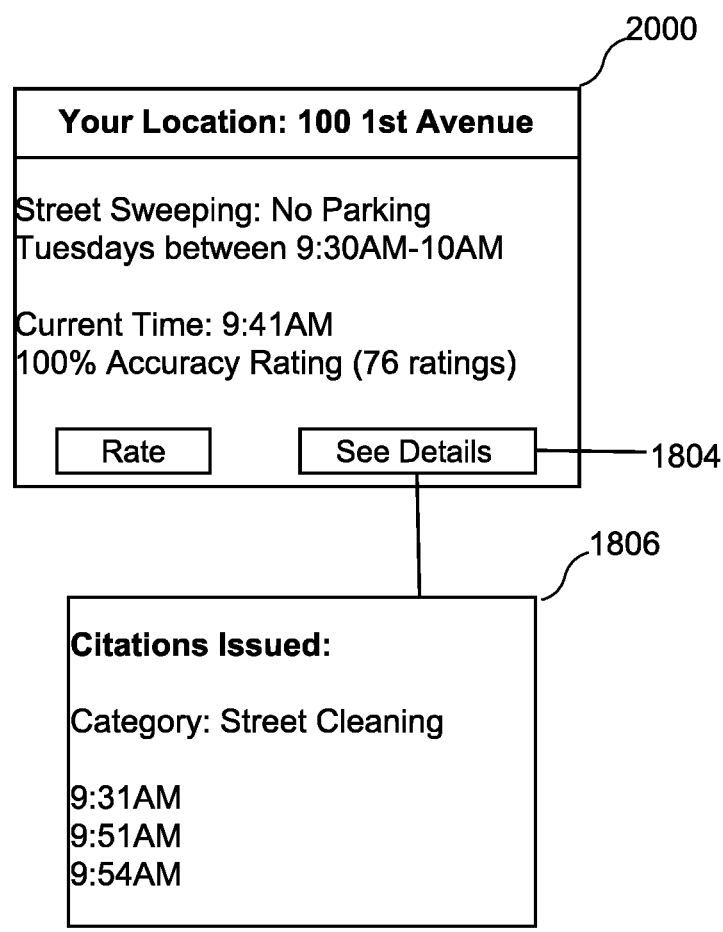
FIG. 20 illustrates a notification that a user may receive on the user's remote computing device regarding a potential parking prohibition based on time in accordance with an exemplary embodiment of the present invention.

Further to the example provided in FIG. 19, FIG. 20 shows a diagram illustrating an example of a notification that a user may receive regarding a potential parking prohibition 2000 based on time in accordance with an exemplary embodiment of the present invention. Based on the user's intended parking location 1700 and the parking violation related data associated with the user's location, 100 1st Avenue, and current time and day, Tuesday, 9:41 AM, the computing system 100 might issue a notification to advise the user against parking at an intended parking location 1700 because, according to the data in the database 106, no parking is permitted between 9:30 AM and 10 AM due to street cleaning. If the user is curious about the details of this notification, the "See Details" 1804 button is available to click. When the user clicks on the button, the user is taken to a details panel that displays the relevant citations issued 1806. In this depiction, the category of applicable citations is street cleaning, which is also the reason for these citations' issuance. Also displayed are the relevant times of when those citations were issued; since the database 106 contains a record of parking citations issued at 9:31 AM, 9:51 AM and 9:54 AM, and the current time is 9:41 AM, the system may infer that the user may potentially receive a parking violation citation at the user's intended parking location 1700 at this current time.

Figure 21:
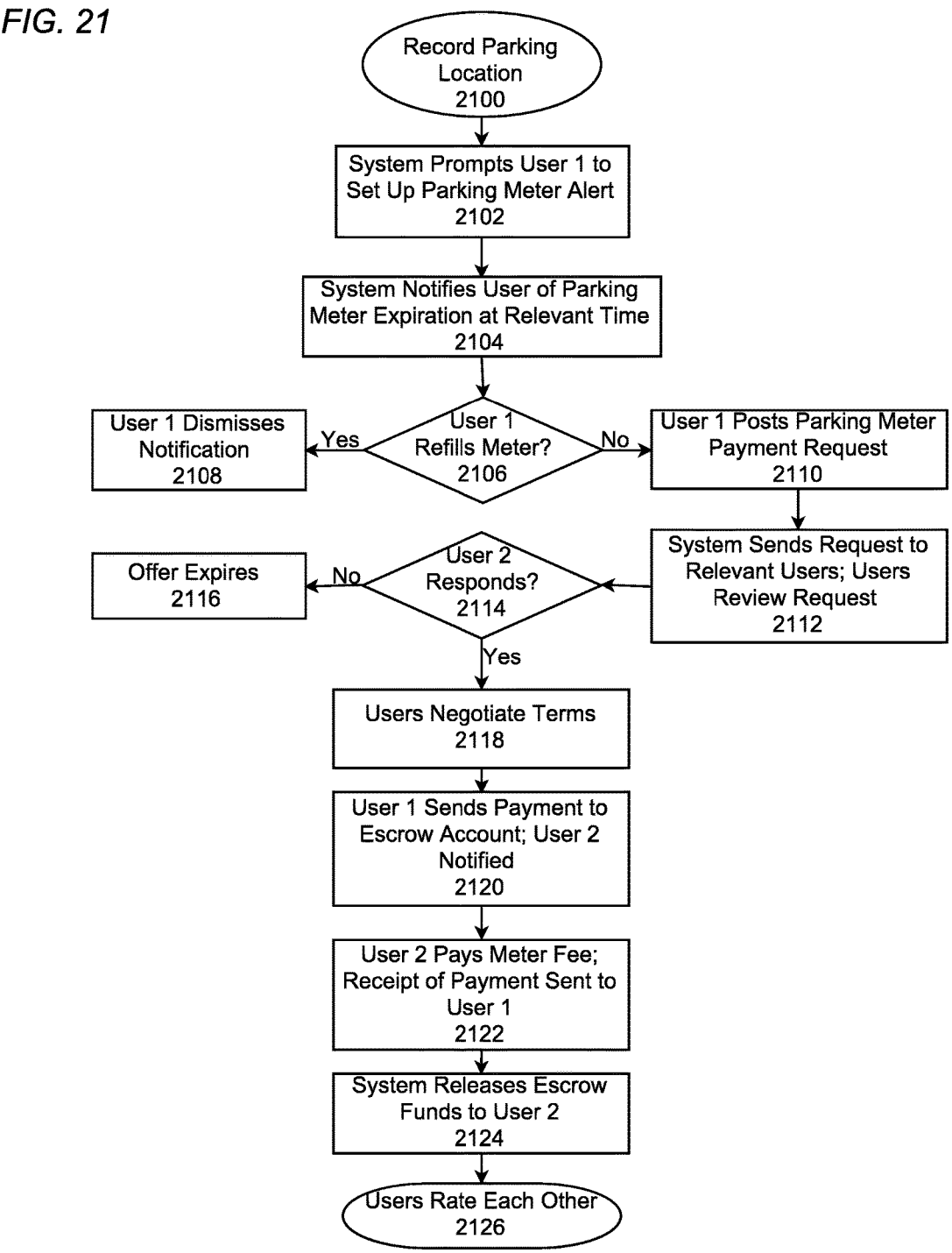
FIG. 21 is a flowchart illustrating an approach for a user to post a demand for providing an expiring parking meter payment in accordance with an exemplary embodiment of the present invention.

The system may also allow a user to post demand for providing an expiring parking meter payment, in accordance with an exemplary embodiment of the present invention, as depicted in the flowchart of FIG. 21. According to an exemplary embodiment of the present invention, when User 1 arrives at a parking spot, the location and relevant prohibitions of the parking spot may be recorded (Step 2100), where User 1 can be guided by the computing system 100 to set up an alert when a meter is to expire (Step 2102). The computing system 100 may send a notification to a user's computing device 132 (Step 2104) to remind the user about the approaching parking meter expiration. The location of the parking meter and the expenses required for a time extension can be sent to User 1 through SMS, phone call, email, etc., and the user can decide to refill the meter by himself or herself (Decision 2106). The User 1 can extend the time remaining on the parking meter by refilling the parking meter by himself or herself, and dismiss the notification (Step 2108).

According to an exemplary embodiment of the present invention, a user may be able to pay a parking meter fee from his or her remote computing device 132, if the fee can be paid online or otherwise from the remote computing device 132. If the User 1 cannot refill the parking meter, then User 1 may seek the assistance of another user to help in refilling the parking meter (e.g., an assistance request) by posting a parking meter payment request (Step 2110), which is sent to relevant users, who review the request (Step 2112). A parking meter payment request can include the fee of the parking meter and the service fee that the User 1 offers. User 1 waits for a User 2 to respond to the request (Decision 2114). If no user responds within a certain (e.g. a predetermined) amount of time, the offer expires (Step 2116). Users can then choose to accept or reject this offer, and counter-offer another service fee if they do respond. For example, if a user realizes that the parking meter is running out of time and cannot refill the meter for reasons out of the user's control, the user may use the remote computing device 132 to send out a message to other users within a certain distance of the location of the parked vehicle, which may have been recorded when the user parked, with information on the monetary offer, such as, "I will pay $5.00 if you can refill my parking meter, which is $3.00 for the parking fee and a $2.00 service charge." The location of the vehicle may be sent with the message, which was recorded by the computing system 100 when the user parked. Other users can see the message and decide to either accept the terms or make a counteroffer having a different amount and/or different terms (e.g., "I will refill your parking meter for $6.00 which is a $3.00 parking fee and a $3.00 service charge"), or choose not to respond to the message. A User 2 who accepts the offer first may be allowed to complete the transaction by negotiating the terms (Step 2118). Once the users reach a deal, the request may be taken down and other users may be disqualified. Both users may communicate by using internal communication functions including but not limited to, live-chat, messaging, and any other form of communication. Once the terms are offered and accepted, User 1 sends payment to an escrow account, and User 2 is notified of this (Step 2120). After User 2 is notified of the present funds, User 2 can pay the meter fee; when User 2 pays, User 2 sends proof of payment (e.g., a receipt, a window sticker, a picture of the meter with extended time, etc.) and User 1 is notified (Step 2122). There may be confirmation of the received payment, and the system releases the funds from escrow to user 2 (Step 2124), and the users can rate each other for the transaction (Step 2126).

In such an embodiment, the parking meter data in the databases is received from users through the user engagement panels 134. The parking meter data may include a location of the parking meter, cost of parking at a parking meter, the start time of the parking meter, and the end time of the parking meter. Furthermore, through the user engagement panel 134, users will also be able to indicate whether a meter has stopped functioning or is "out of order," to improve government response time in fixing defective meters as well as alert other users of the potential difficulty.

Figure 22:
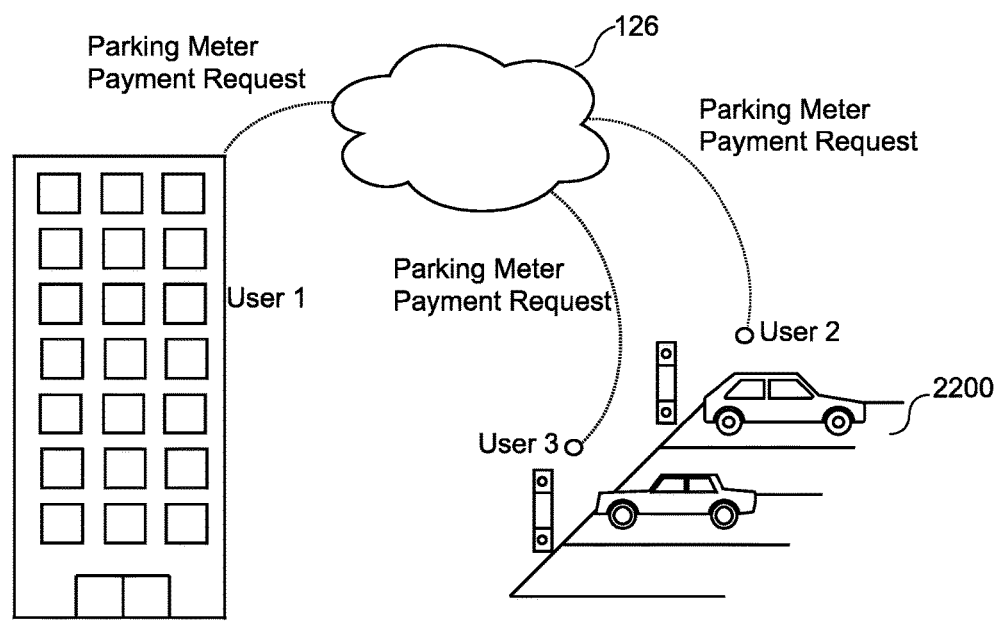
FIG. 22 is a schematic diagram illustrating a user sending a request through the system to other users regarding a demand for providing an expiring parking meter payment in accordance with an exemplary embodiment of the present invention.

As seen in FIG. 22, a user may send a request through the system to other users regarding a demand for providing an expiring parking meter payment in accordance with an exemplary embodiment of the present invention. Here, a User 1 remotely sends a parking meter payment request through a network such as a wide-area network 126 to User 2 and User 3. Users 2 and 3 are close to the User 1's parking location 2200. User 1 can negotiate with either user to get the parking meter refilled without having to leave his or her current location, and the other users can be given information about the location of User 1's vehicle as recorded by the system. A "user" as described herein does not necessarily have to be a driver or in a vehicle—a user could be, for example, a pedestrian or a bicyclist and still refill another user's meter.

Figure 23:
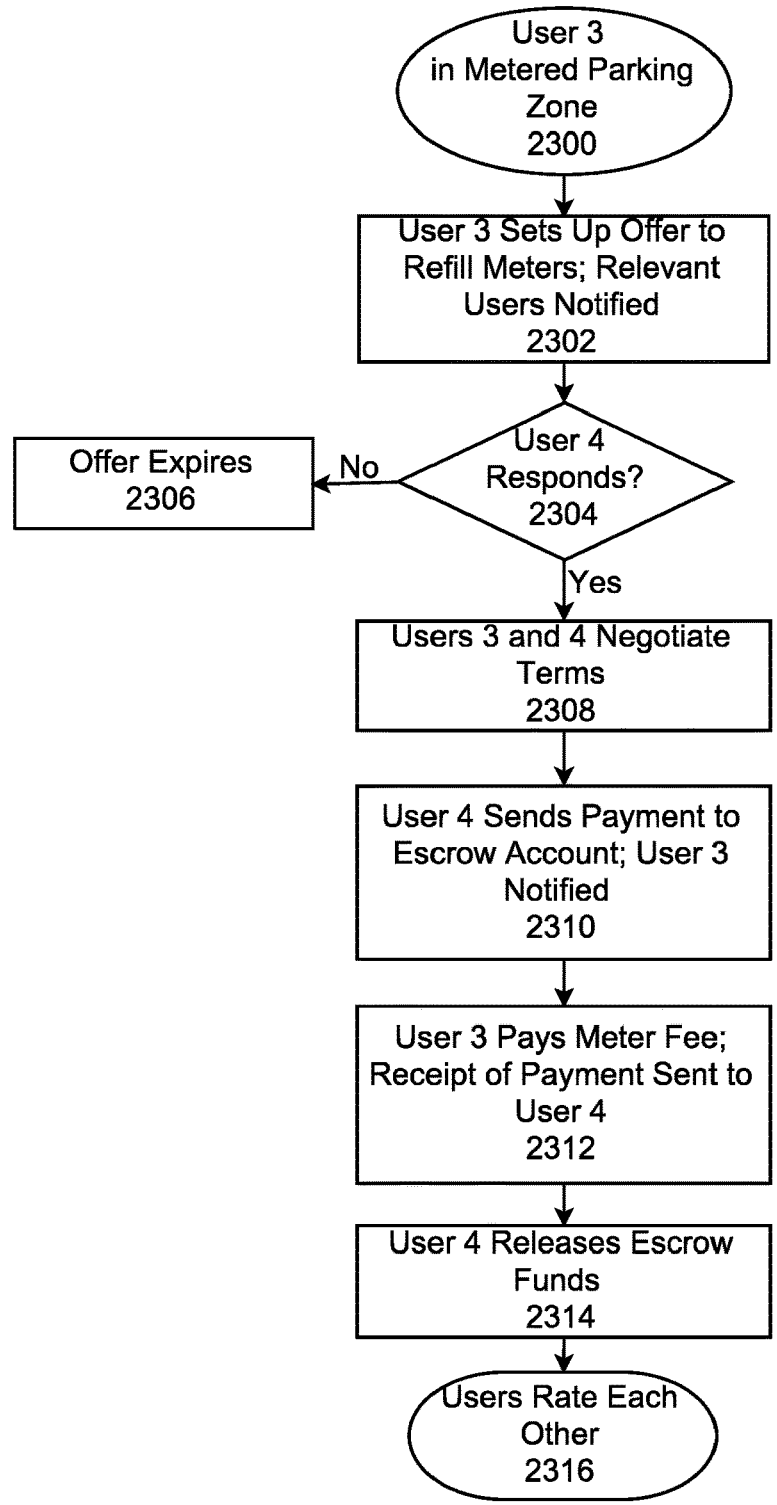
FIG. 23 is a flowchart illustrating an approach for a user to post an offer to refill an expiring parking meter in accordance with an exemplary embodiment of the present invention.

As seen in the flowchart illustration of FIG. 23, the system offers an approach for a user to post an offer to refill an expiring parking meter, in accordance with an exemplary embodiment of the present invention. A user, for example User 3, who is in a metered parking zone with parked vehicles (Step 2300), may also offer to help refill parking meters which may be approaching expiration for a fee by making an offer to other users whose parked vehicles are within a certain radius of User 3's current location. User 3 may post an offer such as an offer to refill meters as a message through the system that may include the amount User 3 would like to receive as a service charge (Step 2302). This service charge may be negotiable. Additionally, the Administrator may hire employees to use this method to send out messages with offers to help refill parking meters for a fee. User 3 may wait or remain in the area until a User 4 responds (Decision 2304). If no user responds, the offer might expire (Step 2306). If a User 4 responds (Decision 2304), Users 3 and 4 negotiate the terms (Step 2308). The User 4 may put the total amount of money in an escrow account (Step 2310) created by the system or has the option of transferring funds directly to User 3. The User 3 may receive notification regarding the deposit of funds in escrow and may then replenish the parking meter after receiving the location of the vehicle and/or of the relevant parking meter (Step 2312). Once refilled, User 3 provides proof of payment in the form of an accurate photograph that may include the vehicle plate number, filled meter, and/or receipt of payment as evidence. Once the photograph is uploaded into the mobile application, the User 4 may verify the photograph, the payment may be confirmed, and the system may release the payment placed in escrow (Step 2314), which may be credited to the User 3's account. This method incentivizes both users to participate because the User 4 may avoid receiving an expired meter violation ticket and User 3 may earn extra money through the service charge. There may also be a dispute resolution function incorporated to resolve any disputes between users. Both users may rate each other upon completing the transaction (Step 2316).

Parking spaces are often spaces with limitations related to the size of the vehicle. When offering and demanding parking spaces in general, users may indicate the type of vehicle they are currently driving or the type of vehicle that is currently parked in the space. The system may then compare the relative sizes of the vehicles to determine if the vehicle a user is driving may fit in the parking space. In some exemplary embodiments, the dimensions of the parking space may be entered in or retrieved from the database 106. There may be three applicable categories, for example, bigger vehicles, same-size vehicles, and smaller vehicles. A parking space occupied by a user with a certain sized vehicle may only allow another user with the same vehicle category or a smaller vehicle category. For example, a user's parked four-door sedan may be classified as a regular type vehicle or a compact vehicle. Another user driving a large pickup may not be allowed to park in the user's space because a pickup may be categorized as a bigger vehicle, which may be too large to fit in a compact vehicle space, where only same-size vehicles or smaller vehicles may park in the space.

It is to be understood that the phraseology or terminology employed herein is for purposes of description and not of limitation. Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. Therefore, while the embodiments herein have been described in terms of preferred embodiments, those skilled in the art will recognize that the embodiments herein can be practiced with modification within the spirit and scope of the claims. Any exemplary embodiments described herein are merely illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims. The scope of the invention, therefore, shall be defined solely by the following claims. Further, it will be apparent to those of skill in the art that numerous changes may be made in such details without departing from the spirit and the principles of the invention.

What is claimed is:

1. A computer-implemented system for identifying potentially available legal parking, the system comprising:
a server communicatively coupled to a plurality of remote computing devices associated with a plurality of users via a network, wherein the plurality of remote computing devices include one or more location identifiers configured to generate location data corresponding to one or more locations, and wherein the server includes at least one non-transitory computer-readable storage medium with computer-readable instructions stored therein, a database for storing legal parking related data, and a processor for executing the computer-readable instructions to:
receive from the plurality of remote computing devices, the legal parking related data, wherein the legal parking related data is defined as having a particular data type comprising at least one of: commercial vehicle, non-commercial vehicle, type of vehicle, or type of vehicle plate;
store the legal parking related data in the database;
track a location and a speed of a first of the plurality of remote computing devices associated with a first user of the plurality of users;
identify based on the speed and the location, that the first user is not moving;
determine, by the processor, a period of time that the first user has not been moving;
compare the period of time with a predetermined threshold period of time;
automatically determine that the first user is parked in the location;
preclude the location from identification in the database as one of one or more potentially available legal parking locations;
receive, from a second of the plurality of remote computing devices associated with a second user, user data associated with the second user, the user data comprising an identified location of a second user, a present time of the second user, user related data, or a user type of the second user;
retrieve, from the database, at least a portion of the legal parking related data corresponding to the user data associated with the second user;
identify one or more potentially available legal parking locations for the second user based on at least one of: (i) the user data or (ii) the portion of the legal parking related data; and
transmit, to the second user, real-time parking availability data at one or more locations comprising at least one of: (1) the one or more potentially available legal parking locations, (2) one or more illegal parking locations, or (3) one or more unavailable locations.

2. The system according to claim 1, wherein the legal parking related data comprises at least one of: parking violation related data or parking availability data,
wherein the parking violation related data comprises at least one of: parking rules, parking regulations, parking violation records, parking violation codes, parking violation statutory codes, one or more abbreviations used by parking enforcement personnel, associated fines or other penalties, parking signage with one or more locations, parking meter locations and associated parking meter costs, street view with one or more photos or videos for one or more locations with a predetermined number of parking violation citations, notice of one or more temporary or permanent parking prohibitions, tow away zone relevant data, street cleaning relevant data, or weather relevant data, and
wherein the computing system additionally receives the legal parking related data from one or more sources selected from the group comprising: one or more additional users, government agencies, non-government organizations, private entities, community organizations, media sources, and other interested individuals.

3. The system according to claim 1, wherein the user type comprises at least one of: commercial vehicle user type, non-commercial vehicle user type, user type based on vehicle type, user type based on vehicle plate type, motorcyclist type, or cyclist type.

4. The system according to claim 1, wherein the processor further executes the computer-readable instructions to:
predict one or more potential parking prohibitions directly applicable to the second user based on at least one of: (i) parking violation related data including a location identical to the identified one or more illegal parking locations; (ii) parking violation related data including a point in time identical to the present time; or (iii) parking violation related data including a location identical to the illegal parking location, the location corresponding to the point in time identical to the present time;
identify the one or more illegal parking locations based on at least one of: (i) the user type, or (ii) the one or more parking prohibitions applicable to the second user based on the user data; and
preclude the one or more illegal parking locations from identification as the one or more potentially available legal parking locations.

5. The system according to claim 1, wherein the processor further executes the computer-readable instructions to:
predict one or more potential parking prohibitions applicable to the second user by inference based on at least one of: (i) one or more relevant parking locations; (ii) one or more relevant parking times; or (iii) the one or more relevant parking locations corresponding to the one or more relevant parking times, wherein the inference is based on at least one or more previously issued parking violation citations issued for a same type of parking violation;
identify one or more illegal parking locations based on at least one of: (i) the user type or (ii) the one or more parking prohibitions applicable to the second user by inference; and
preclude the one or more illegal parking locations from identification as the one or more potentially available legal parking locations.

6. The system according to claim 5, wherein the inference is based on at least one of:
(i) at least two relevant parking locations corresponding to one relevant parking time, wherein each of the at least two relevant parking locations has at least one previously issued parking violation citation for violating the one or more parking prohibitions, wherein the one or more illegal parking locations are between the at least two relevant parking locations, and wherein the at least two relevant parking locations are at a predetermined distance from each other;

(ii) at least two relevant parking times corresponding to one relevant parking location, wherein each of the at least two relevant parking times has the at least one previously issued parking violation citation for violating said one or more parking prohibitions, wherein the present time is between the at least two relevant parking times, wherein the at least two relevant parking times are within a predetermined time frame, and wherein each relevant parking time of the at least two relevant parking times is based on at least one or more time period selected from the group comprising: a point in time, a time frame, a time of day, a time of week, a time of month, and a time of year; or (iii) the at least two relevant parking locations corresponding to the at least two relevant parking times, and wherein the identified location is between the at least two relevant parking locations at a predetermined distance from each other corresponding to the present time being between the at least two relevant parking times within a predetermined time frame.

7. The system according to claim 1, wherein the processor further executes the computer-readable instructions to:
receive the legal parking related data from the plurality of users through at least one or more user engagement panels displayed on the plurality of remote computing devices.

8. The system according to claim 7, wherein the legal parking related data for a specific parking location received from the at least one user engagement panel is subject to ratings from one or more additional users,
wherein at least a part of the legal parking related data in the database is modified: upon the ratings reaching a predetermined number or immediately upon identification of the legal parking related data as time-sensitive legal parking related data, and
wherein the time-sensitive legal parking related data comprises a notice of one or more temporary parking prohibitions.

9. The system according to claim 1, wherein the processor further executes the computer-readable instructions to:
display the real-time parking availability data in one or more notifications customizable based on at least one of: a time the one or more notifications are issued, a distance to an intended destination, an amount of time before the second user reaches the intended destination, a form of the one or more notifications, a number of times the one or more notifications are requested, content of the one or more notifications, or a location where the one or more notifications are issued.

10. The system according to claim 1, wherein the processor further executes the computer-readable instructions to:
receive, from the plurality of remote computing devices, parking unavailability data corresponding to one or more unavailable locations;
modify the database to include the parking unavailability data; and
preclude the one or more unavailable locations corresponding to the parking unavailability data from being identified as one of the one or more potentially available legal parking locations for the second user.

11. A computer-implemented system for identifying potentially available legal parking, the system comprising:
a server communicatively coupled to a plurality of remote computing devices associated with a plurality of users via a network, wherein the plurality of remote computing devices include one or more location identifiers configured to generate location data corresponding to one or more locations, and wherein the server includes at least one non-transitory computer-readable storage medium with computer-readable instructions stored therein, a database for storing legal parking related data, and a processor for executing the computer-readable instructions to:
receive, from the plurality of remote computing devices, the legal parking related data from the plurality of users through the plurality of remote computing devices, wherein the legal parking related data is defined as having a particular data type comprising at least one of: commercial vehicle, non-commercial vehicle, type of vehicle, or type of vehicle plate, and wherein the legal parking related data for a specific parking location is subject to ratings from one or more additional users;
store, the legal parking related data in the database;
modify at least a portion of the legal parking related data in the database upon the ratings reaching a predetermined number; and
transmit at least the portion of the legal parking related data to a user.

12. The system according to claim 11, wherein the processor further executes the computer-readable instructions to:
identify a leaving intent of the user or one or more additional users leaving a parking location based on at least one of: (i) manual input from the user or the one or more additional users, or (ii) automatic detection of a speed and location of the user or the one or more additional users; and
identify the parking location as one of one or more potentially available parking locations.

13. The system according to claim 11, wherein the processor further executes the computer-readable instructions to:
receive manual input from the user or from one or more additional users identifying a parking location and a status as being parked in the parking location;
update the legal parking related data in the database for the parking location; and
identify the parking location as unavailable.

14. The system according to claim 11, wherein the legal parking related data comprises at least one of: parking violation related data or parking availability data,
wherein the parking violation related data comprises at least one of: parking rules, parking regulations, parking violation records, parking violation codes, parking violation statutory codes, one or more abbreviations used by parking enforcement personnel, associated fines or other penalties, parking signage with one or more locations, parking meter locations and associated parking meter costs, street view with one or more photos or videos for one or more locations with a predetermined number of parking violation citations, notice of one or more temporary or permanent parking prohibitions, tow away zone relevant data, street cleaning relevant data, or weather relevant data, and
wherein the legal parking related data is additionally received from one or more sources selected from the group comprising: one or more users, government agencies, non-government organizations, private entities, community organizations, media sources, and other interested individuals.

15. The system according to claim 11, wherein the processor further executes the computer-readable instructions to:

receive, from a remote computing device associated with the user, user data comprising an identified location of the user, a present time, user related data, or a user type of the user, wherein the user type comprises at least one of: commercial vehicle user type, non-commercial vehicle user type, user type based on vehicle type, user type based on vehicle plate type, motorcyclist type, or cyclist type;

identify one or more potentially available legal parking locations for the user based on at least one of: (i) the user data or (ii) the legal parking related data; and display, to the user, real-time parking availability data at one or more locations comprising at least one of: (1) the one or more potentially available legal parking locations, (2) one or more illegal parking locations, or (3) one or more unavailable locations.

16. The system according to claim 15, wherein the processor further executes the computer-readable instructions to:

predict one or more potential parking prohibitions directly applicable to the user based on at least one of: (i) parking violation related data including a location identical to the one or more illegal parking locations; (ii) parking violation related data including a point in time identical to the present time; or (iii) parking violation related data including a location identical to an illegal parking location;

identify one or more illegal parking locations based on at least one of: (i) the user type, or (ii) the one or more parking prohibitions applicable to the user based on the user data; and preclude the one or more illegal parking locations from identification as the one or more potentially available legal parking locations.

17. The system according to claim 11, wherein the processor further executes the computer-readable instructions to:

predict one or more potential parking prohibitions applicable to the user by inference based on at least one of: (i) one or more relevant parking locations; (ii) one or more relevant parking times; or (iii) the one or more relevant parking locations corresponding to the one or more relevant parking times, wherein the inference is based on at least one or more previously issued parking violation citations issued for a same type of parking violation;

identify one or more illegal parking locations based on at least one of: (i) the user type or (ii) the one or more parking prohibitions applicable to the user by inference; and preclude the one or more illegal parking locations from identification as the one or more potentially available legal parking locations.

18. The system according to claim 17, wherein the inference is based on at least one of:

(i) at least two relevant parking locations corresponding to one relevant parking time, wherein each of the at least two relevant parking locations has at least one previously issued parking violation citation for violating the one or more parking prohibitions, wherein the one or more illegal parking locations are between the at least two relevant parking locations, and wherein the at least two relevant parking locations are at a predetermined distance from each other;

(ii) at least two relevant parking times corresponding to one relevant parking location, wherein each of the at least two relevant parking times has the at least one previously issued parking violation citation for violating said one or more parking prohibitions, wherein the present time is between the at least two relevant parking times, wherein the at least two relevant parking times are within a predetermined time frame, and wherein each relevant parking time of the at least two relevant parking times is based on at least one or more time period selected from the group comprising: a point in time, a time frame, a time of day, a time of week, a time of month, and a time of year; or (iii) the at least two relevant parking locations corresponding to the at least two relevant parking times, and wherein the identified location is between the at least two relevant parking locations at a predetermined distance from each other corresponding to the present time being between the at least two relevant parking times within a predetermined time frame.

19. The system according to claim 11, wherein the processor further executes the computer-readable instructions to:

receive the legal parking related data through at least one or more user engagement panels displayed on the plurality of remote computing devices; and receive the ratings from the one or more additional users through the at least one or more user engagement panels.

20. The system according to claim 19, wherein at least a part of the legal parking related data in the database is modified immediately upon identification of the legal parking related data as time-sensitive legal parking related data, and wherein the time-sensitive legal parking related data comprises a notice of one or more temporary parking prohibitions.

21. A computer-implemented system for identifying potentially available legal parking, the system comprising:

a server communicatively coupled to a plurality of remote computing devices associated with a plurality of users via a network, wherein the plurality of remote computing devices include one or more location identifiers configured to generate location data corresponding to one or more locations, and wherein the server includes at least one non-transitory computer-readable storage medium with computer-readable instructions stored therein, a database for storing legal parking related data, and a processor for executing the computer-readable instructions to:

receive, from the plurality of remote computing devices, the legal parking related data, wherein the legal parking related data is defined as having a particular data type comprising at least one of: commercial vehicle, non-commercial vehicle, type of vehicle, or type of vehicle plate;

store the legal parking related data in the database;

enable one or more additional users having firsthand experience with an identified location to provide a rating of at least a portion of the legal parking related data associated with the identified location, wherein the firsthand experience is identified as passing or having passed within a predetermined distance of the identified location;

modify at least the portion of the legal parking related data in the database upon the ratings reaching a predetermined number; and allocate a monetary or non-monetary reward to one or more users who provided the portion of the legal parking related data upon the portion of the legal parking related data receiving a predetermined number of the ratings.

22. The system according to claim 21, wherein the processor further executes the computer-readable instructions to:
   display real-time parking availability data to a user in one or more notifications customizable based on at least one of: a time the one or more notifications are issued, a distance to an intended destination, an amount of time before the user reaches the intended destination, a form of the one or more notifications, a number of times the one or more notifications are requested, content of the one or more notifications, or a location where the one or more notifications are issued.

23. The system according to claim 21, wherein the processor further executes the computer-readable instructions to:
   receive, from the plurality of remote computing devices, parking unavailability data corresponding to one or more unavailable locations; and
   modify the database to include the parking unavailability data.

24. The system according to claim 23, wherein the processor further executes the computer-readable instructions to:
   preclude the one or more unavailable locations corresponding to the parking unavailability data from being identified as one of one or more potentially available legal parking locations.

25. The system according to claim 21, wherein the processor further executes the computer-readable instructions to:
   compare parking rules or regulations applicable to the identified location (i) with the parking rules or regulations applicable to a location where a driver's license of a user was issued, or (ii) with the parking rules or regulations applicable to another location requested by the user, and display a difference as determined by the comparing, and
   display the difference to the user automatically based on a present location of the user, or upon receiving a request for the difference from the remote computing device of the user.

26. The system according to claim 21, wherein the processor further executes the computer-readable instructions to:
   identify a leaving intent of a user or one or more additional users leaving a parking location based on at least one of: (i) manual input from the user or the one or more additional users, or (ii) automatic detection of a speed and location of the user or the one or more additional users; and
   identify the parking location as one of the one or more potentially available parking locations based on type of vehicle and type of vehicle plate.

27. The system according to claim 21, wherein the processor further executes the computer-readable instructions to:
   receive manual input from a user or from one or more additional users identifying a parking location and a status as being parked in the parking location; and
   update the legal parking related data in the database for the parking location and identify the parking location as unavailable.

28. The system according to claim 21, wherein the processor further executes the computer-readable instructions to:
   track a location and a speed of a user or of the one or more additional users;
   identify, based on the speed and the location, that the user or the one or more additional users are not moving;
   determine a period of time that the user or the one or more additional users have not been moving;
   compare the period of time with a predetermined threshold period of time;
   automatically determine that the user or the one or more additional users is parked in the location; and
   preclude the location from identification in the database as one of the one or more potentially available legal parking locations.

29. The system according to claim 21, wherein the processor further executes the computer-readable instructions to:
   enable the one or more additional users having firsthand experience with the identified location to provide a rating of the legal parking related data through one or more user engagement panels.

30. The system according to claim 29, wherein the processor further executes the computer-readable instructions to:
   allocate a monetary or non-monetary reward to one or more users who provided the legal parking related data through at least one or more user engagement panels upon the legal parking related data reaching the predetermined number of the ratings.

* * * * *